United States Patent
Hur

(10) Patent No.: US 11,358,613 B2
(45) Date of Patent: Jun. 14, 2022

(54) AUTONOMOUS VEHICLE AND SERVICE PROVIDING SYSTEM AND METHOD USING THE SAME

(71) Applicant: LG Electronics Inc., Seoul (KR)

(72) Inventor: In Hur, Seoul (KR)

(73) Assignee: LG Electronics Inc., Seoul (KR)

( * ) Notice: Subject to any disclaimer, the term of this patent is extended or adjusted under 35 U.S.C. 154(b) by 178 days.

(21) Appl. No.: 16/485,104

(22) PCT Filed: Apr. 23, 2019

(86) PCT No.: PCT/KR2019/004922
§ 371 (c)(1),
(2) Date: Aug. 9, 2019

(87) PCT Pub. No.: WO2020/218636
PCT Pub. Date: Oct. 29, 2020

(65) Prior Publication Data
US 2021/0331701 A1    Oct. 28, 2021

(51) Int. Cl.
*B60W 60/00* (2020.01)
*B60W 30/06* (2006.01)
(Continued)

(52) U.S. Cl.
CPC ........ *B60W 60/0024* (2020.02); *B60W 30/06* (2013.01); *G05D 1/0016* (2013.01);
(Continued)

(58) Field of Classification Search
CPC ............ B60W 60/0024; B60W 30/06; B60W 2556/50; B60W 60/0025; B60W 30/14; G06Q 50/30; H04N 7/183; H04N 7/188; H04N 7/18; G05D 1/0022; G05D 1/0016; G05D 1/0212; G05D 2201/0213; H04W 4/44; G01C 21/34; G01C 21/36;
(Continued)

(56) References Cited

U.S. PATENT DOCUMENTS

2015/0348335 A1* 12/2015 Ramanujam ......... G05D 1/0088
701/23

FOREIGN PATENT DOCUMENTS

| KR | 101675885 | | 11/2016 | |
| KR | 101711797 B1 | * | 3/2017 | ............ B60W 30/06 |
| KR | 1020170030976 | | 3/2017 | |

OTHER PUBLICATIONS

Korean Office Action in Korean Appln. No. 10-2019-7019215, dated Nov. 11, 2020, 19 pages (with English translation).

* cited by examiner

*Primary Examiner* — Brian P Sweeney
(74) *Attorney, Agent, or Firm* — Fish & Richardson P.C.

(57) ABSTRACT

Disclosed herein are an autonomous vehicle and a service providing system and method using the same. The autonomous vehicle includes a navigation system setting, as a destination, a service zone adjacent to a parking lot when there is a previously registered vehicle service input through a user terminal, and setting, as a destination, the parking lot adjacent to the service zone after completion of the previously registered vehicle service, and an operation system moving the vehicle to the destination through autonomous driving. One or more of the autonomous vehicle, the user terminal, and the server may be associated with artificial intelligence, a robot, augmented reality (AR), virtual reality (VR), or the like.

12 Claims, 67 Drawing Sheets

(51) Int. Cl.
  *G05D 1/00* (2006.01)
  *G05D 1/02* (2020.01)
  *G06Q 50/30* (2012.01)
  *H04W 4/44* (2018.01)
  *H04N 7/18* (2006.01)

(52) U.S. Cl.
  CPC ......... *G05D 1/0022* (2013.01); *G05D 1/0212* (2013.01); *G06Q 50/30* (2013.01); *H04N 7/183* (2013.01); *H04W 4/44* (2018.02); *B60W 2556/50* (2020.02); *G05D 2201/0213* (2013.01)

(58) Field of Classification Search
  CPC .. G01C 21/3446; G01C 21/3679; G08G 1/00; G08G 1/0969; G08G 1/123; G08G 1/14; B60Y 2300/14
  See application file for complete search history.

[FIG. 1]
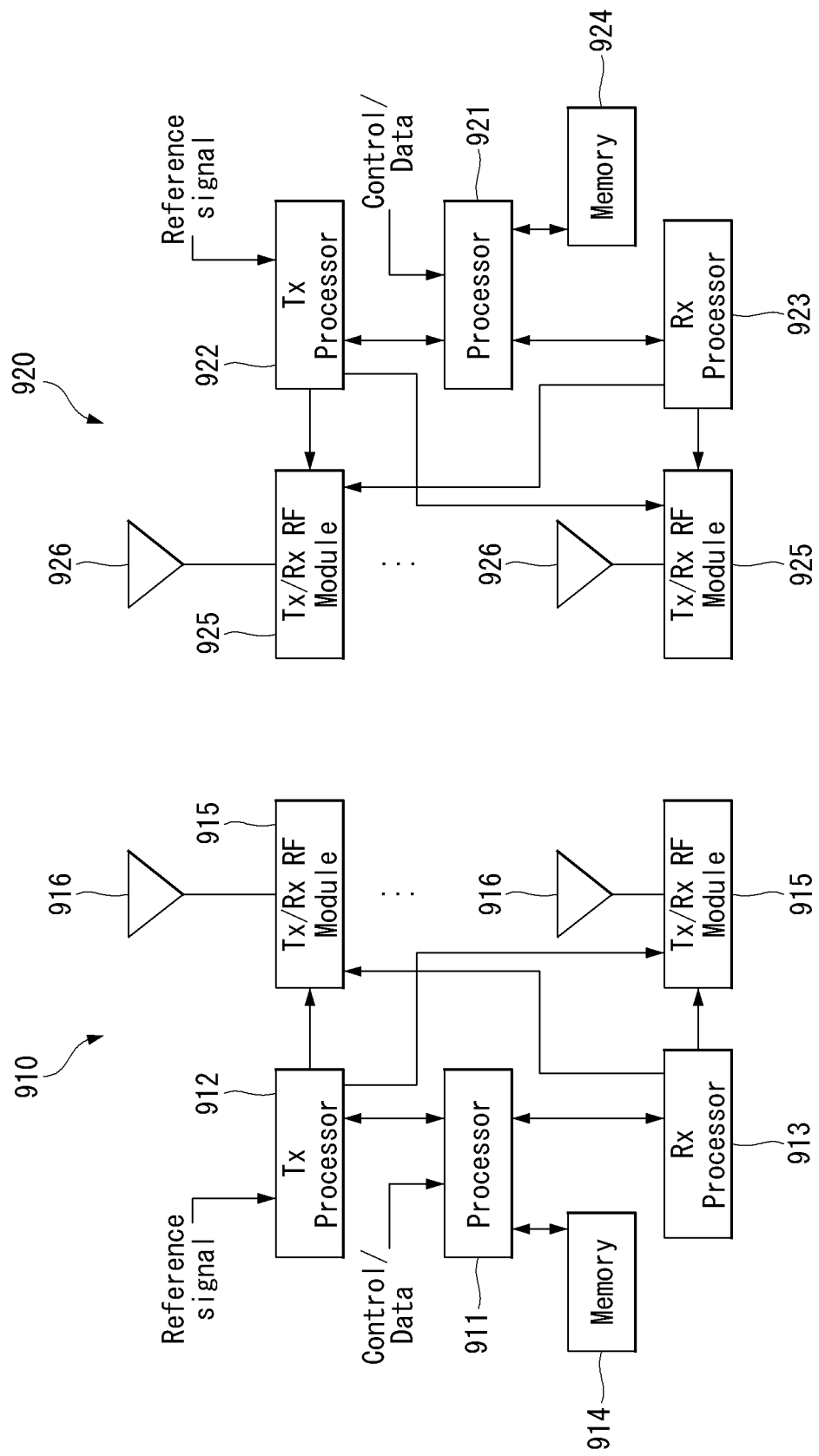

[FIG. 2]
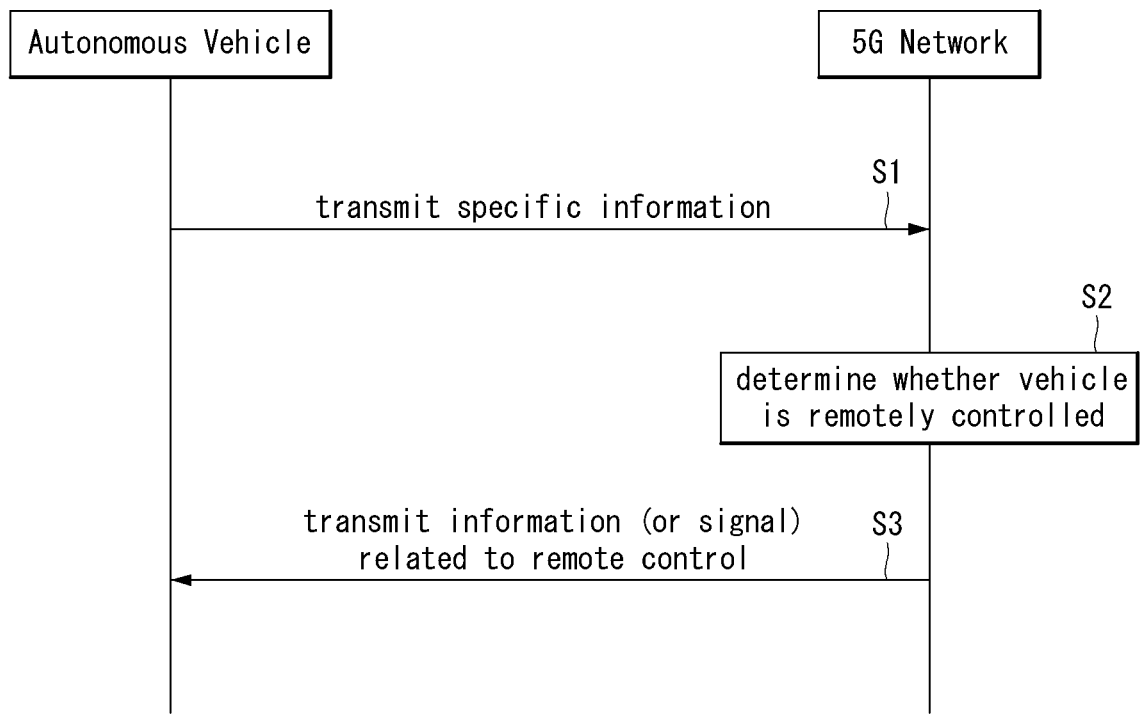

[FIG. 3]
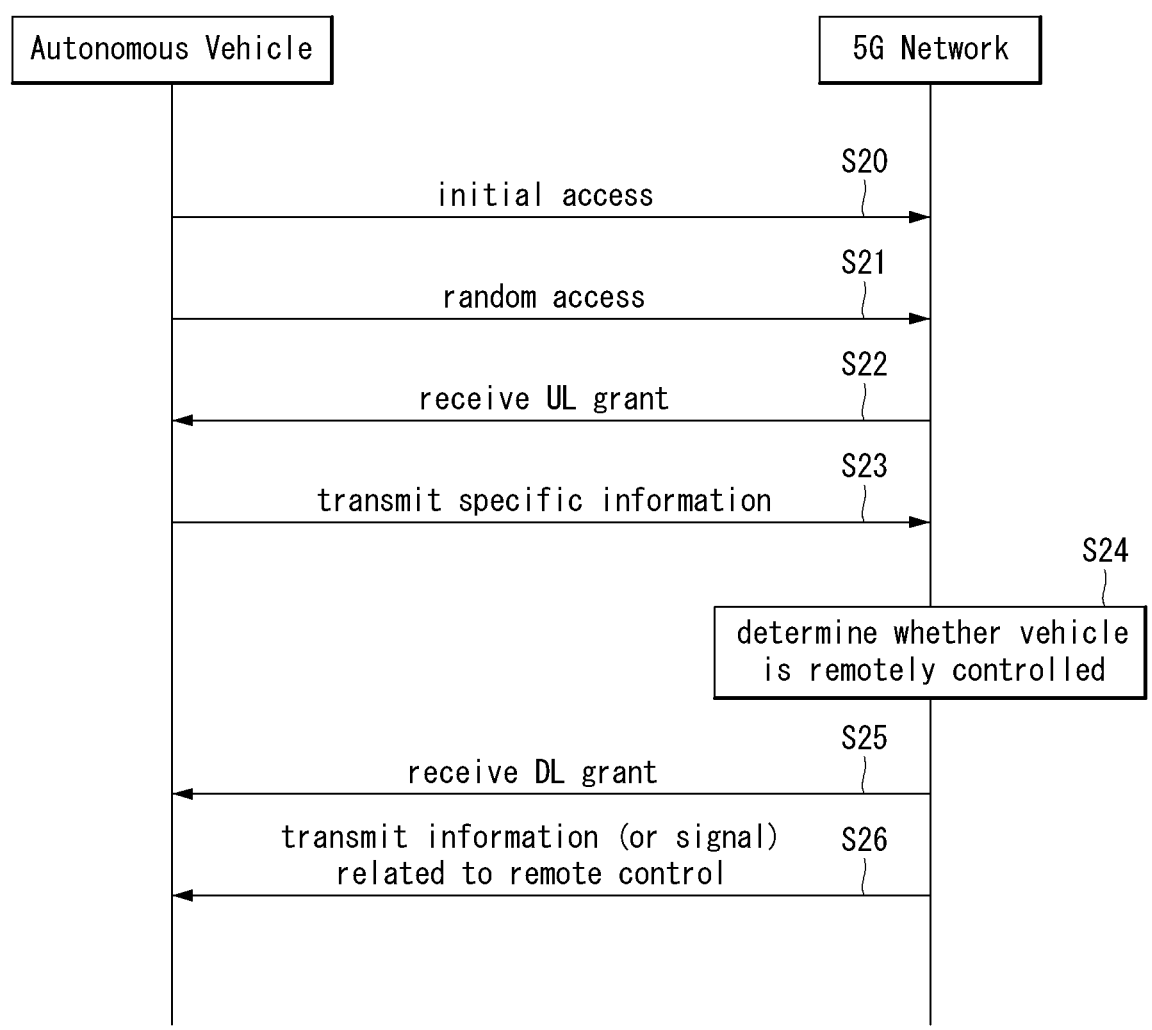

[FIG. 4]
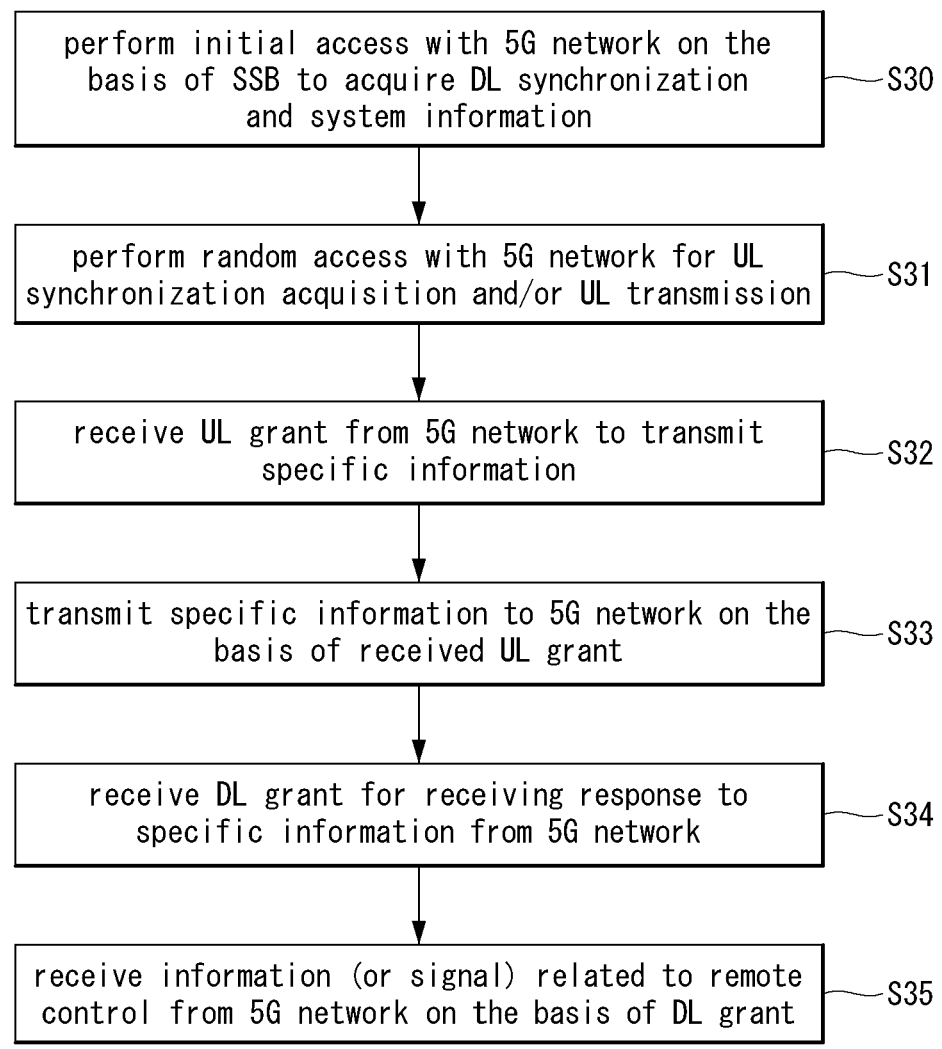

[FIG. 5]
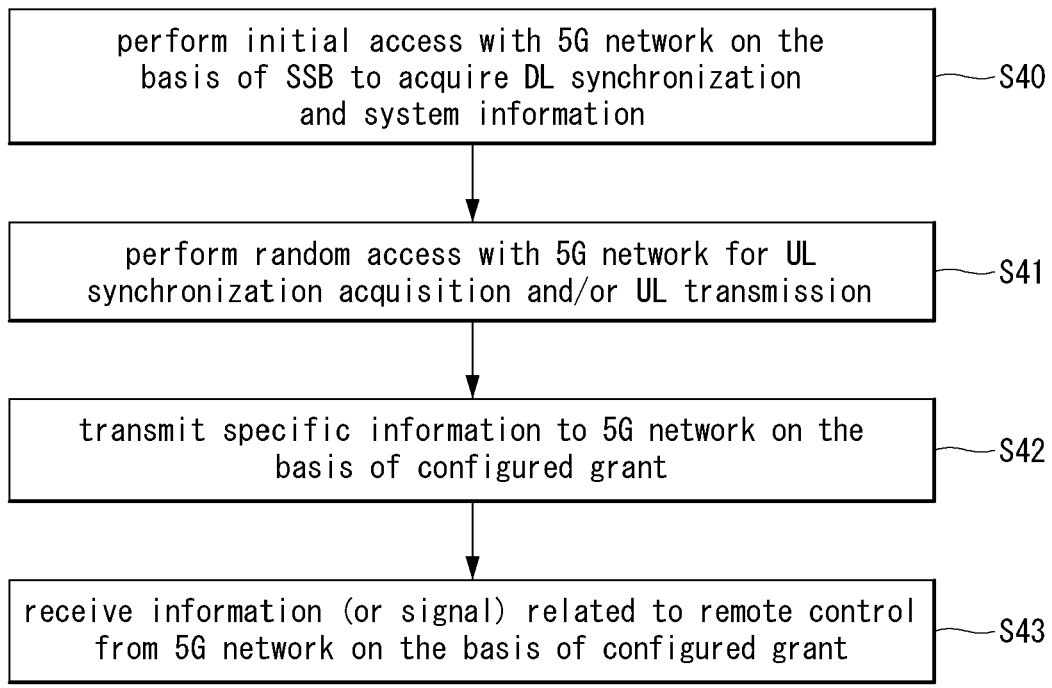

[FIG. 6]
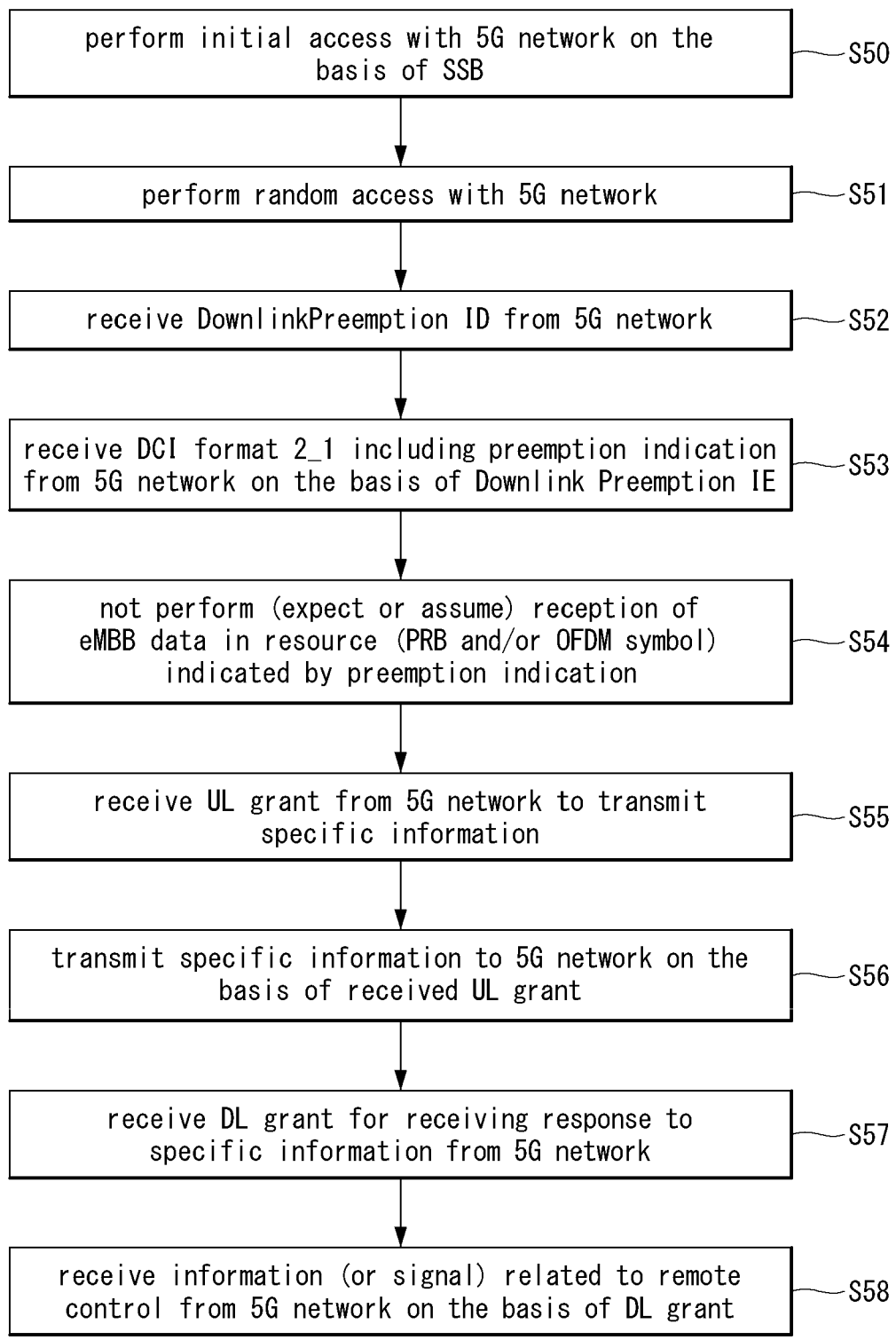

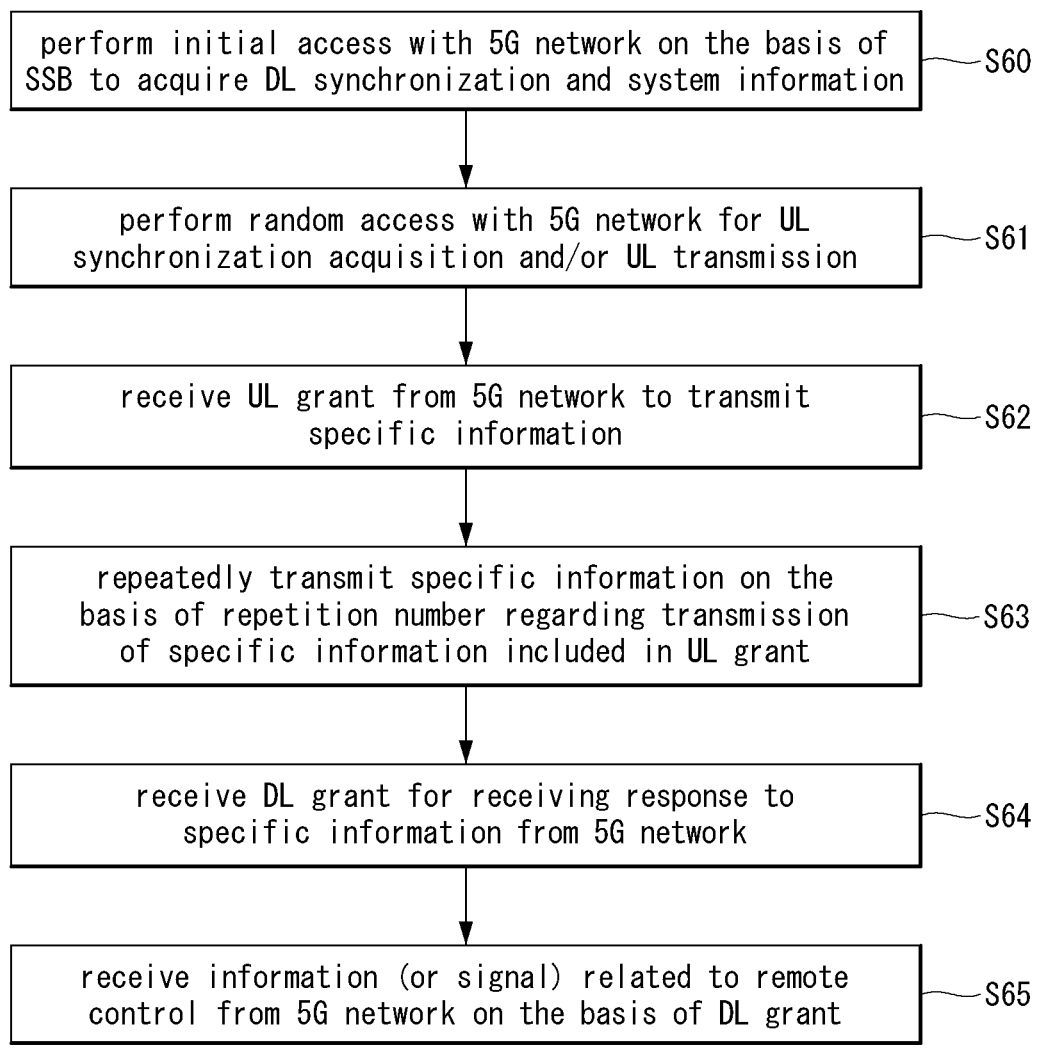
[FIG. 7]

[FIG. 8]
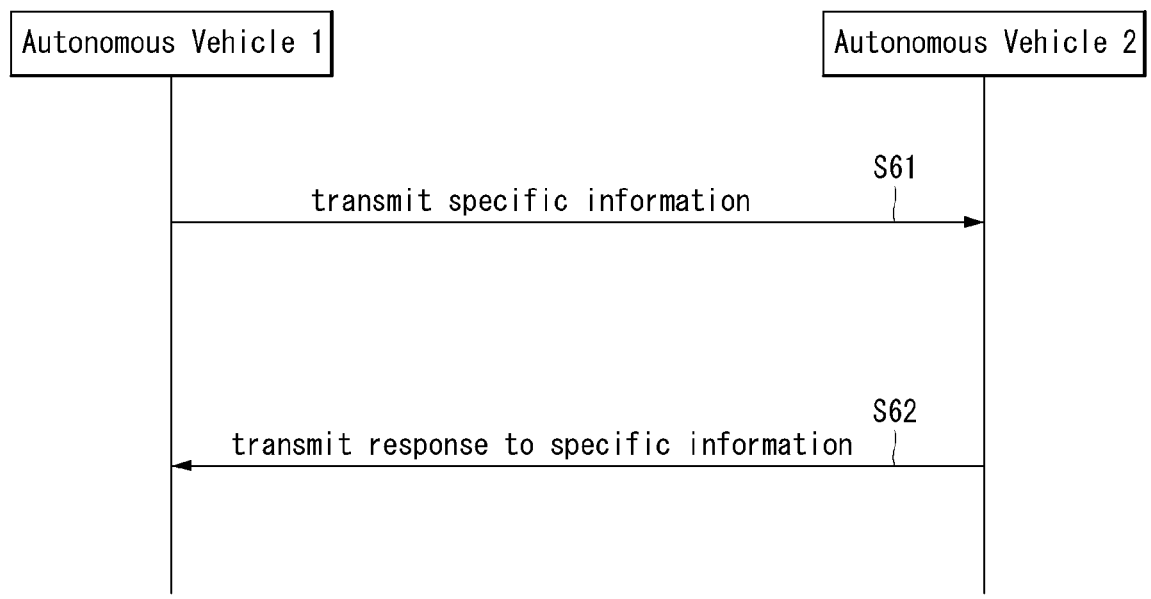

[FIG. 9]
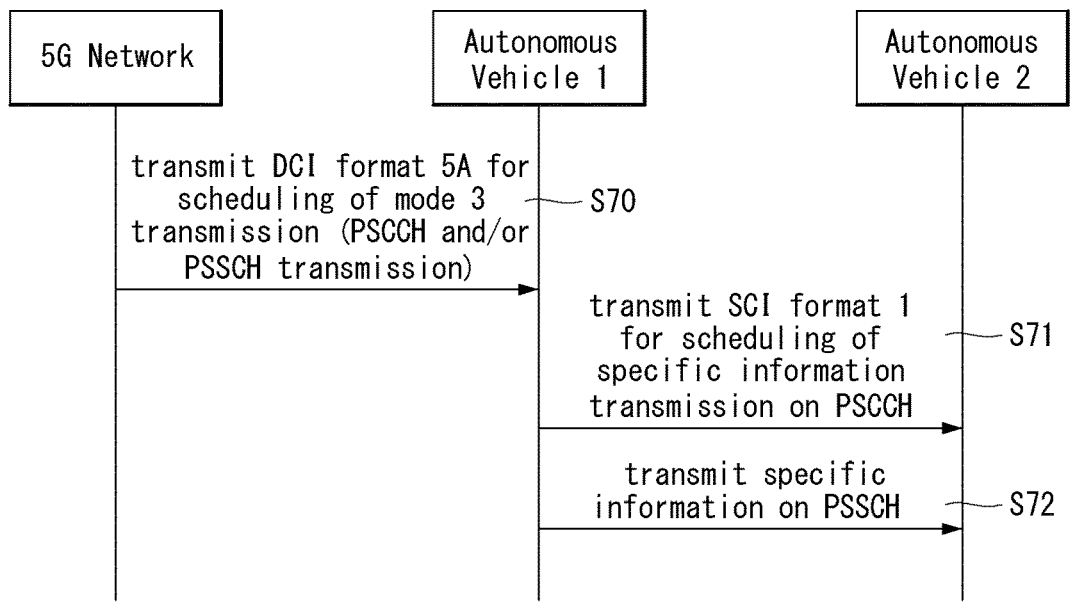
[FIG. 10]
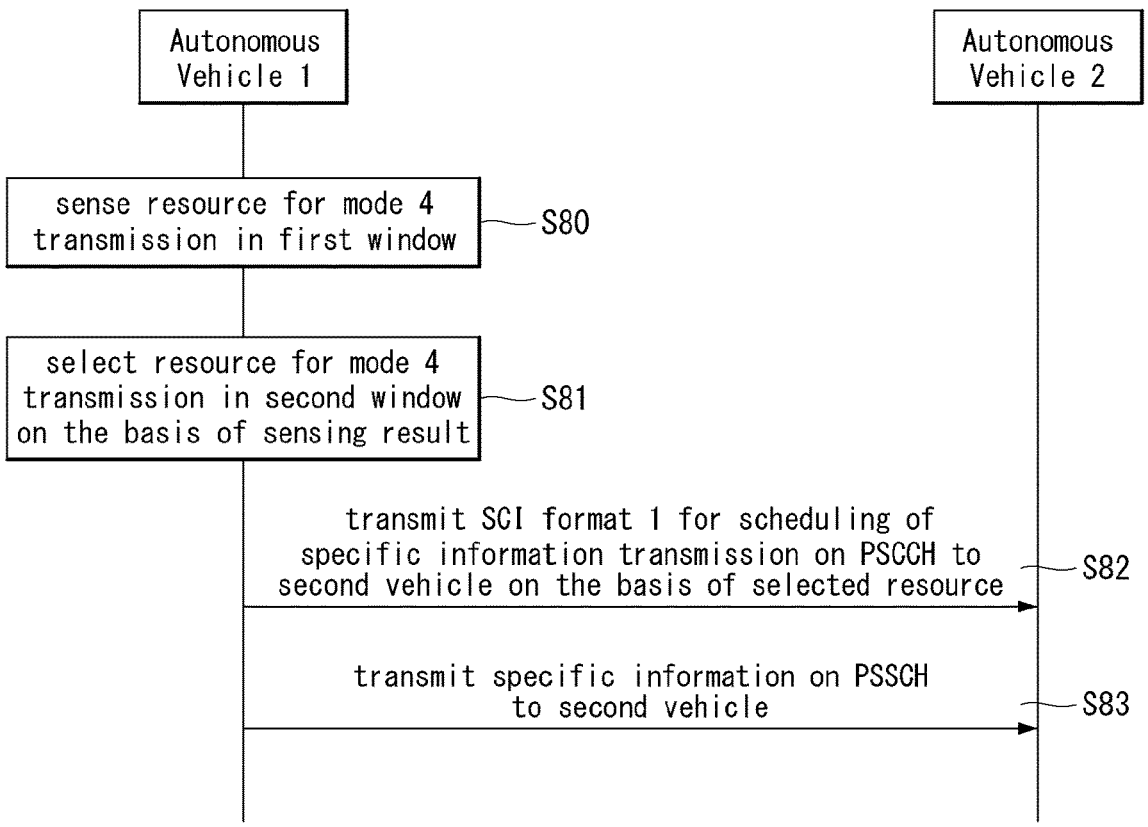

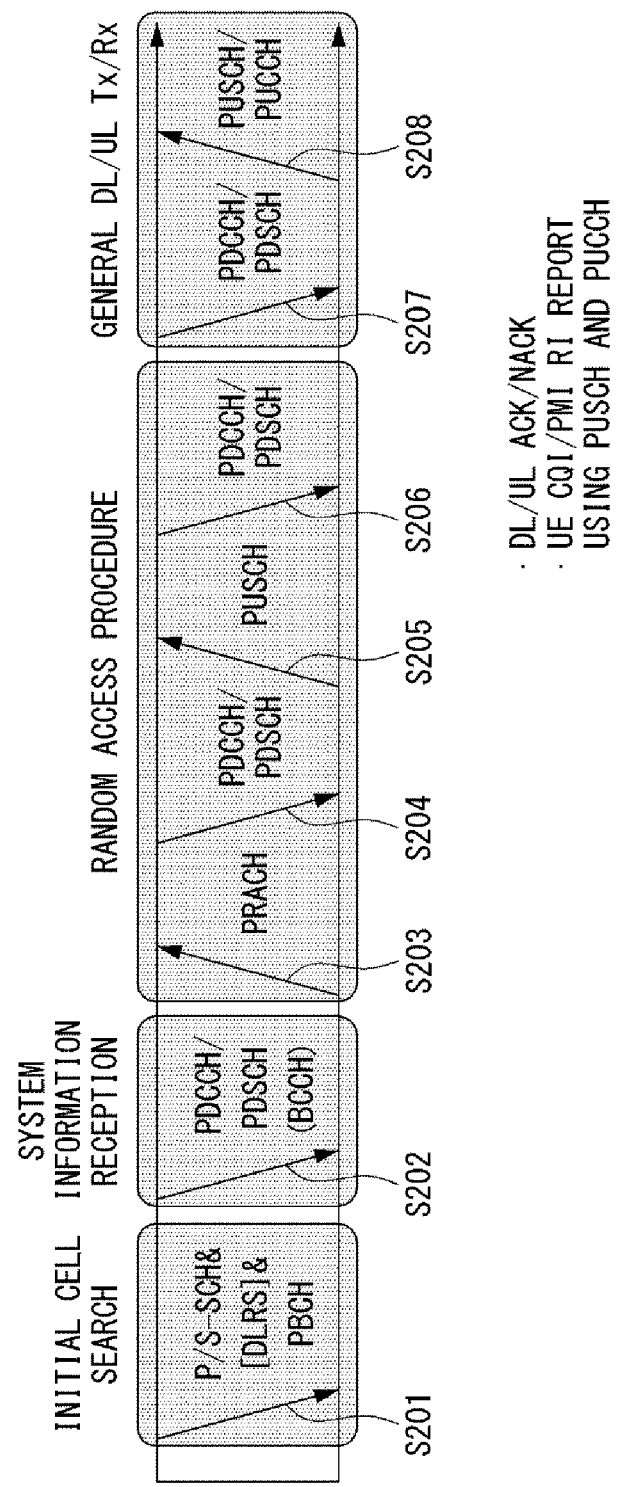

[FIG. 12]
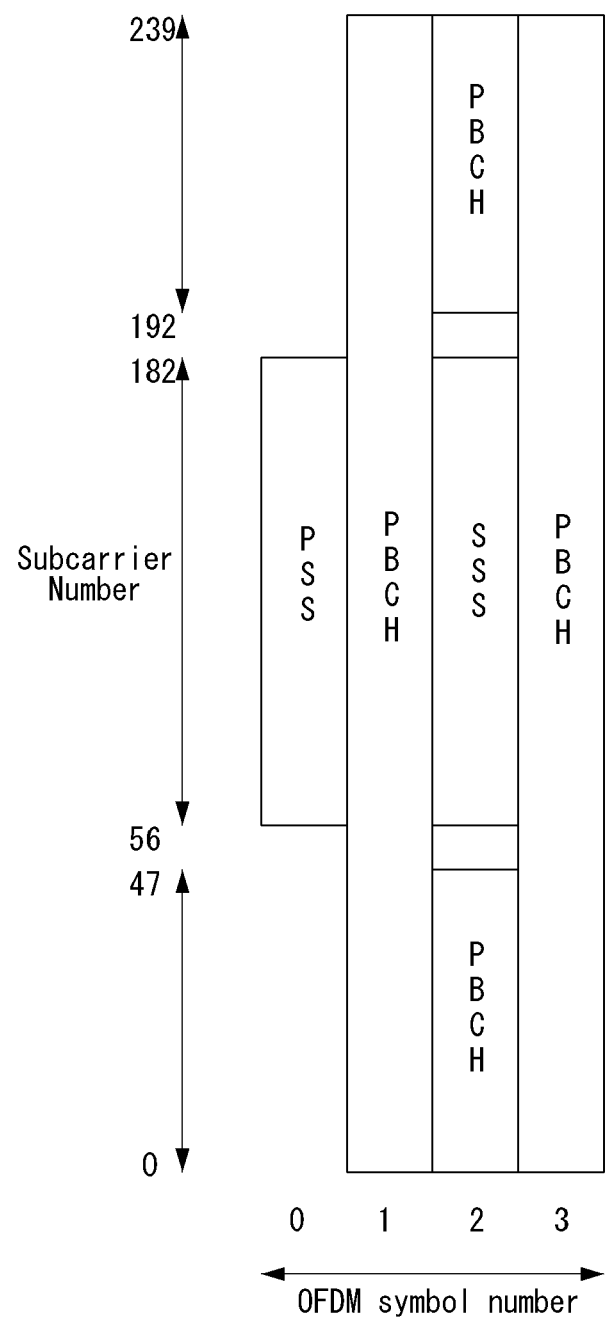

[FIG. 13]
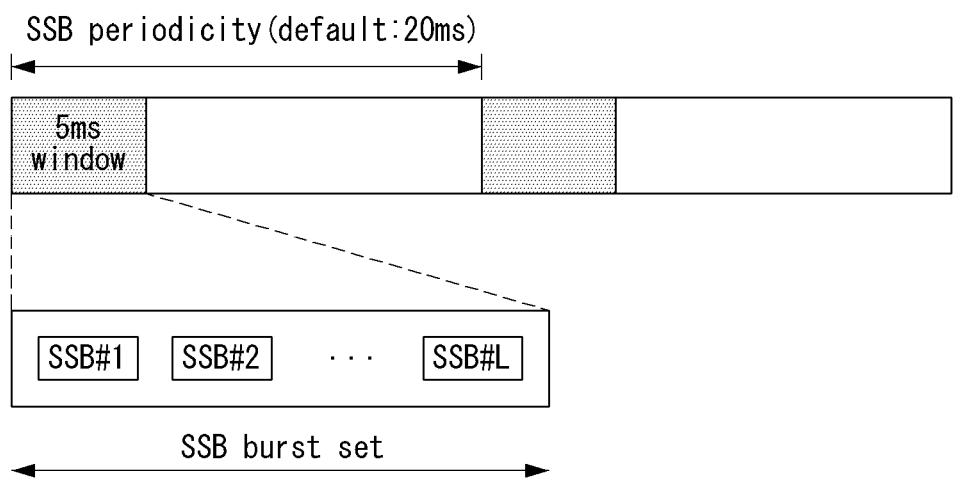

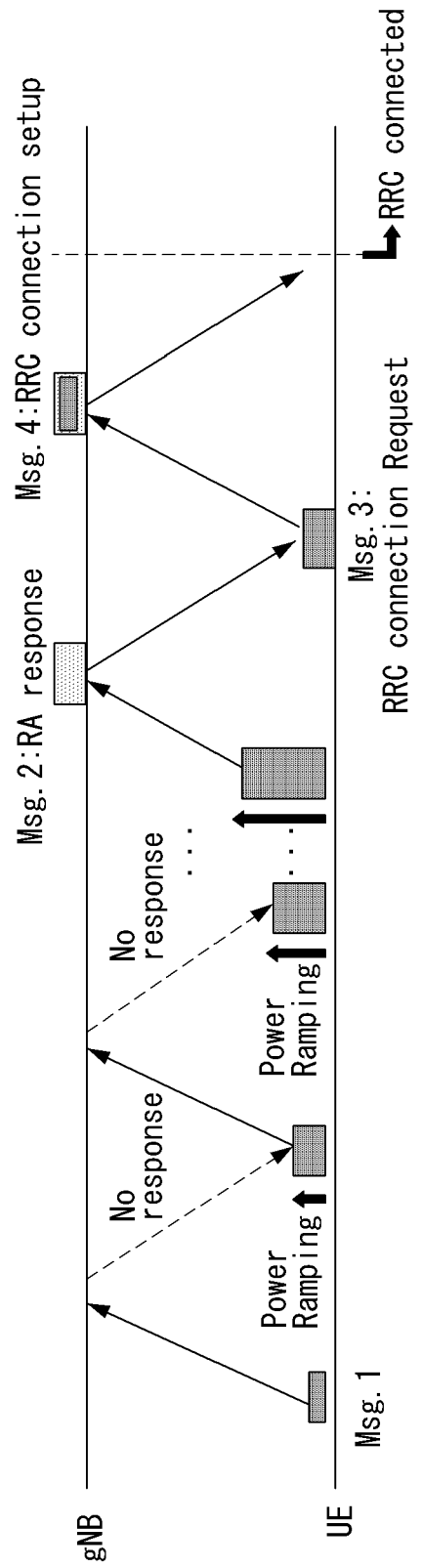
[FIG. 14]

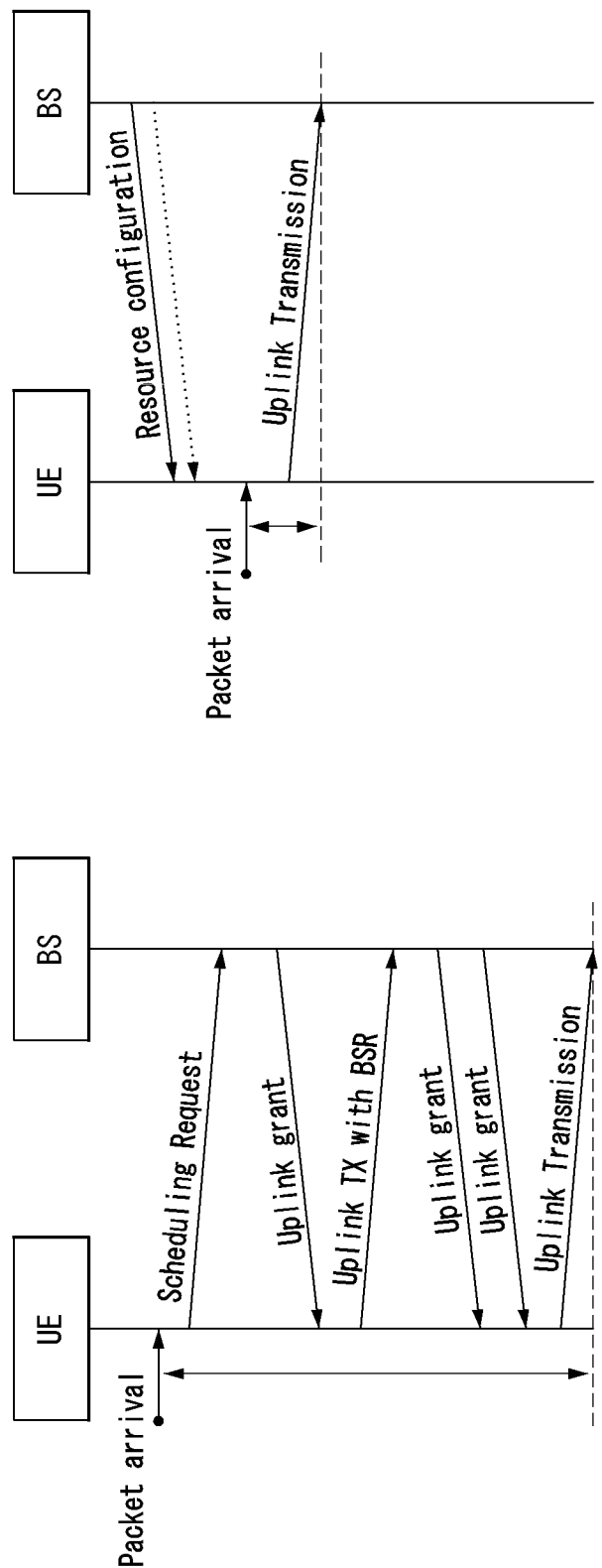
[FIG. 15]
Fig. Uplink TX procedure with grant (a)
Fig. Uplink TX procedure without grant (b)

[FIG. 16]
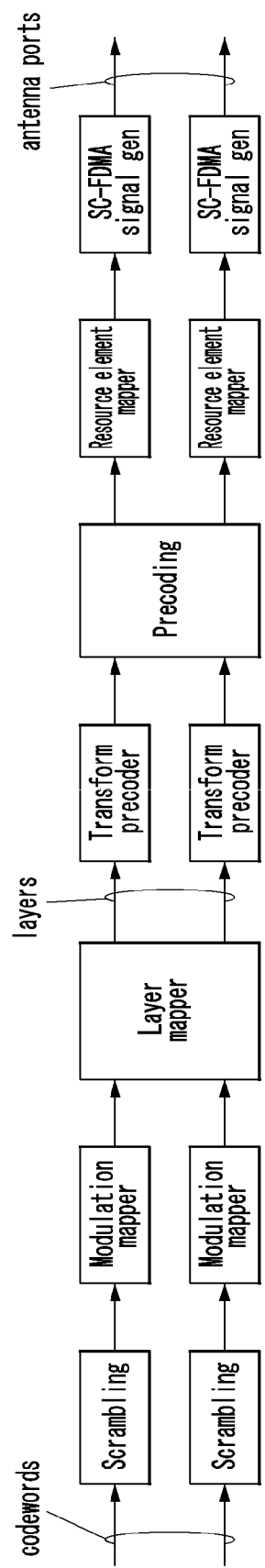

[FIG. 17]
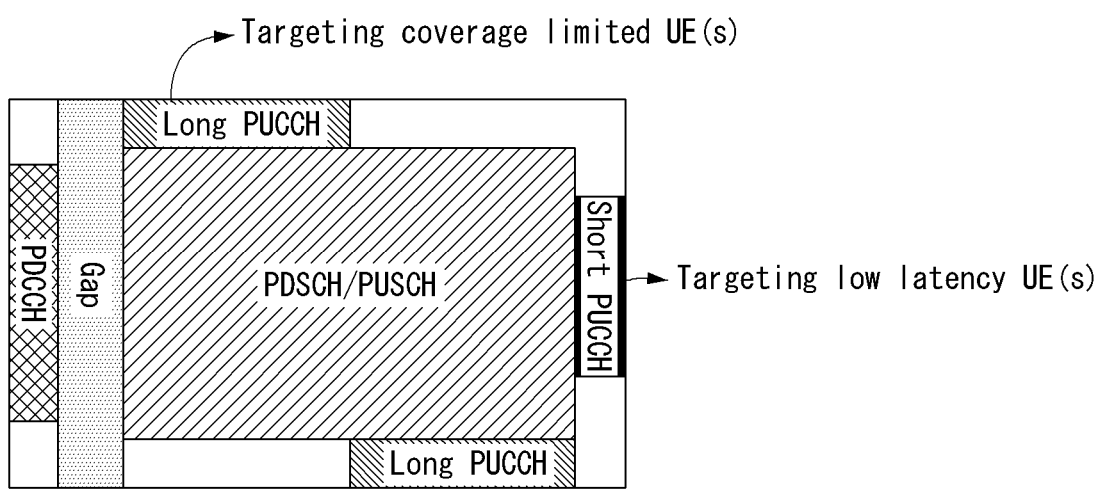

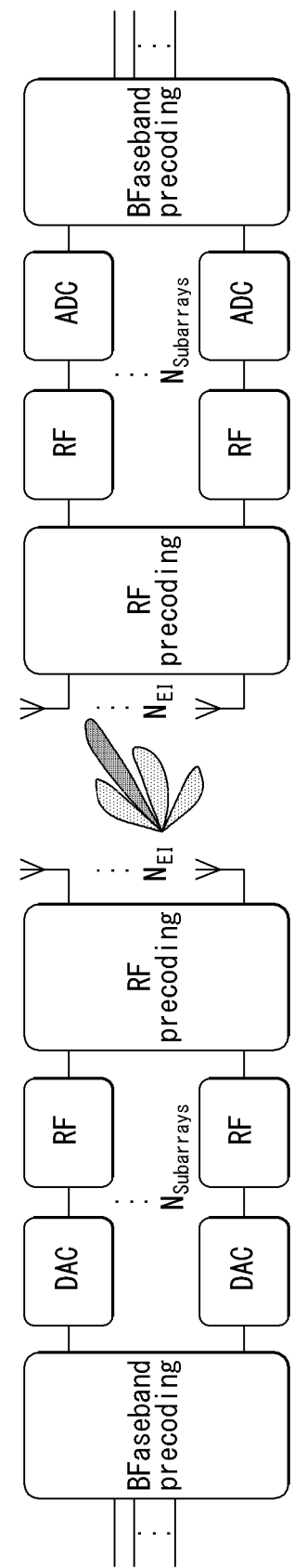
[FIG. 18]

[FIG. 19]
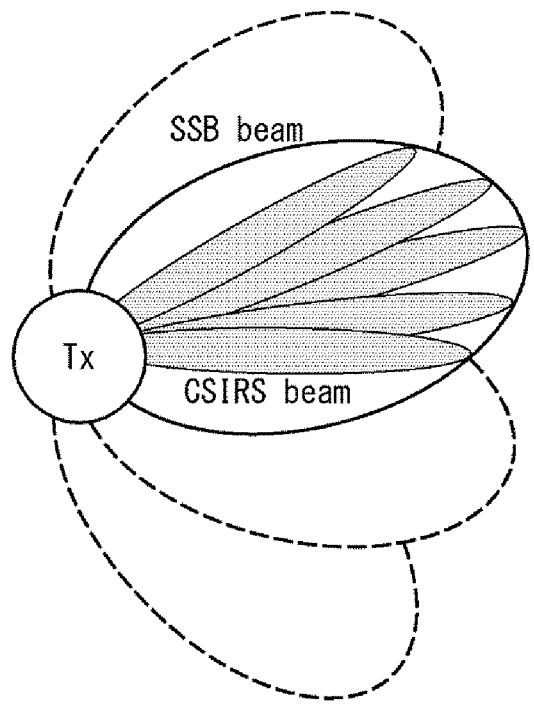
[FIG. 20]
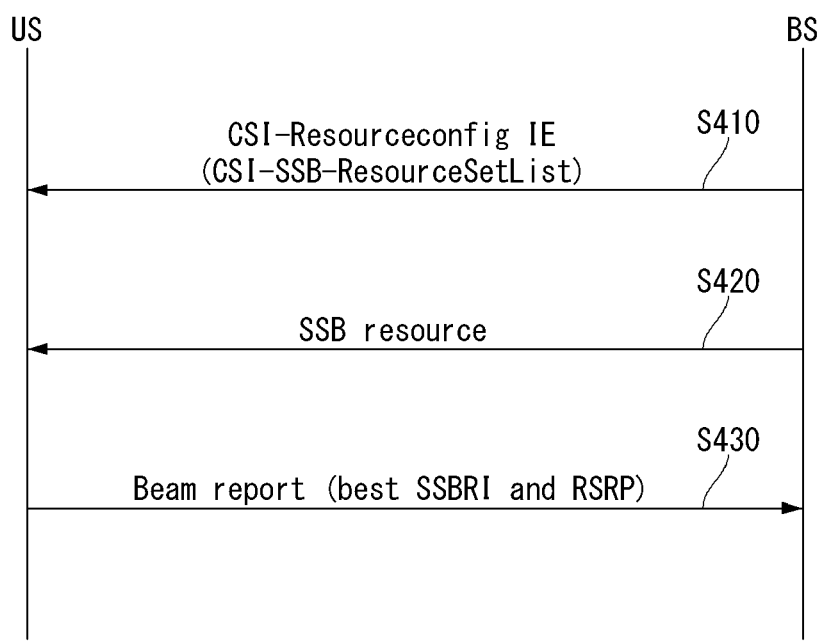

[FIG. 21]
(a)
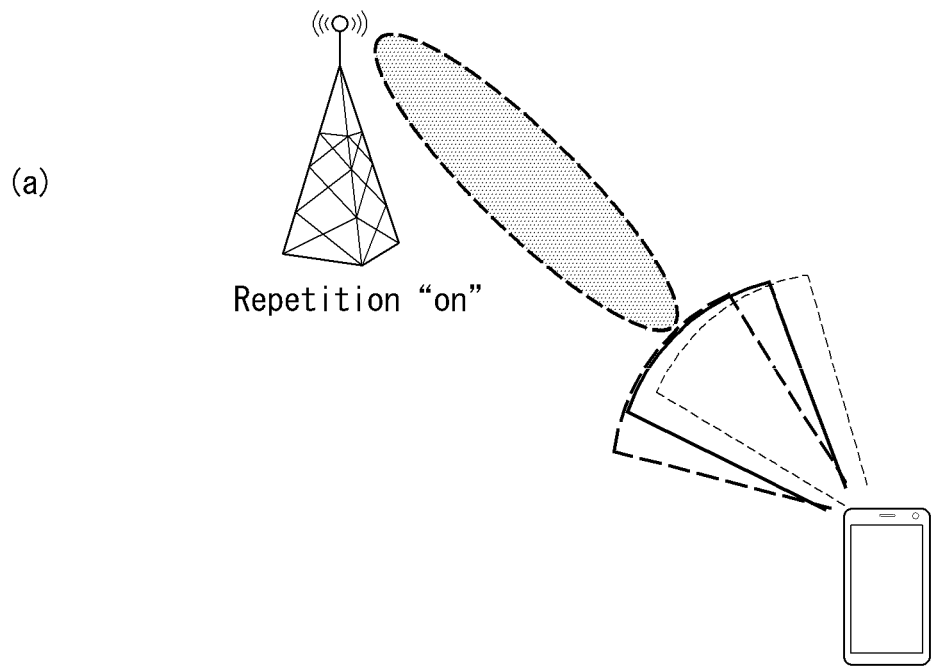
(b)
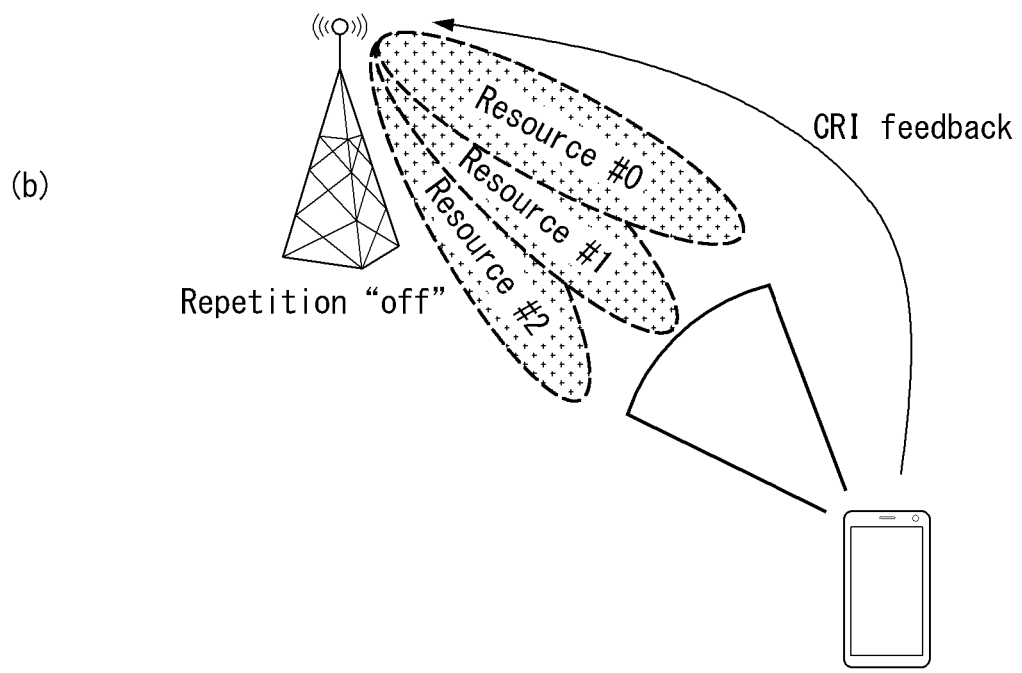

[FIG. 22]
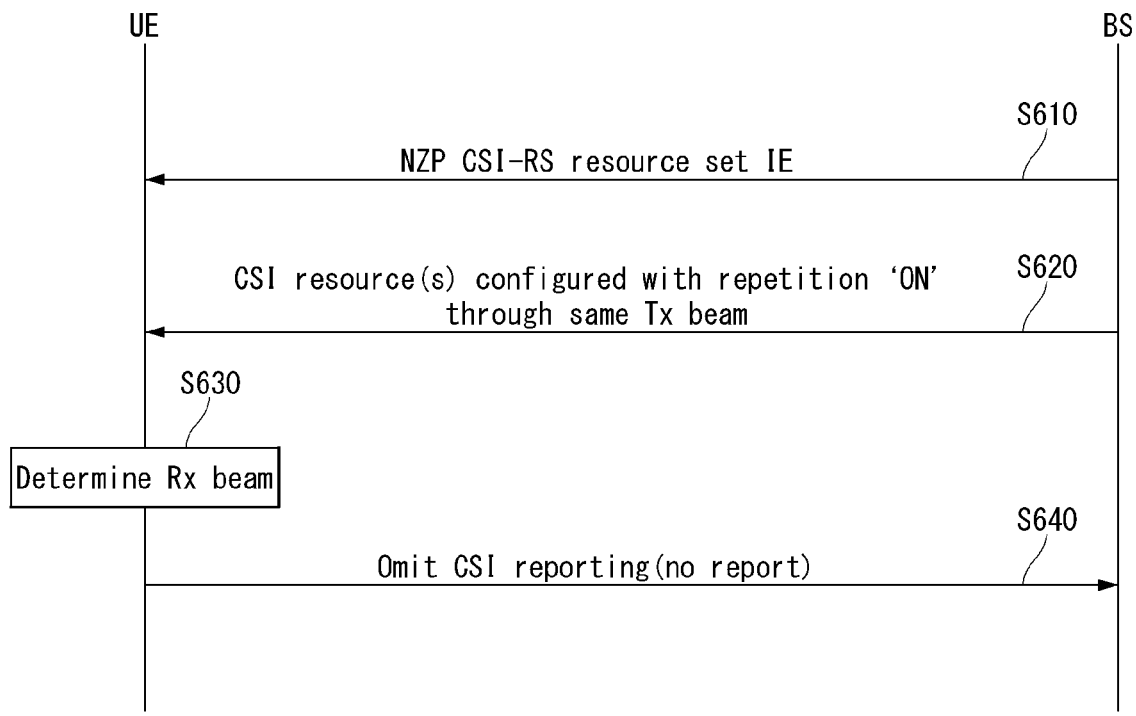
[FIG. 23]
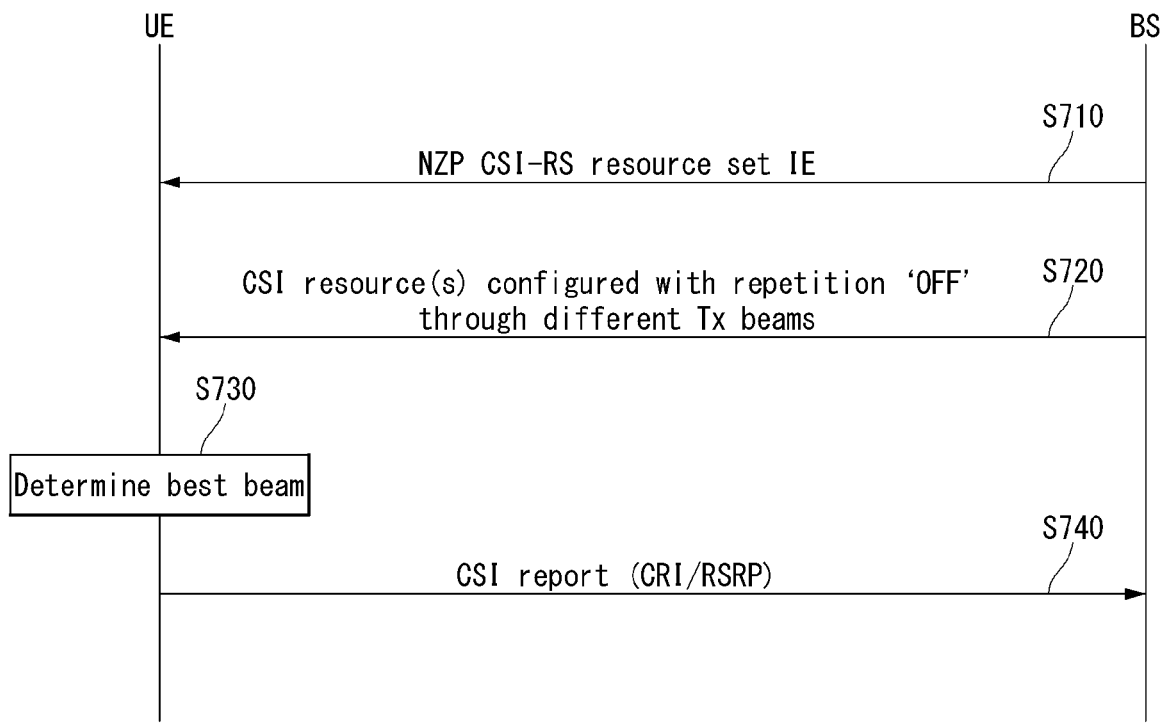

[FIG. 24]
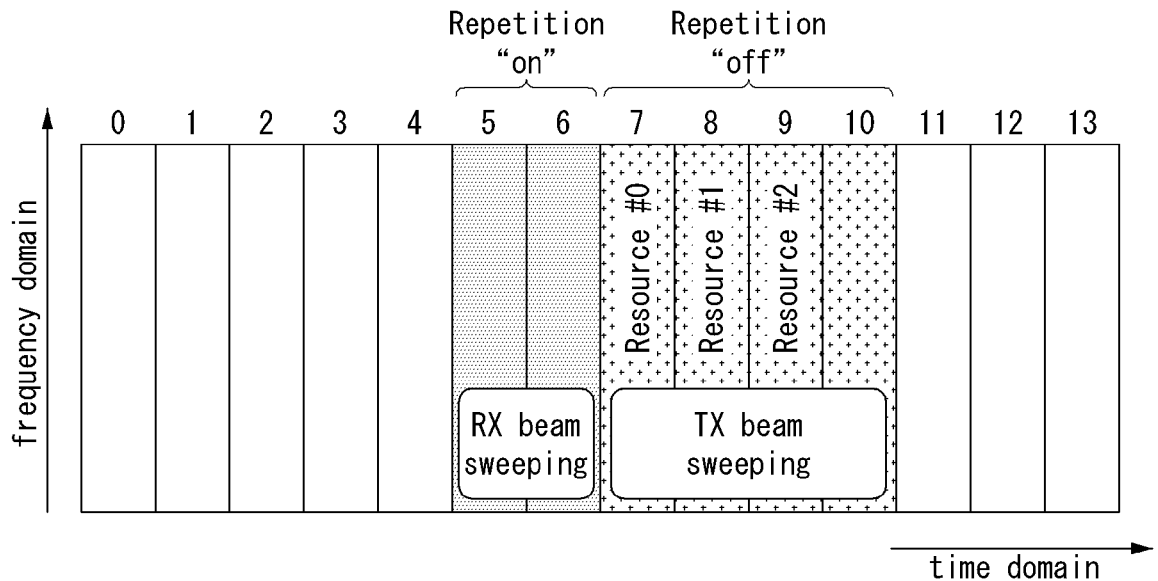
[FIG. 25]
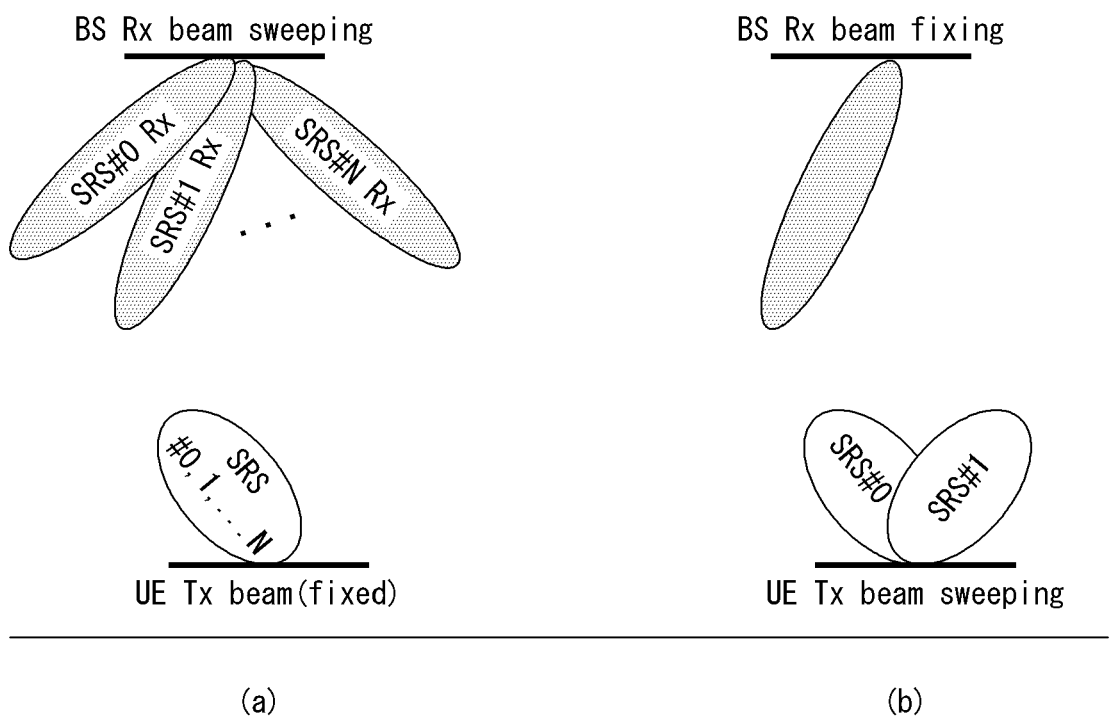

[FIG. 26]
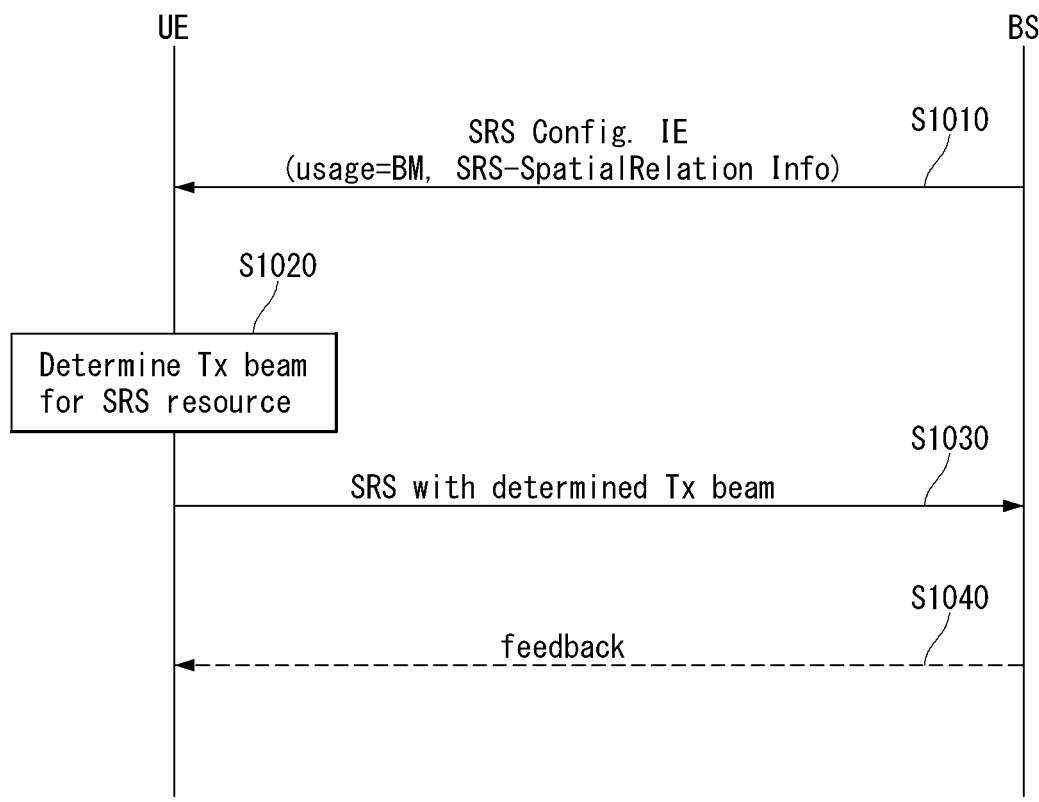

[FIG. 27]
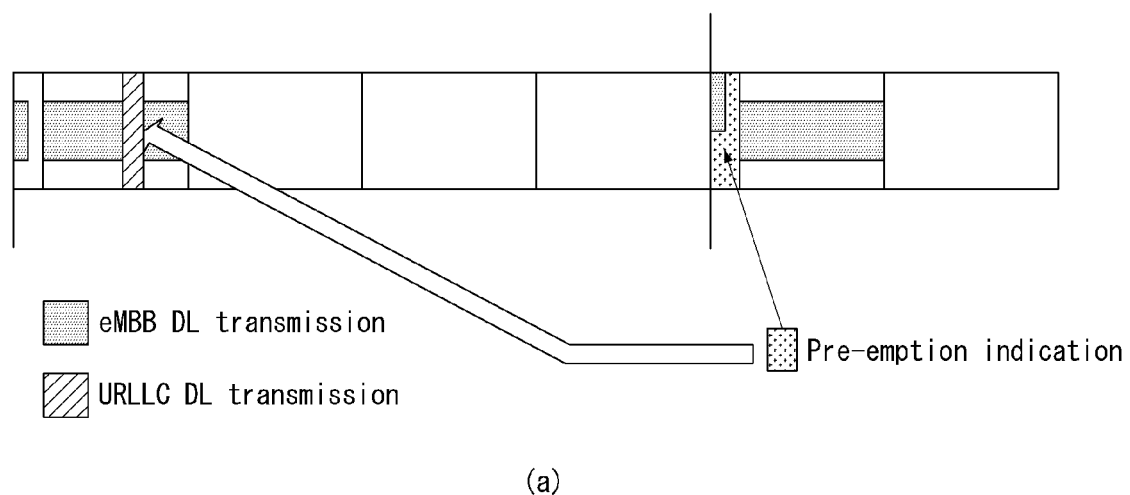
(a)
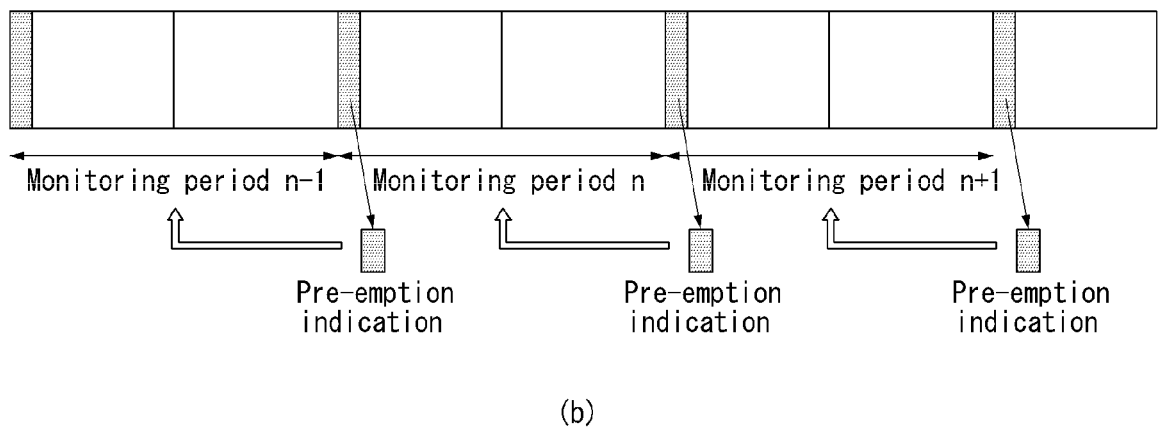
(b)

[FIG. 28]
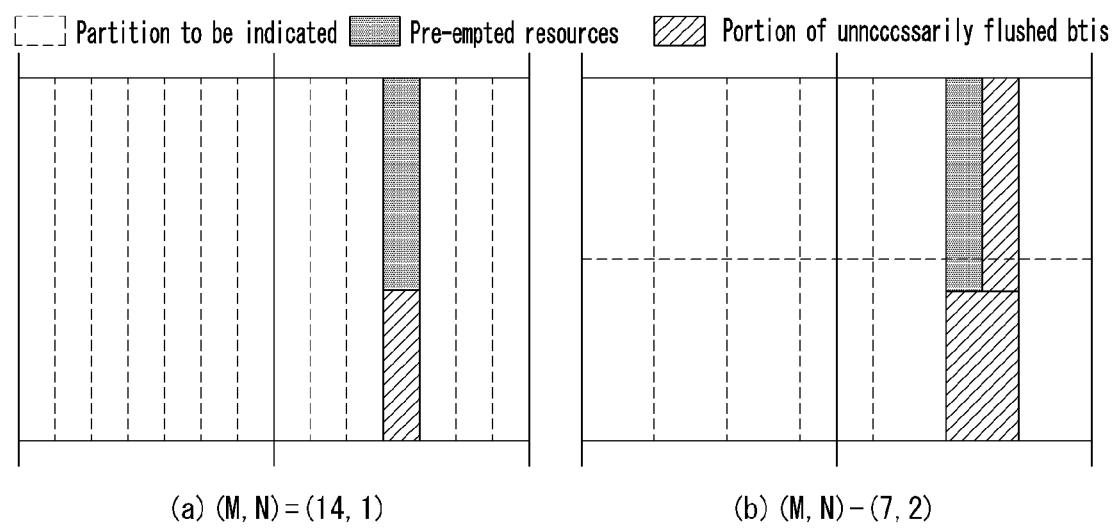

[FIG. 29]
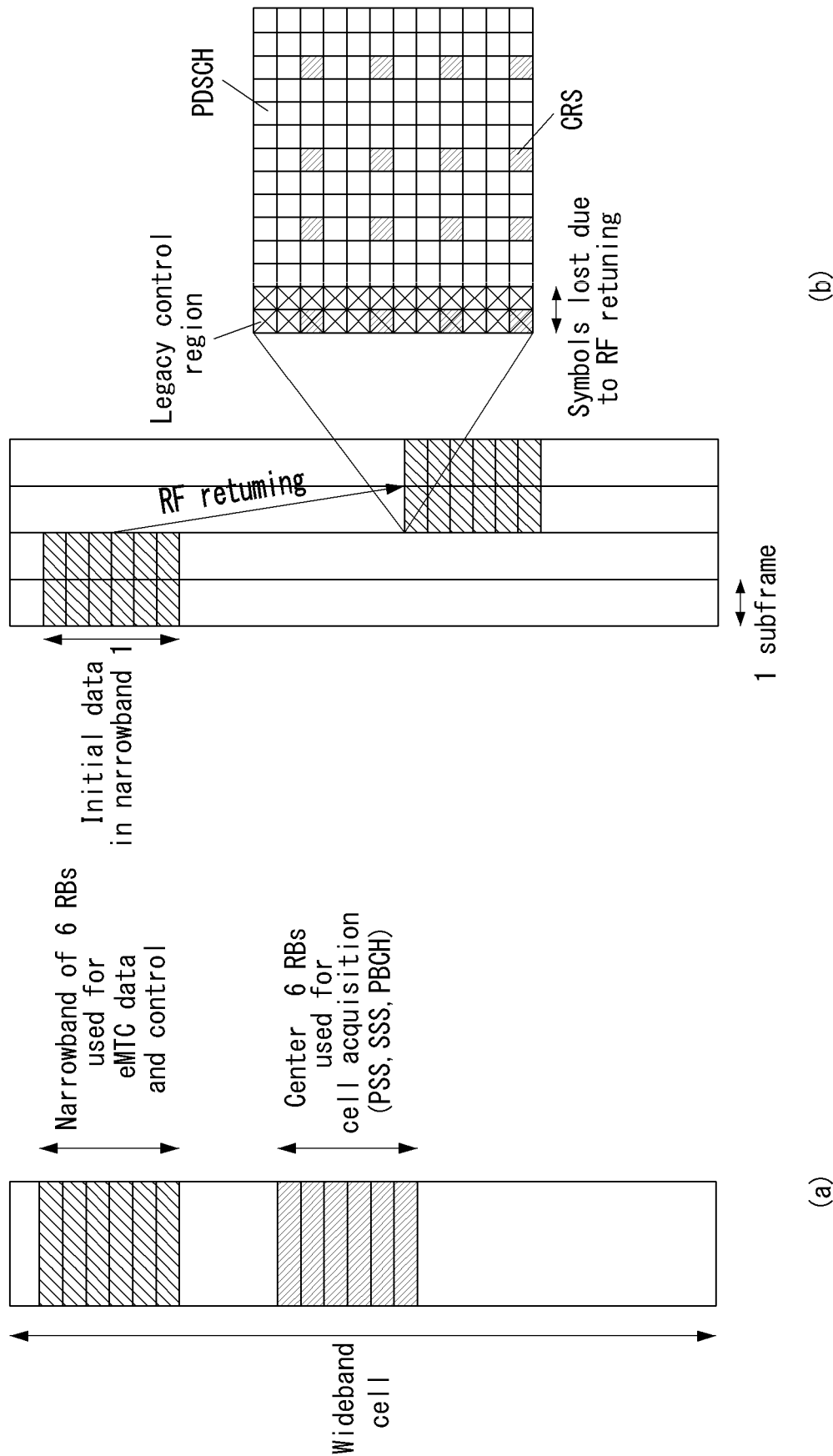

[FIG. 30]
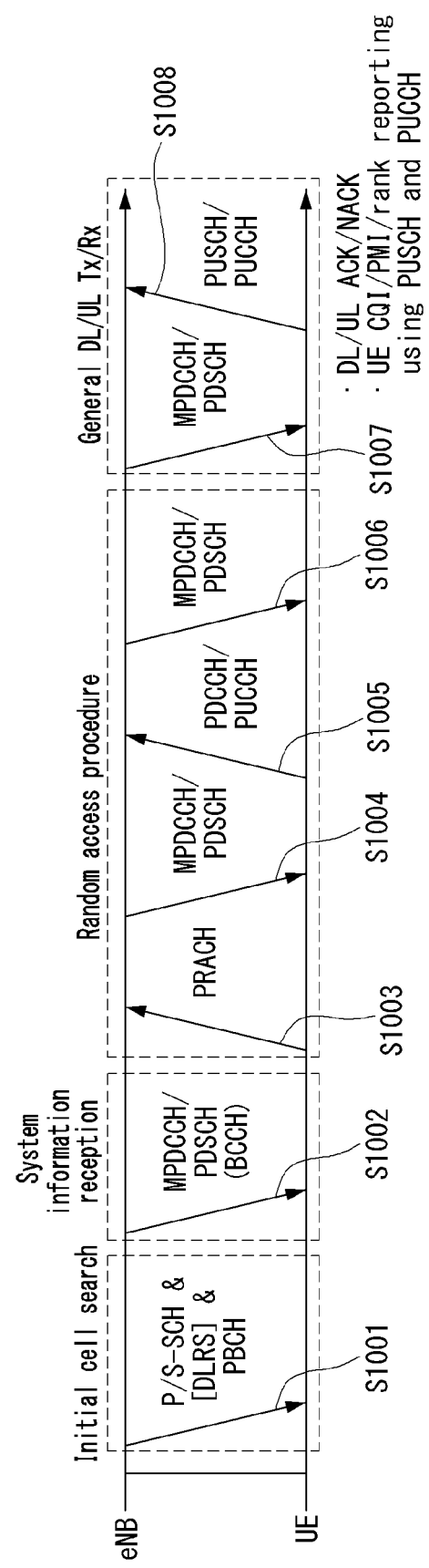

[FIG. 31]
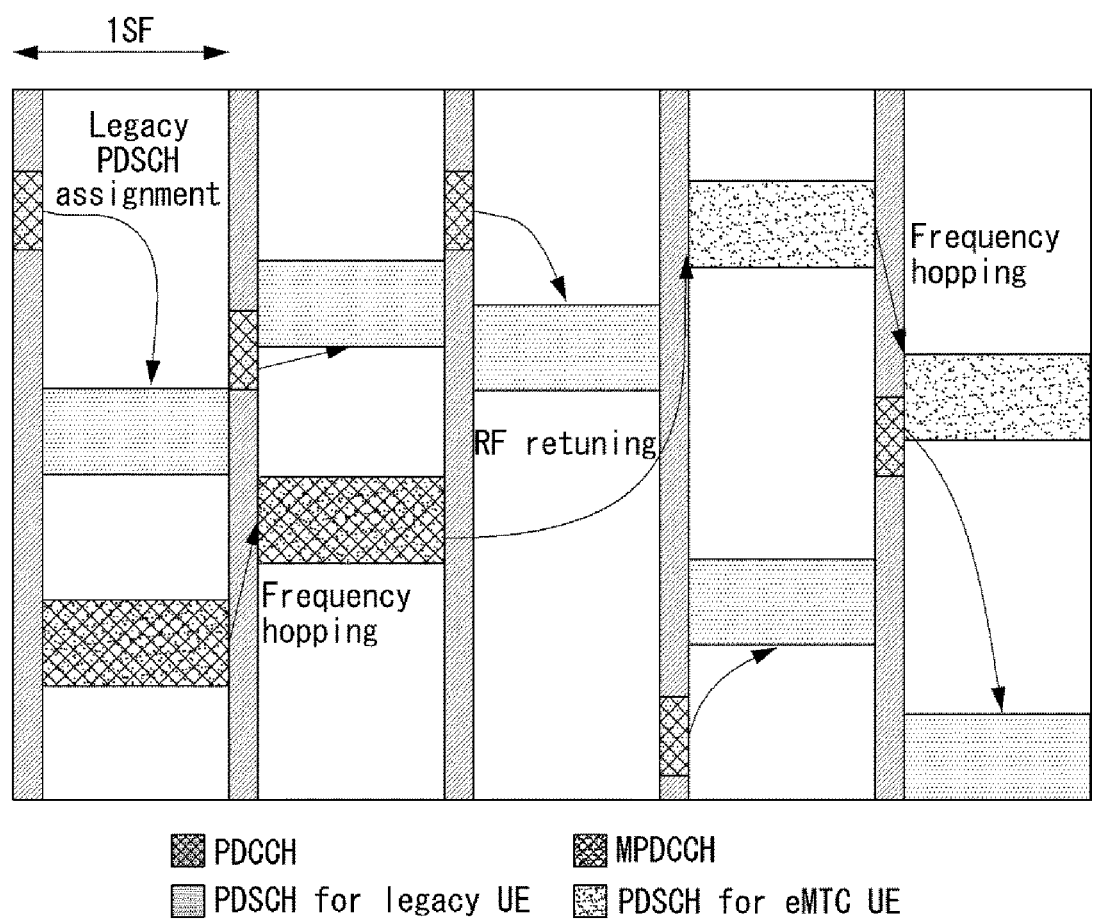

【FIG. 32】
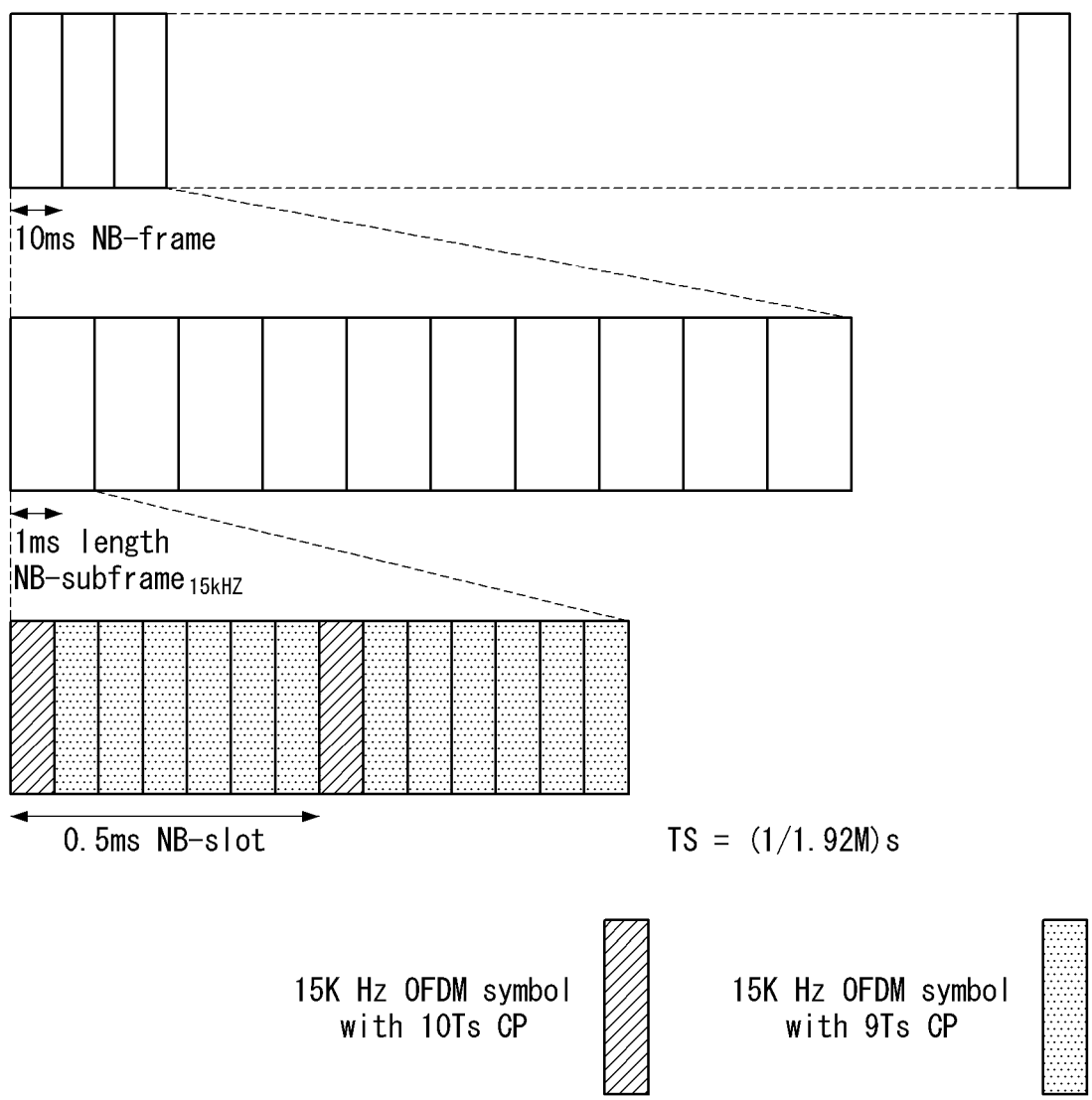

[FIG. 33]
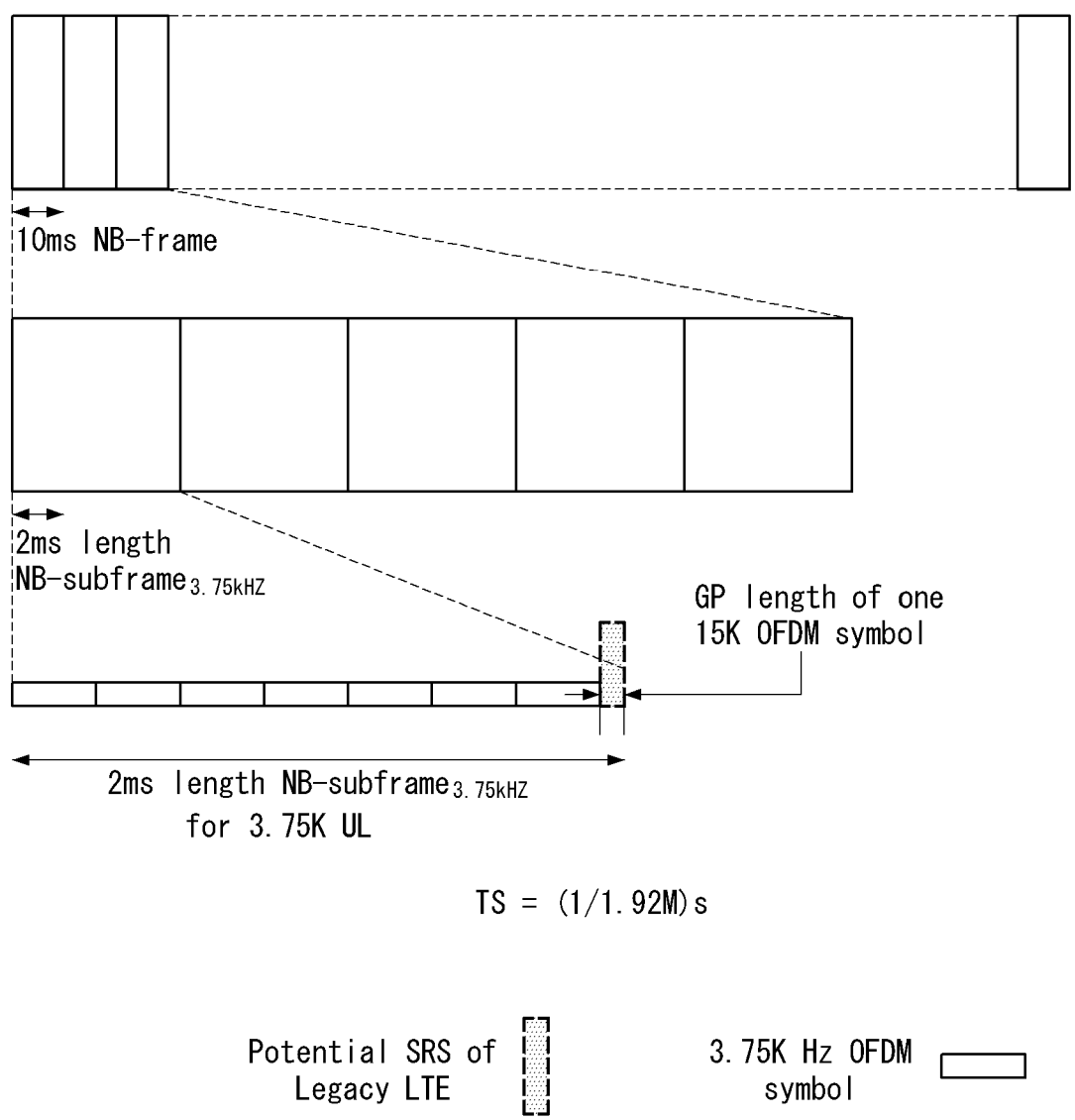

[FIG. 34]
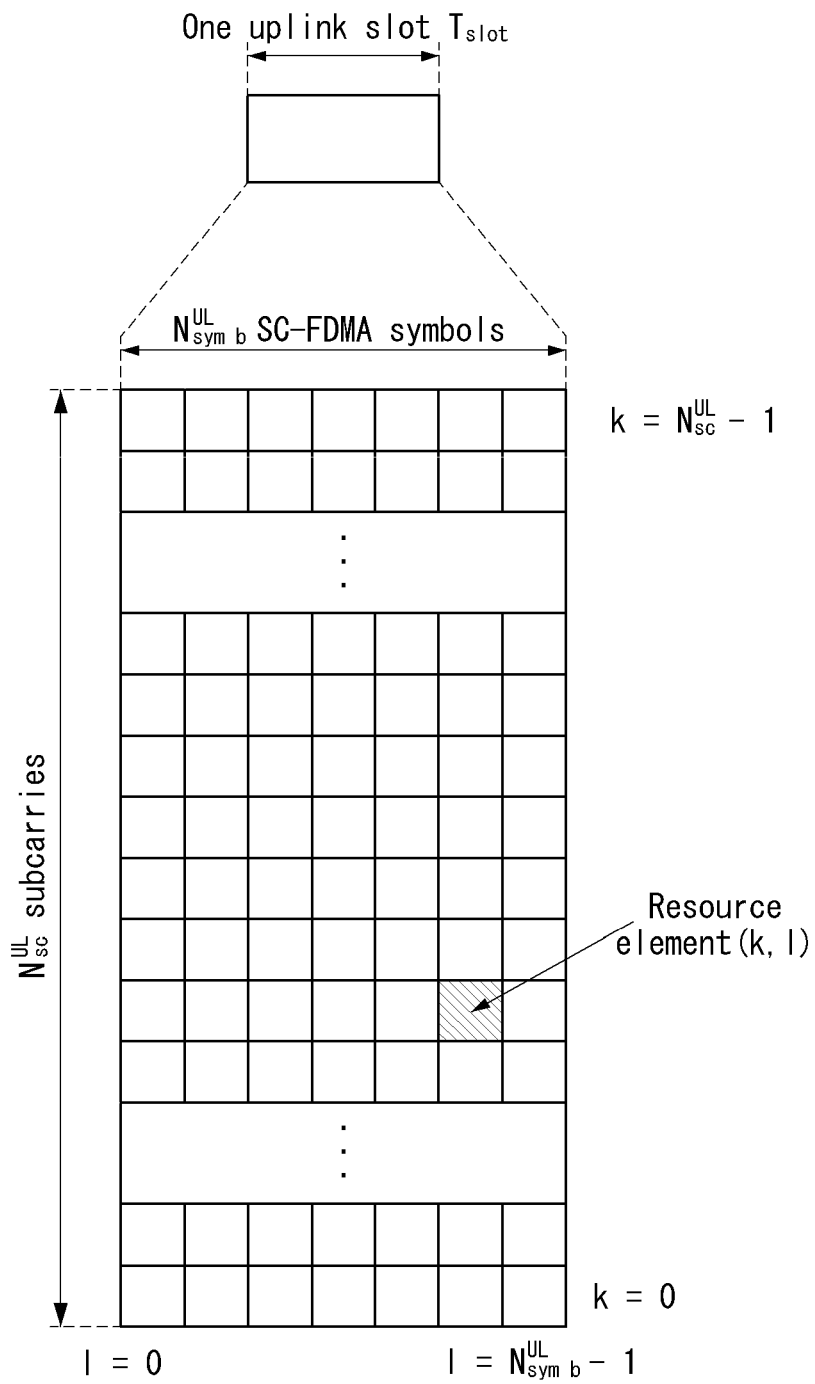

[FIG. 35]
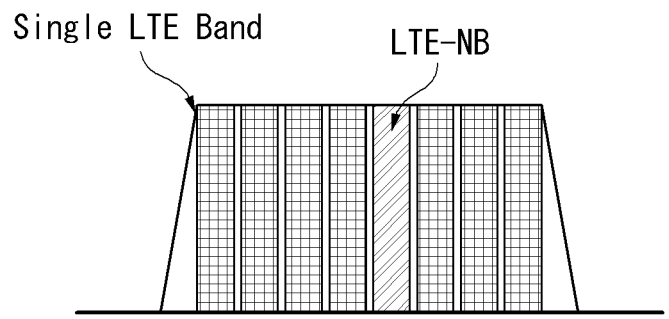
(a) In-band system
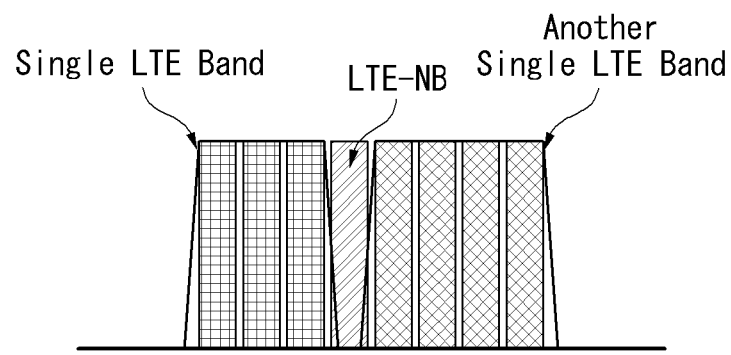
(b) Guard-band system
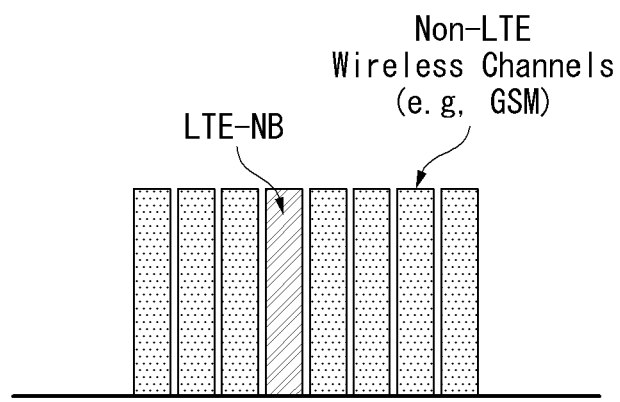
(c) Stand-alone system

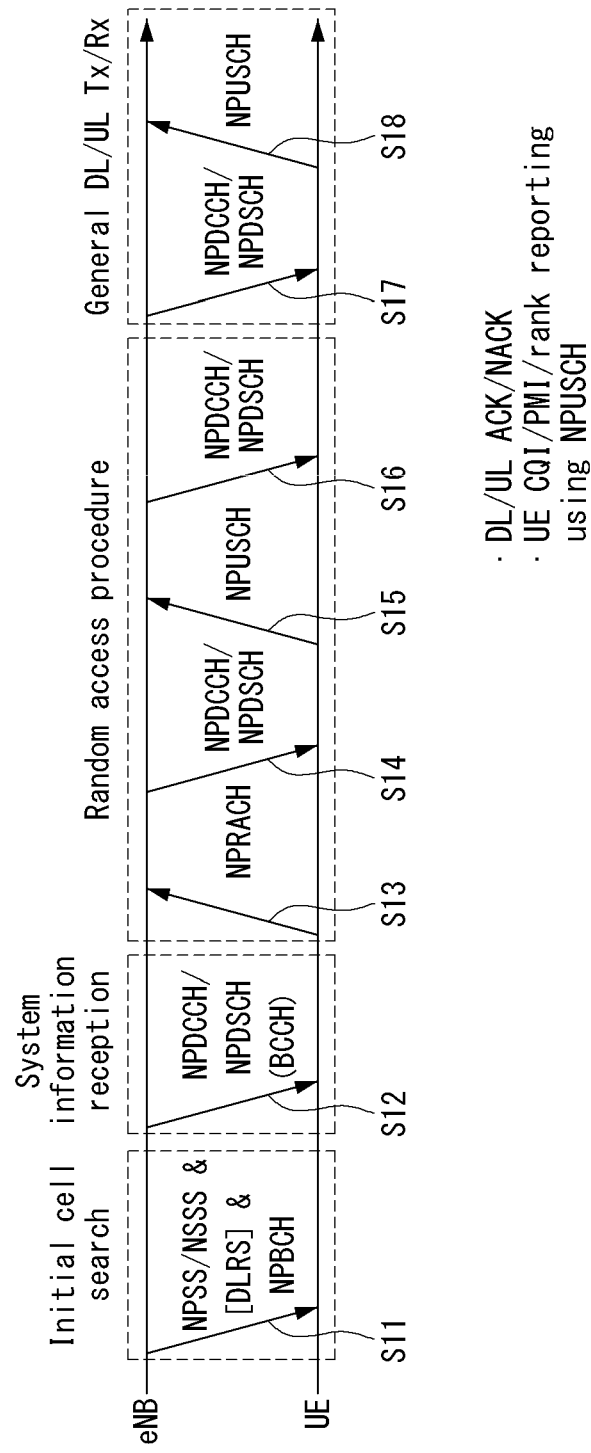
[FIG. 36]

[FIG. 37]
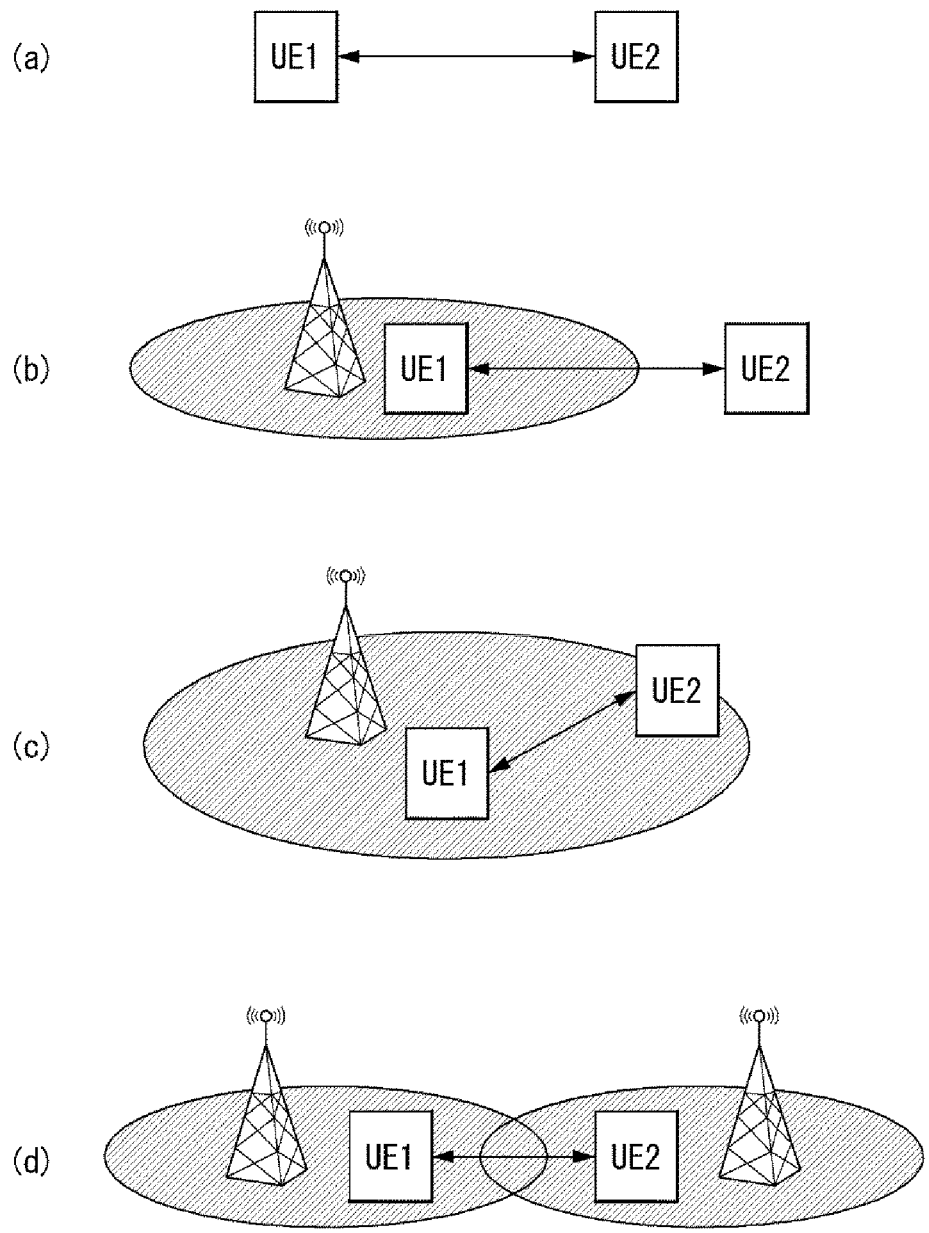

[FIG. 38]
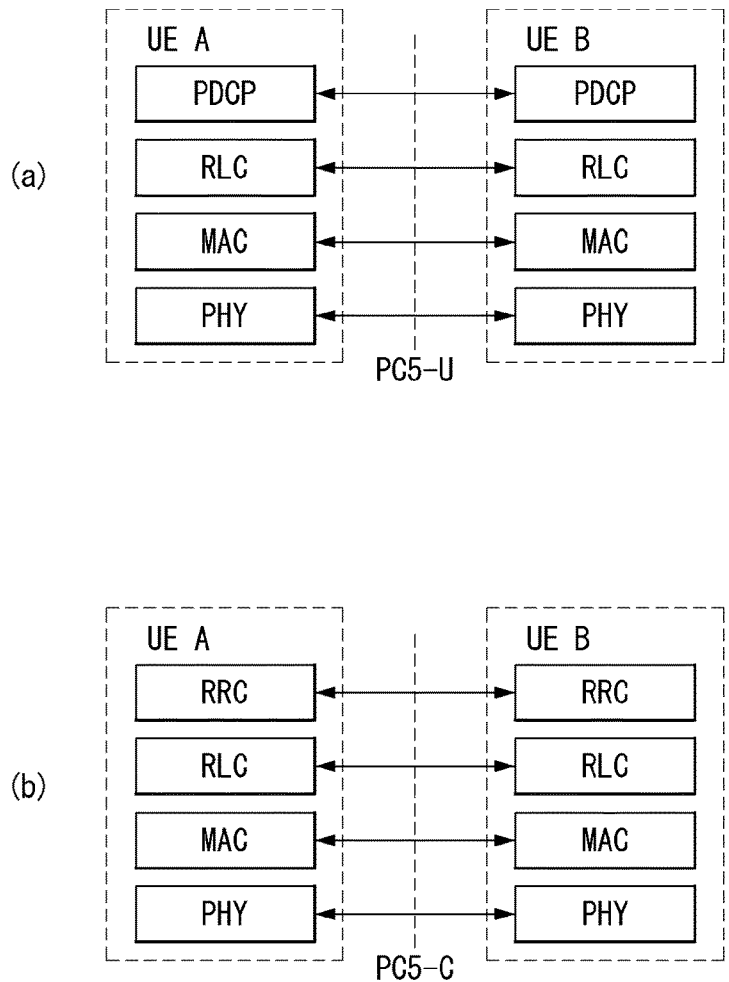
[FIG. 39]
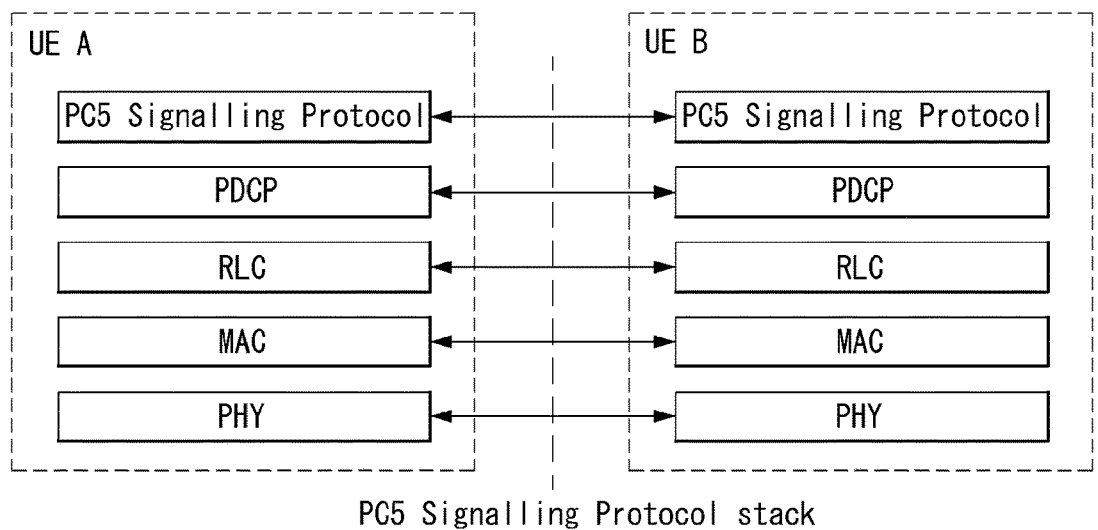
PC5 Signalling Protocol stack

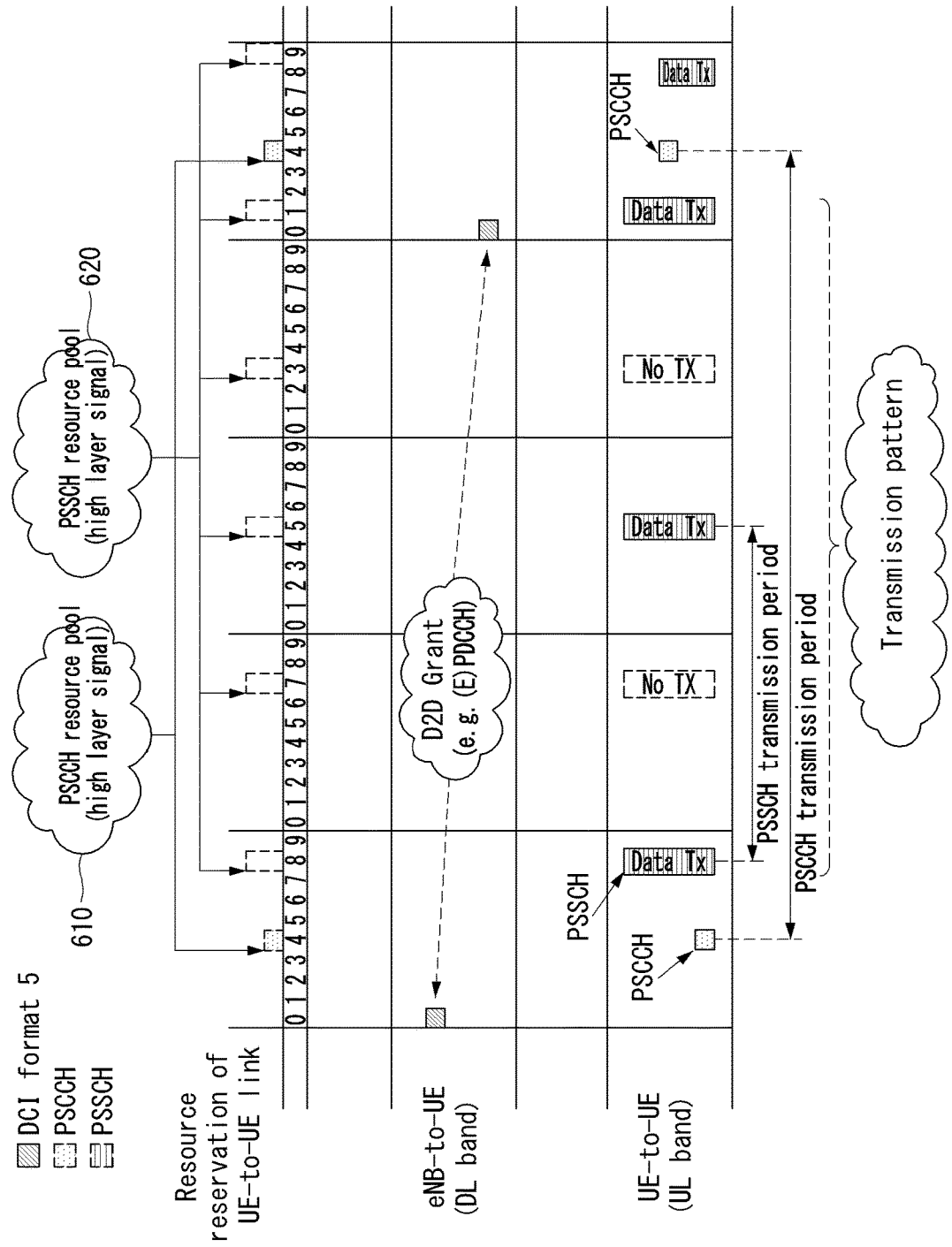

[FIG. 41]
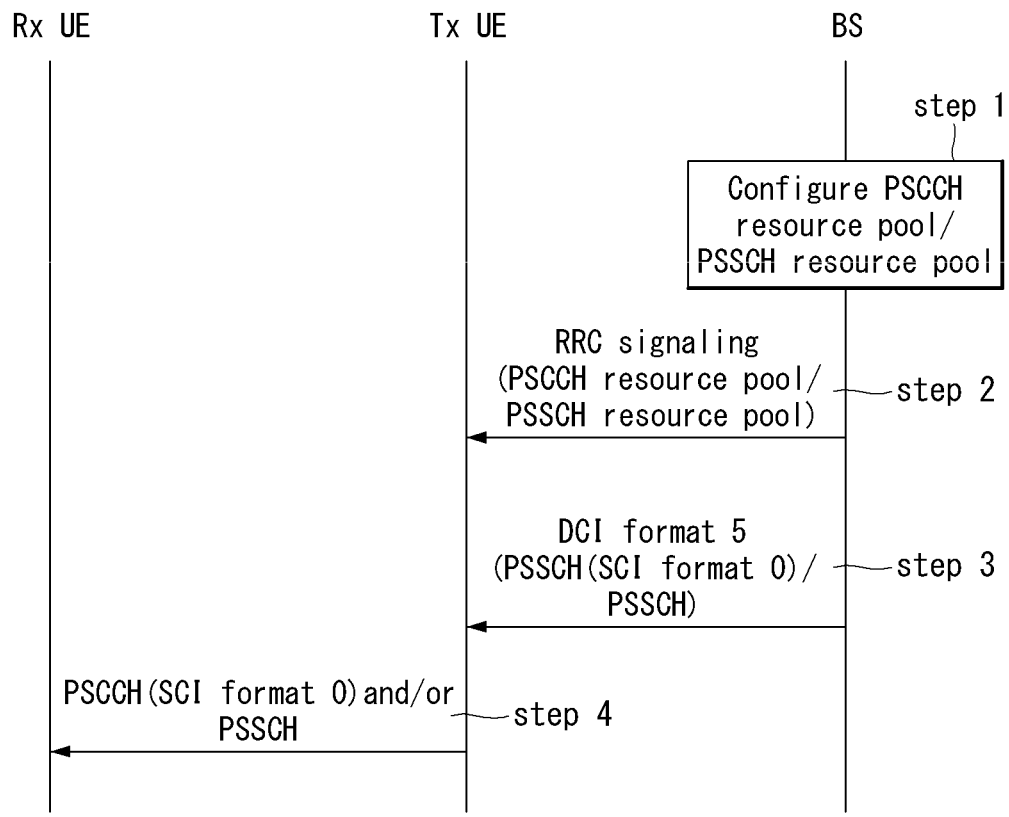
[FIG. 42]
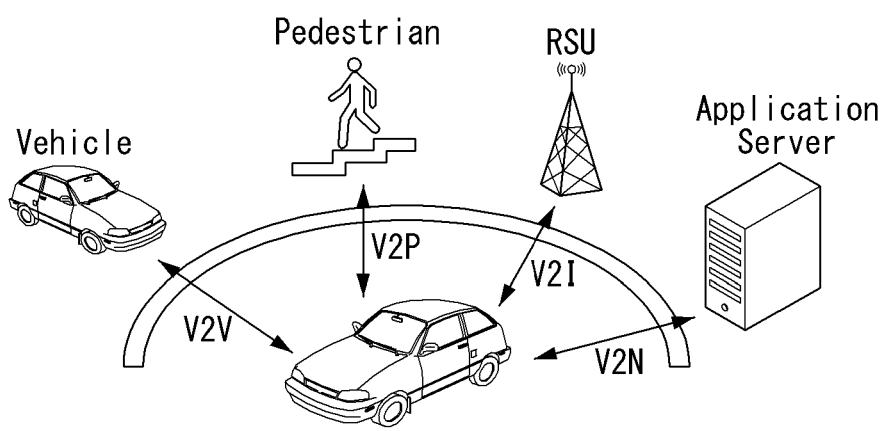

[FIG. 43]
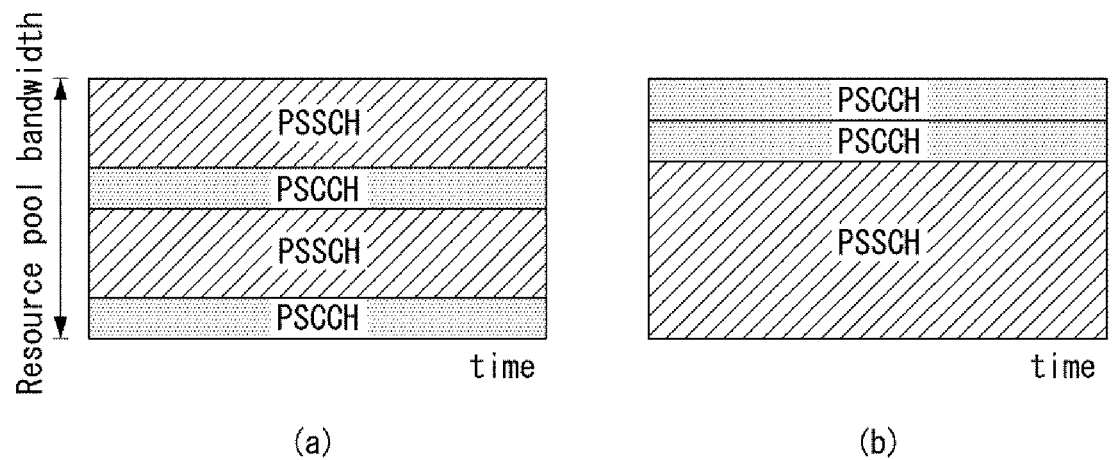
[FIG. 44]
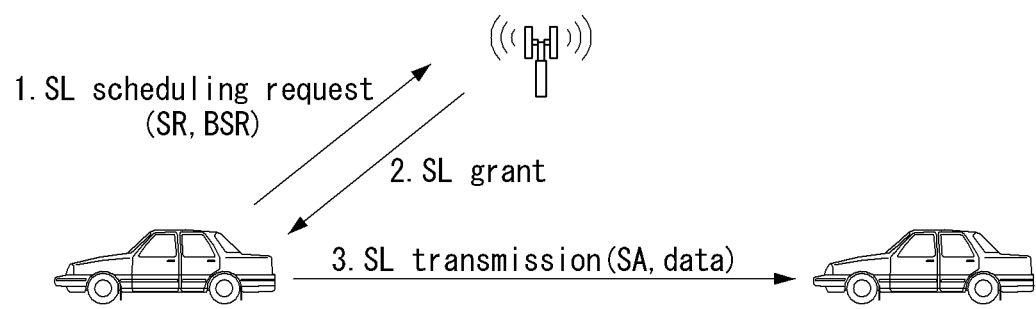

[FIG. 45]
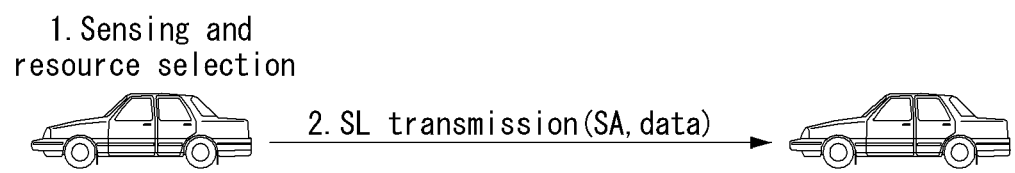
1. Sensing and resource selection
2. SL transmission(SA, data)
[FIG. 46]
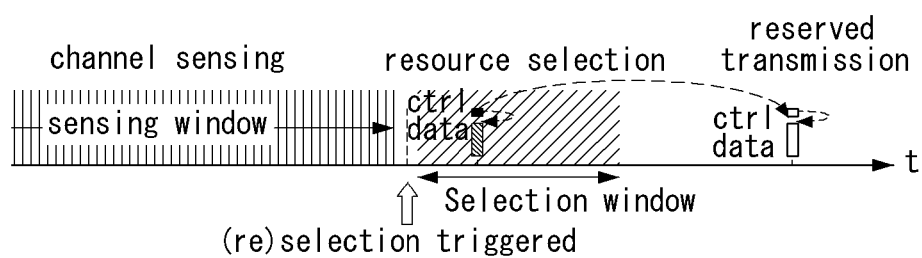

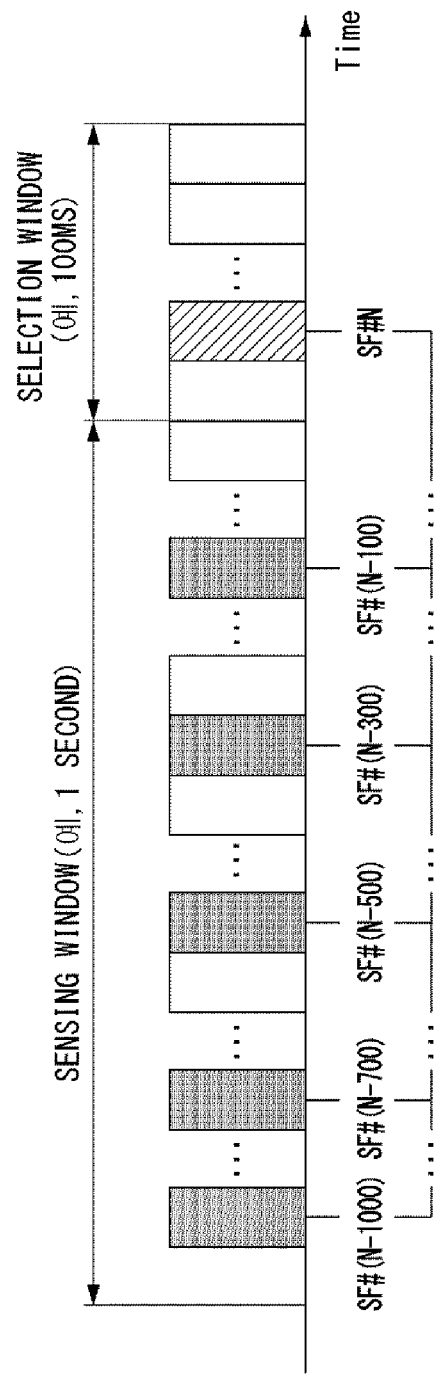
[FIG. 47]

[FIG. 48]
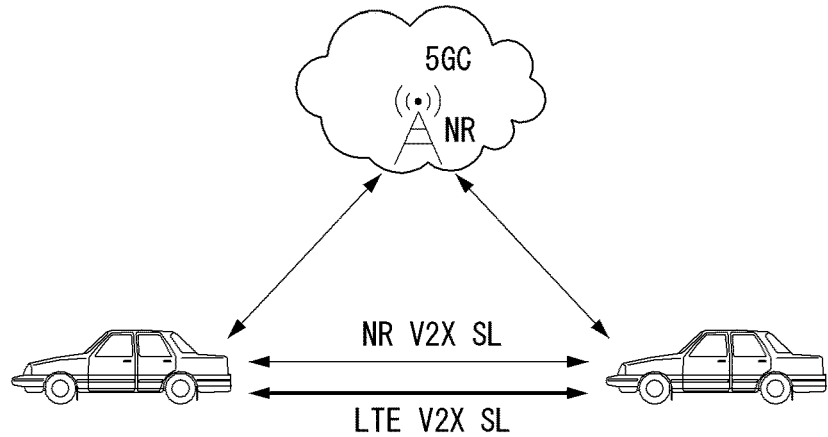
[FIG. 49]
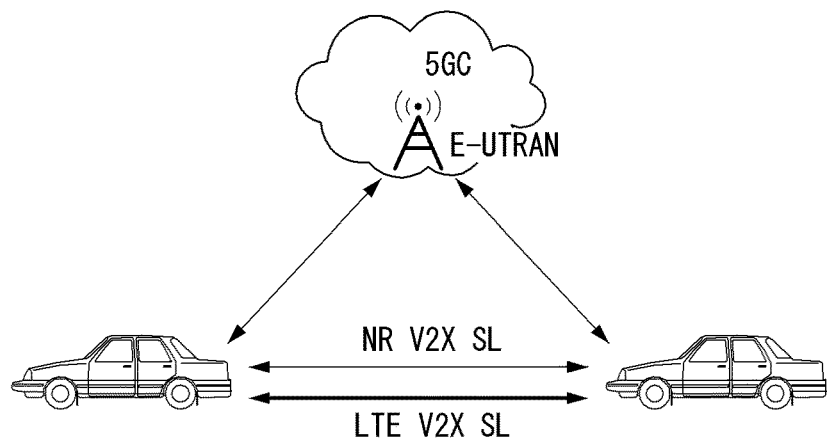
[FIG. 50]
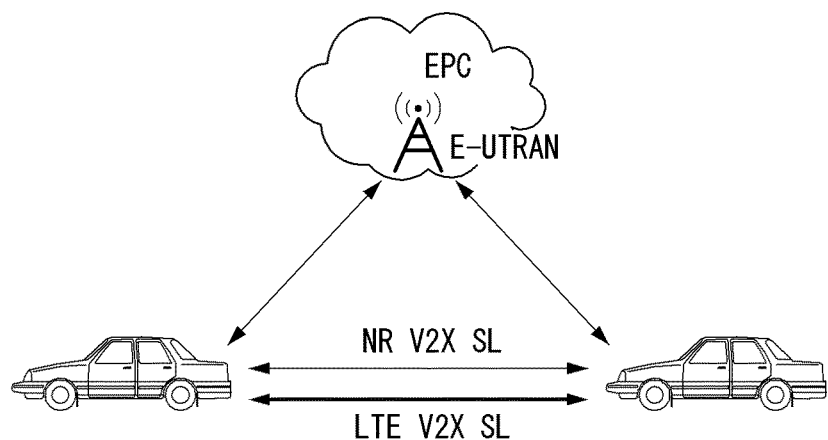

[FIG. 51]
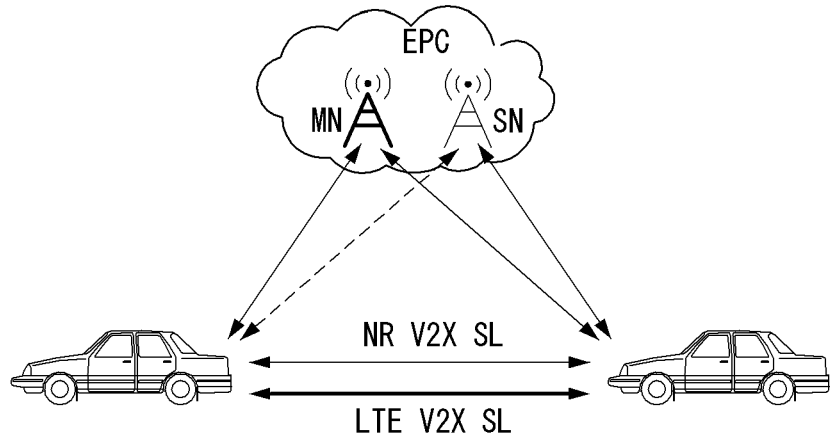
[FIG. 52]
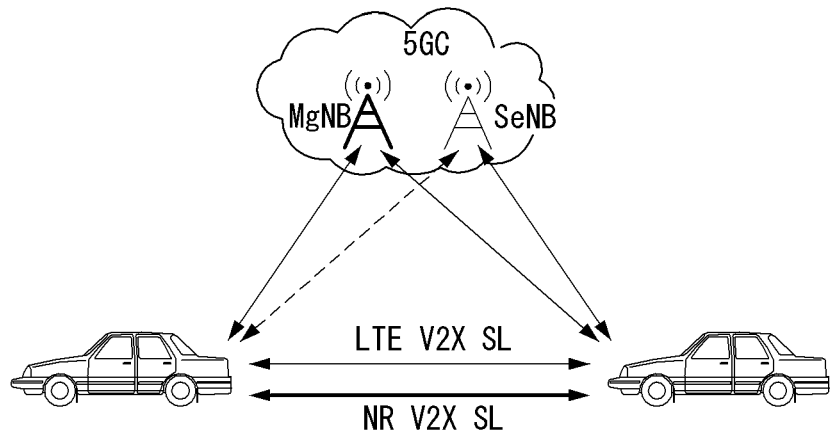
[FIG. 53]
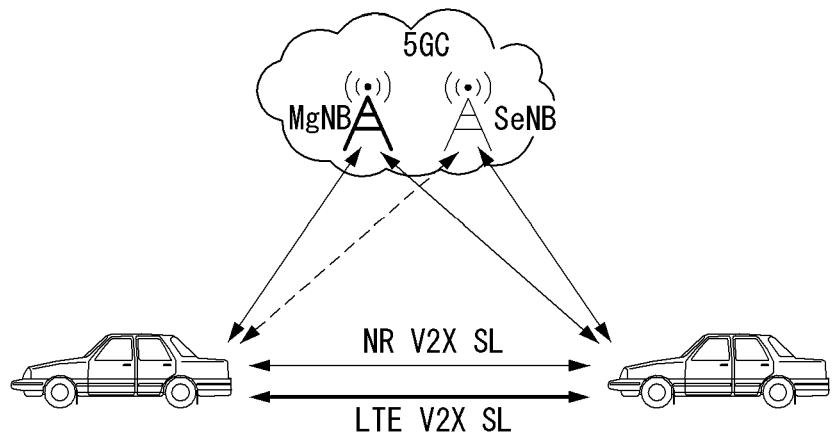

[FIG. 54]
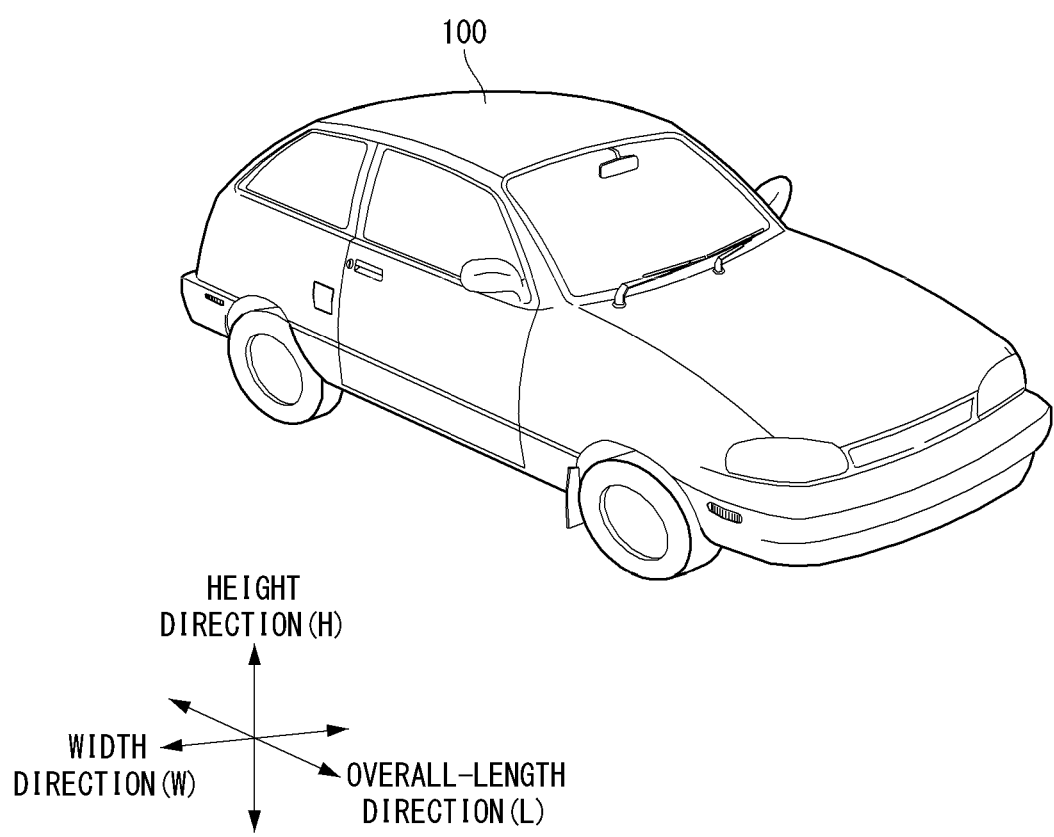

[FIG. 55]
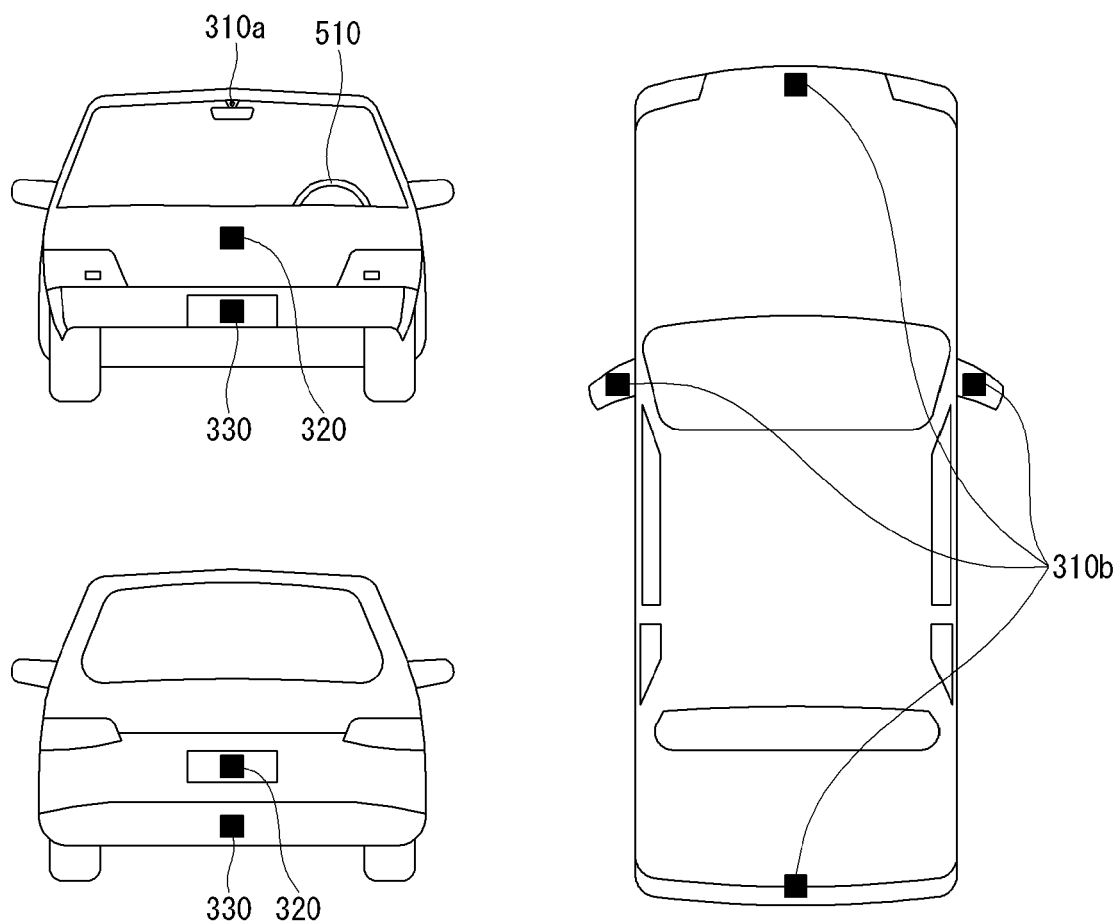

[FIG. 56]
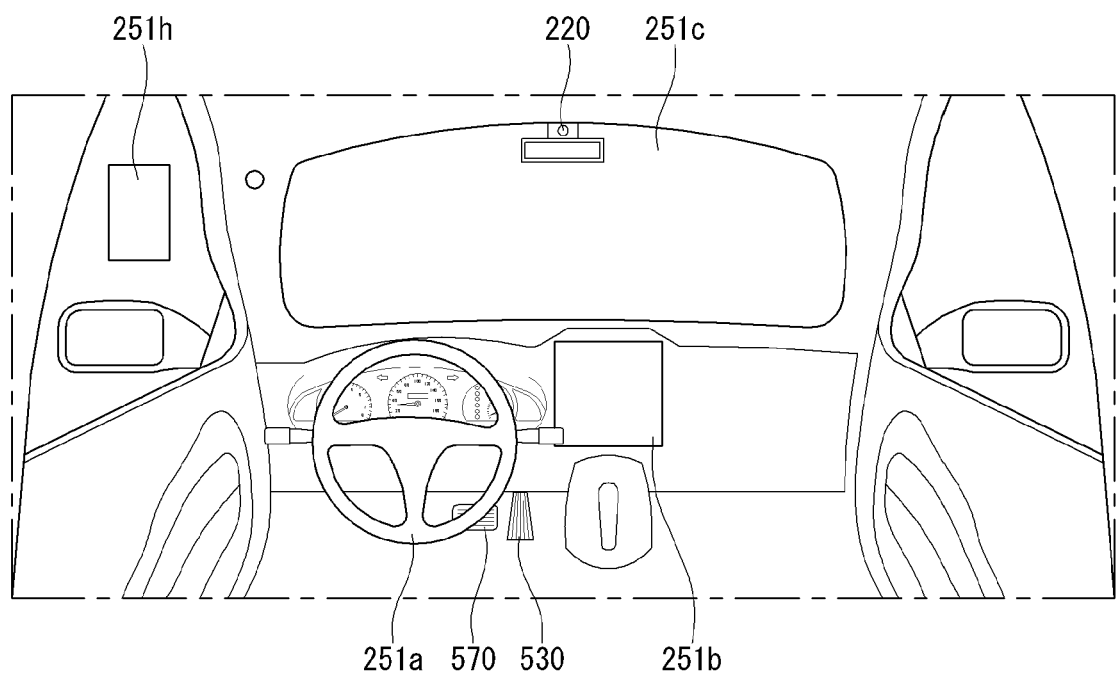

【FIG. 57】
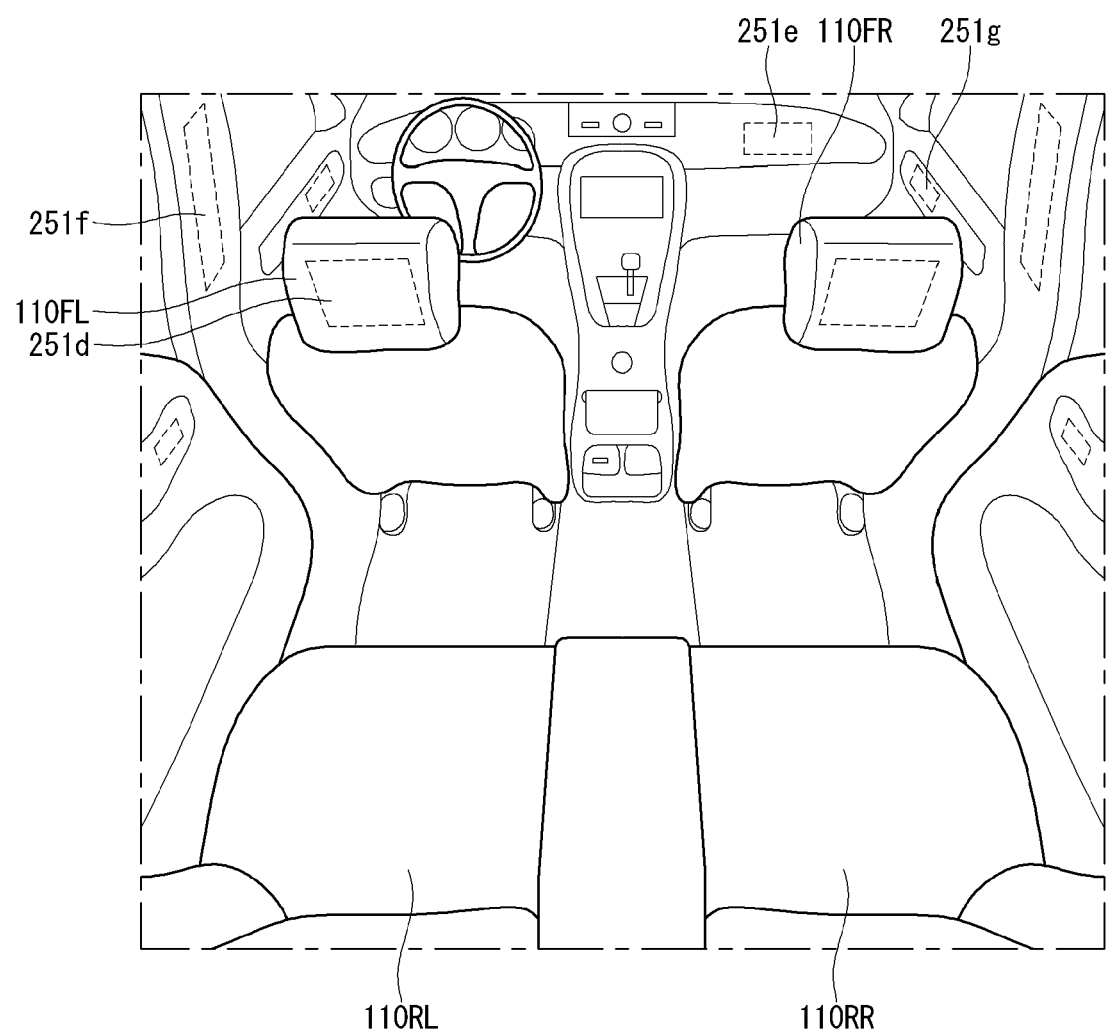

[FIG. 58]
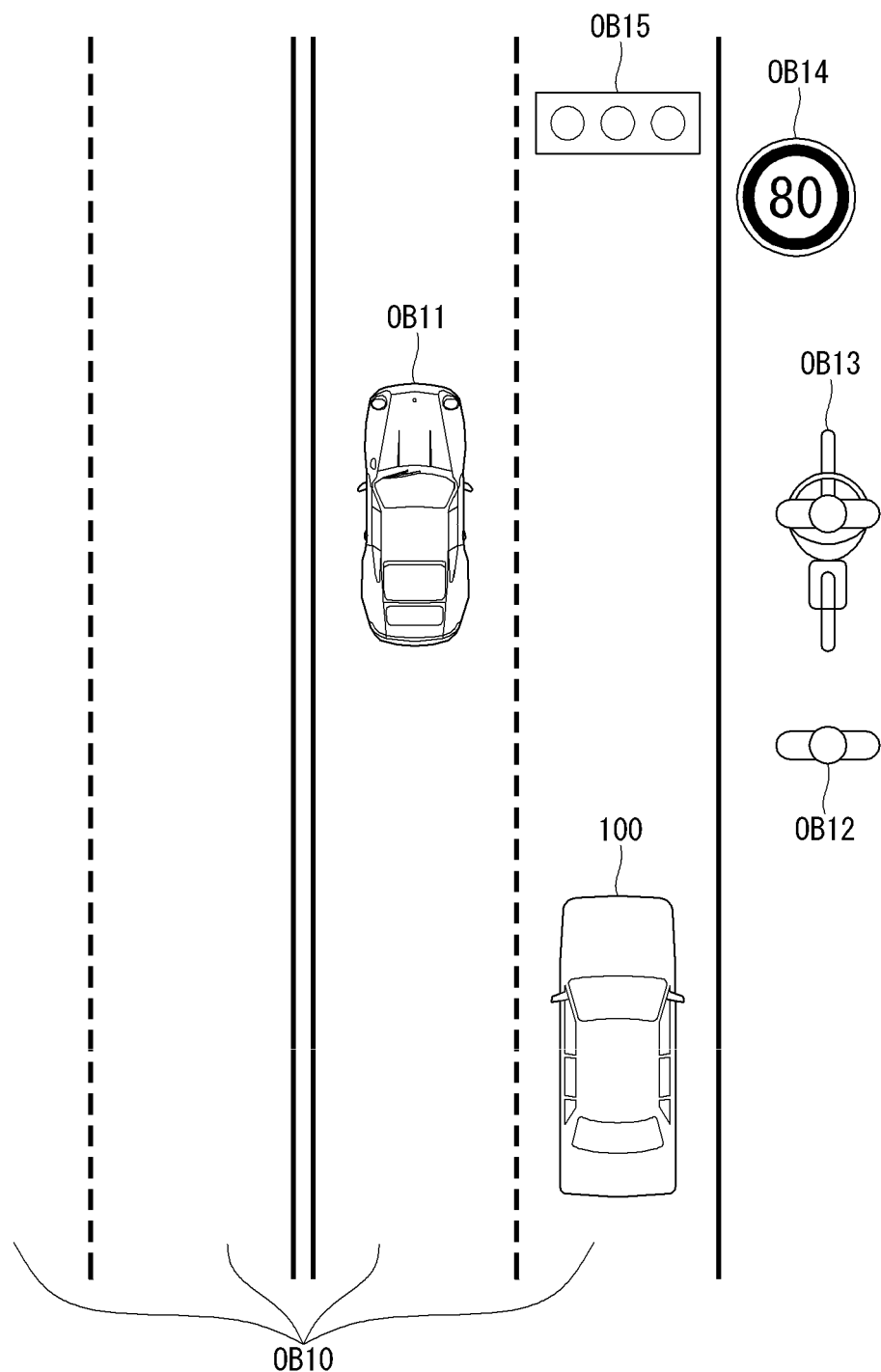

[FIG. 59]
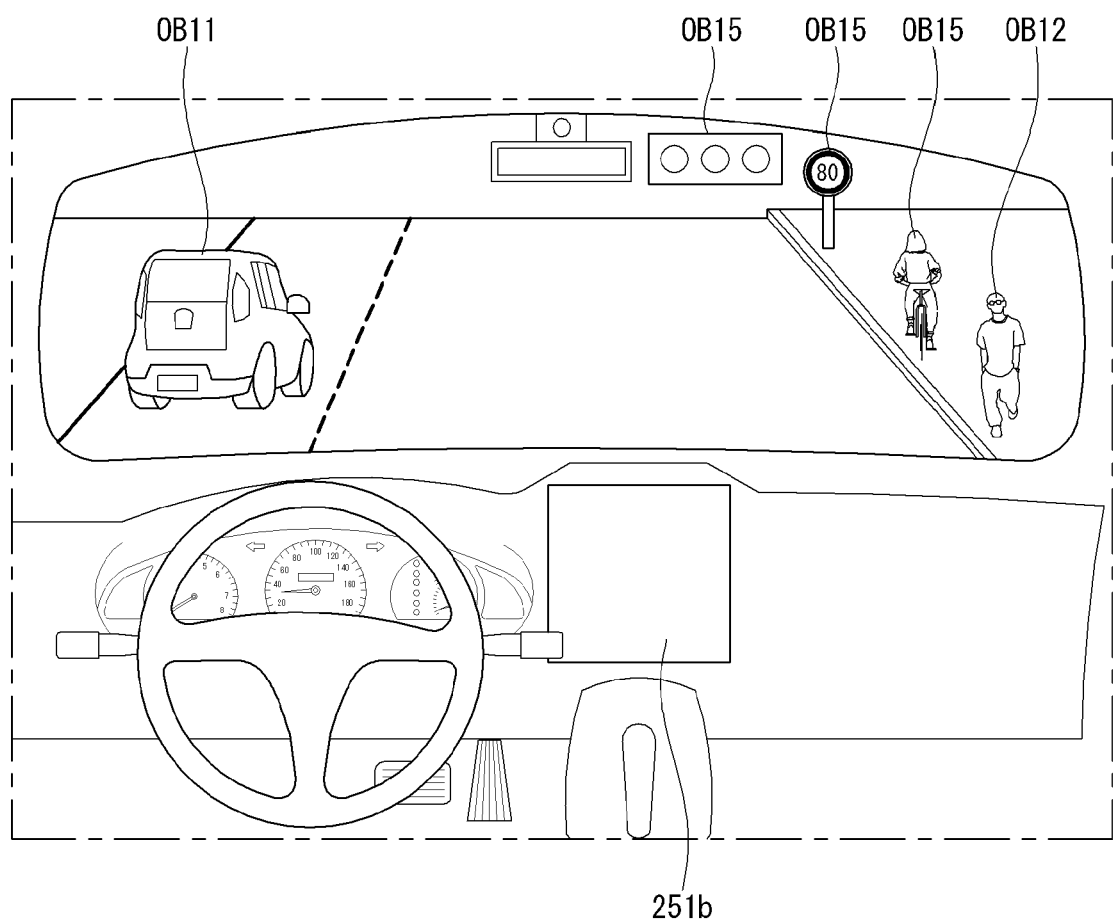

[FIG. 60]
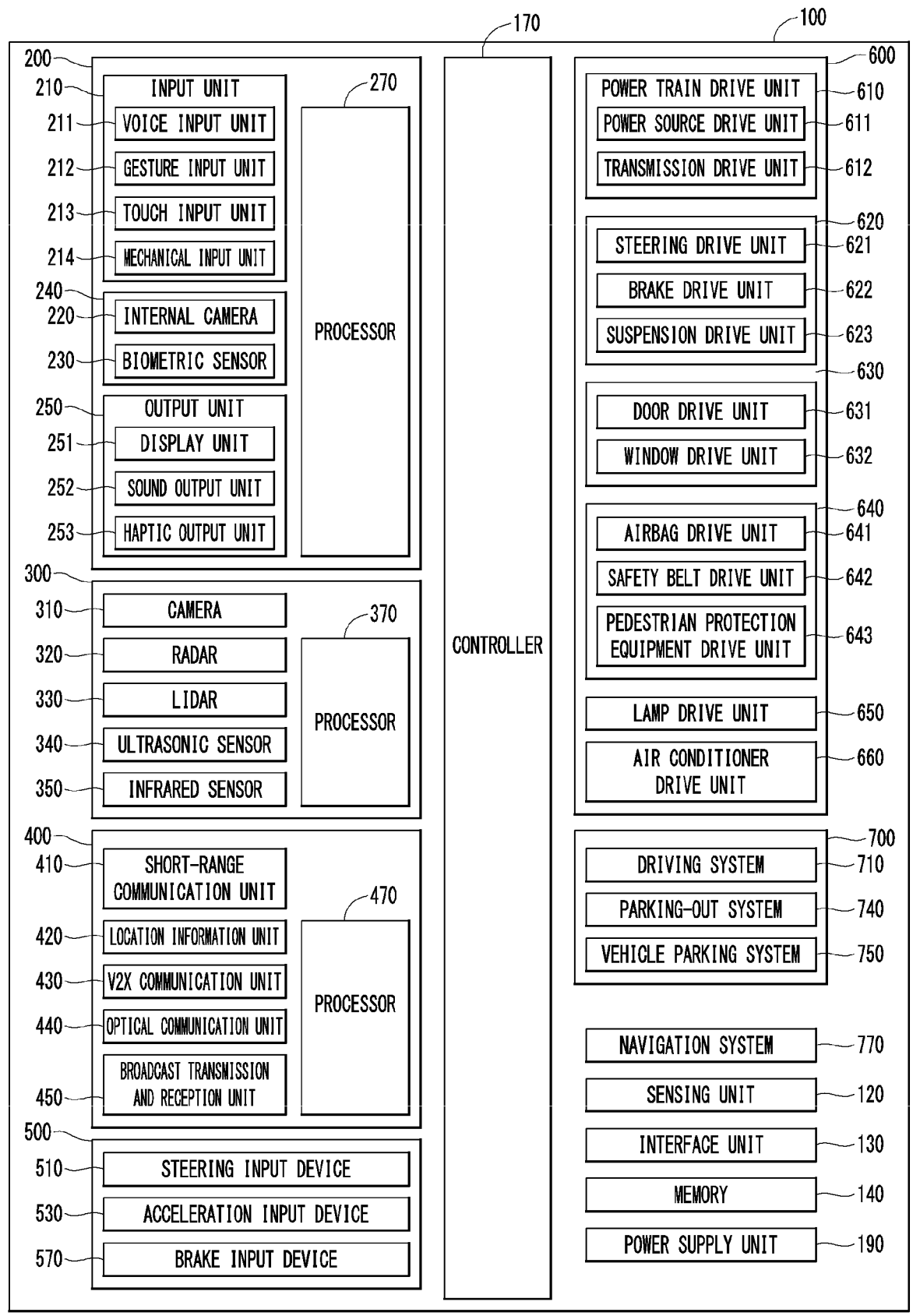

【FIG. 61】
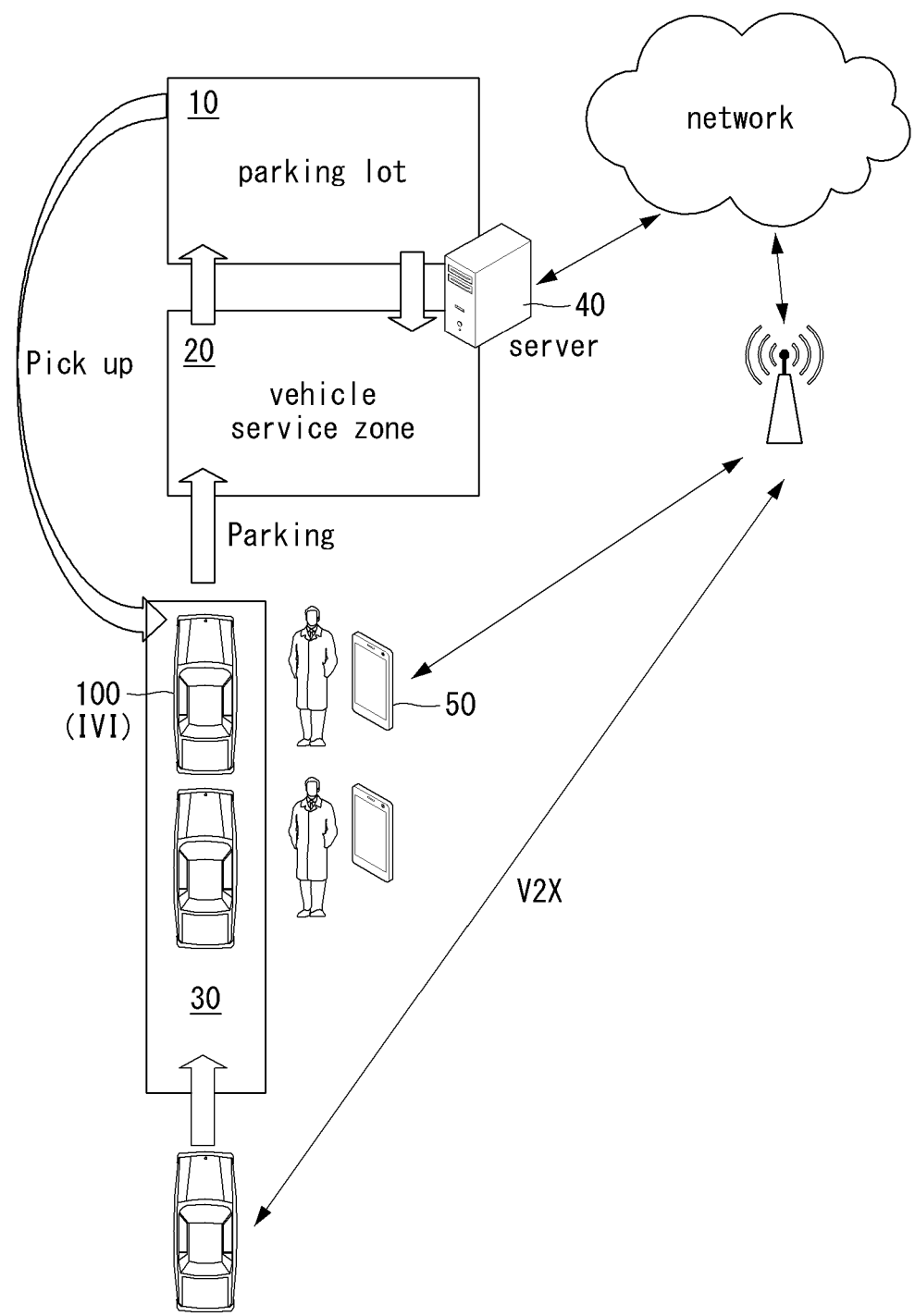

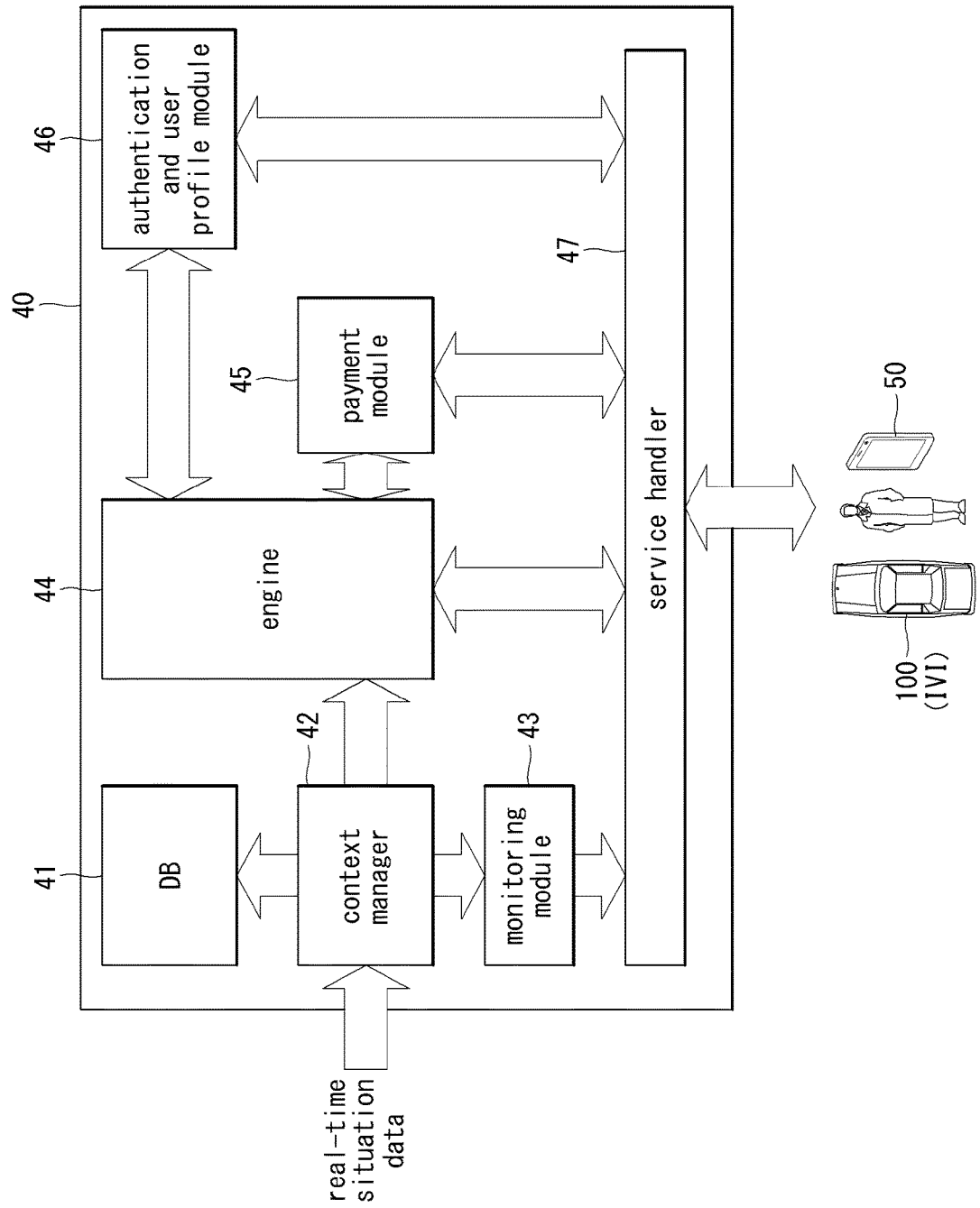
[FIG. 62]

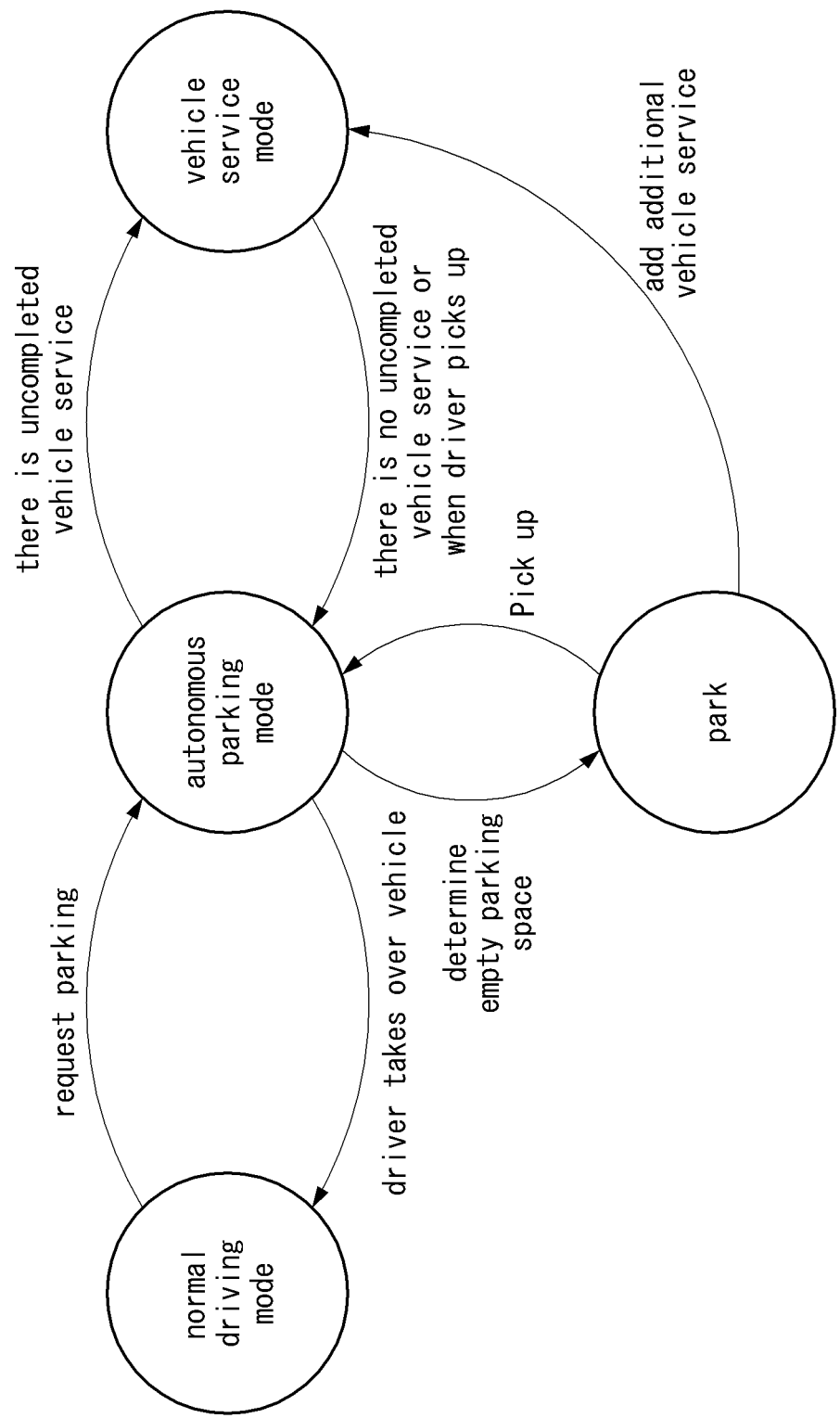
[FIG. 63]

[FIG. 64]
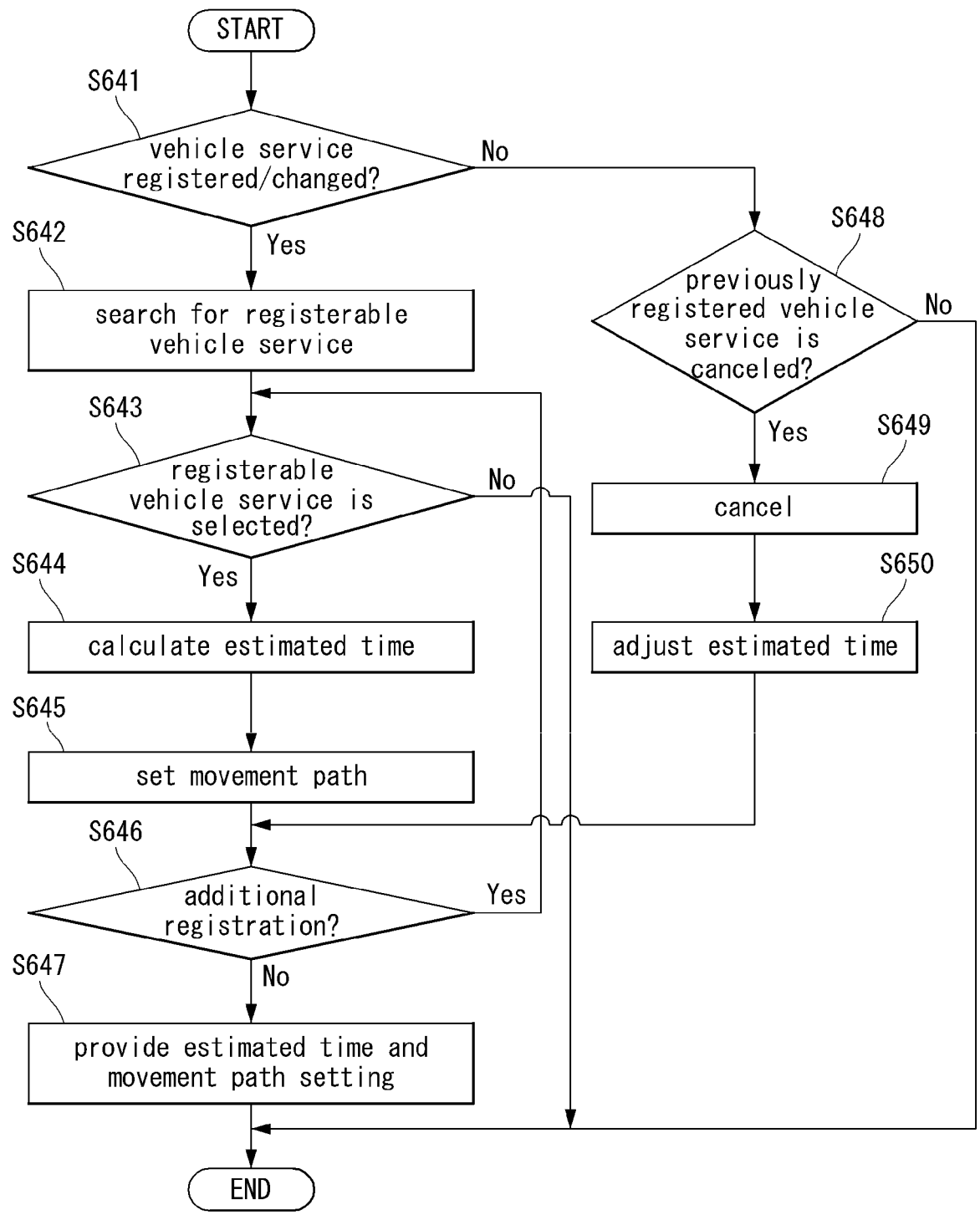

[FIG. 65A]
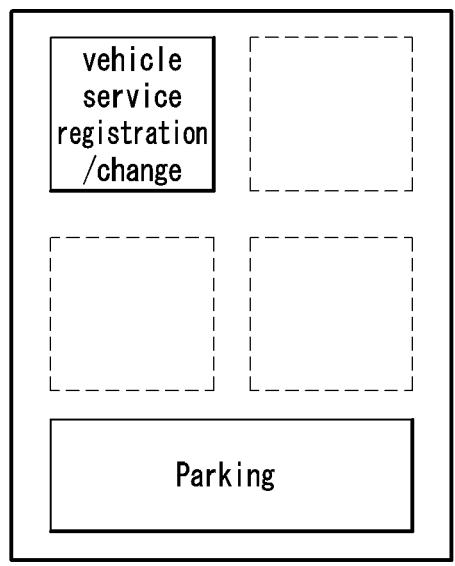
UX screen of normal driving mode
[FIG. 65B]
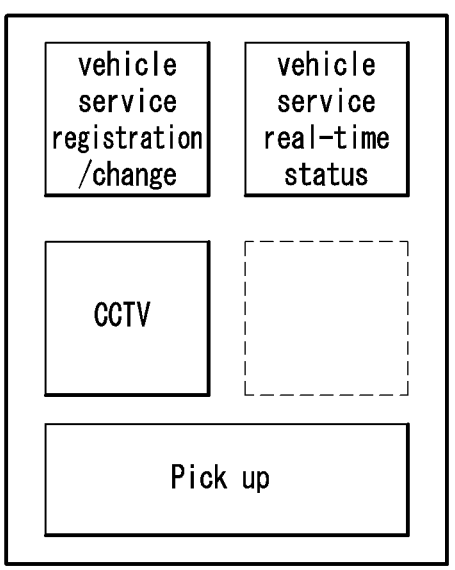
autonomous parking mode
vehicle service mode   UX screen

[FIG. 65C]
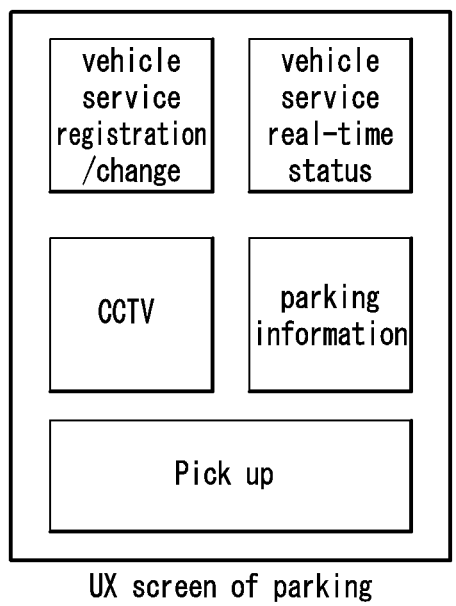
UX screen of parking

[FIG. 66]

| service name | waiting time | service time | total required time | state | select |
|---|---|---|---|---|---|
| refueling | 5min | 2min | 7min | smooth | ☑ |
| external car wash | 10min | 3min | 13min | normal | ☑ |
| vehicle inspection | 20min | 20min | 40min | complex | ☑ | service registration/change registerable service already completed service

| X X | [X] | → dim in gray (unselectable) | unavailable service

| internal car wash | [X] | → treated in red (unselectable) |

Time Visualization Bar total required time 60min estimated end time 10:25분 register?

[FIG. 67]
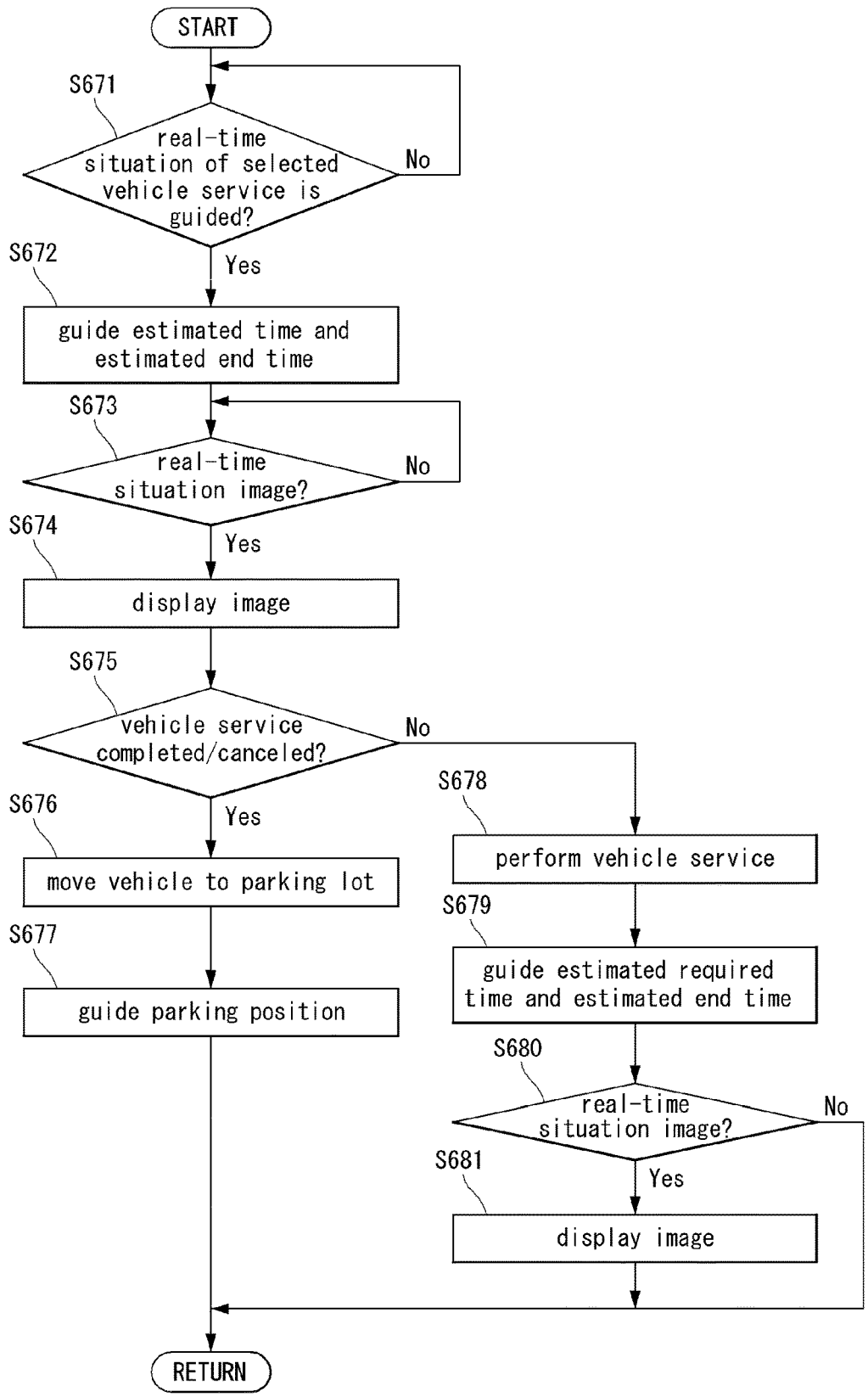

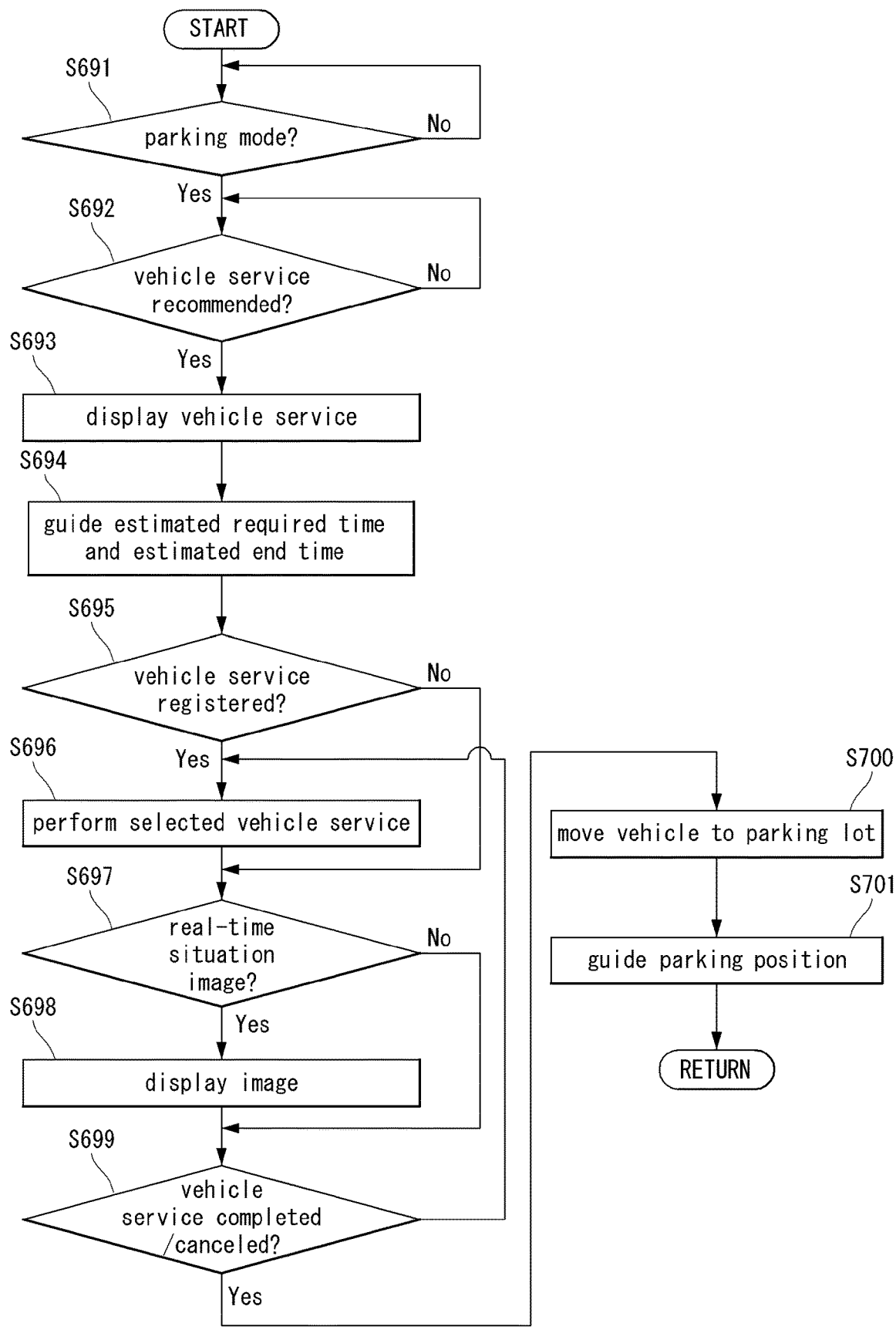
[FIG. 68]

[FIG. 69]
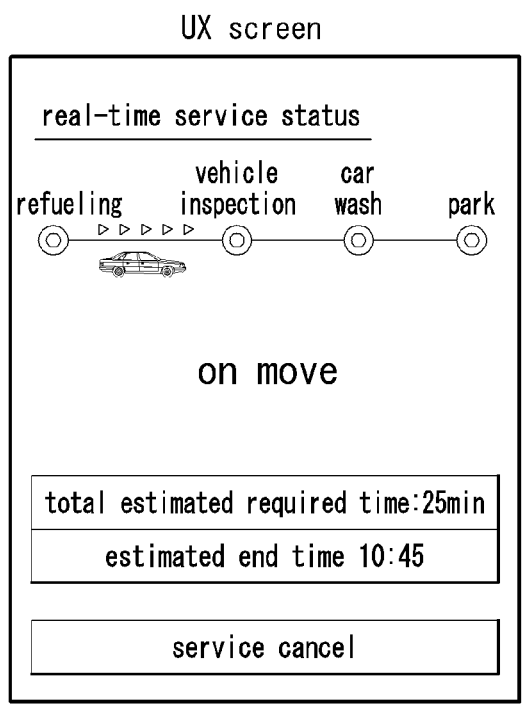
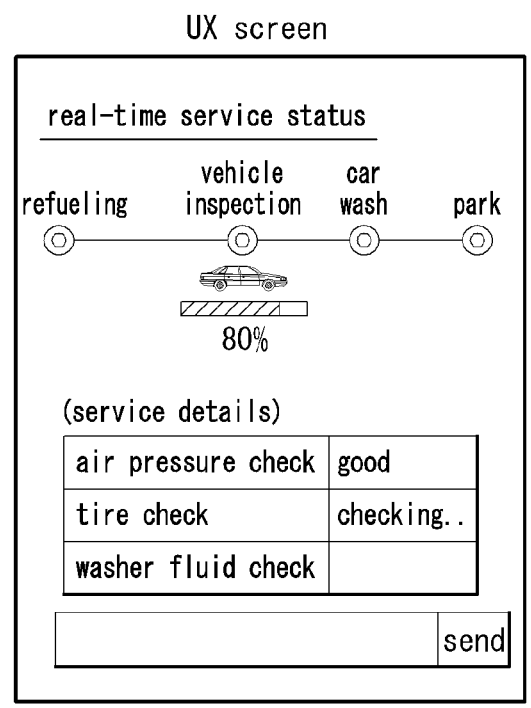
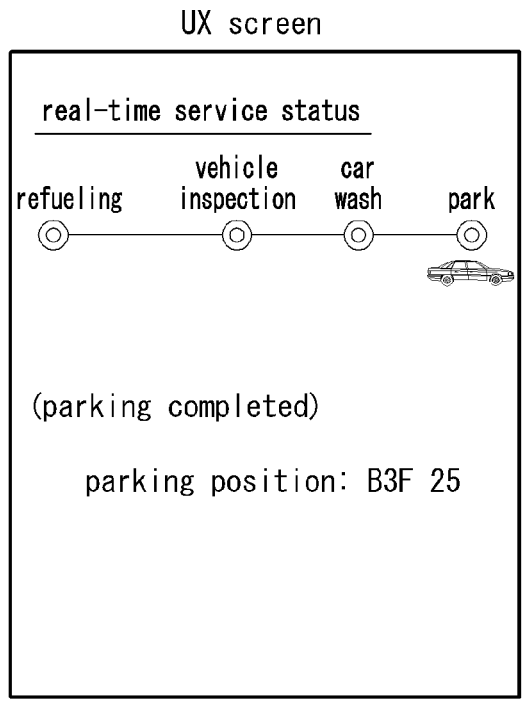

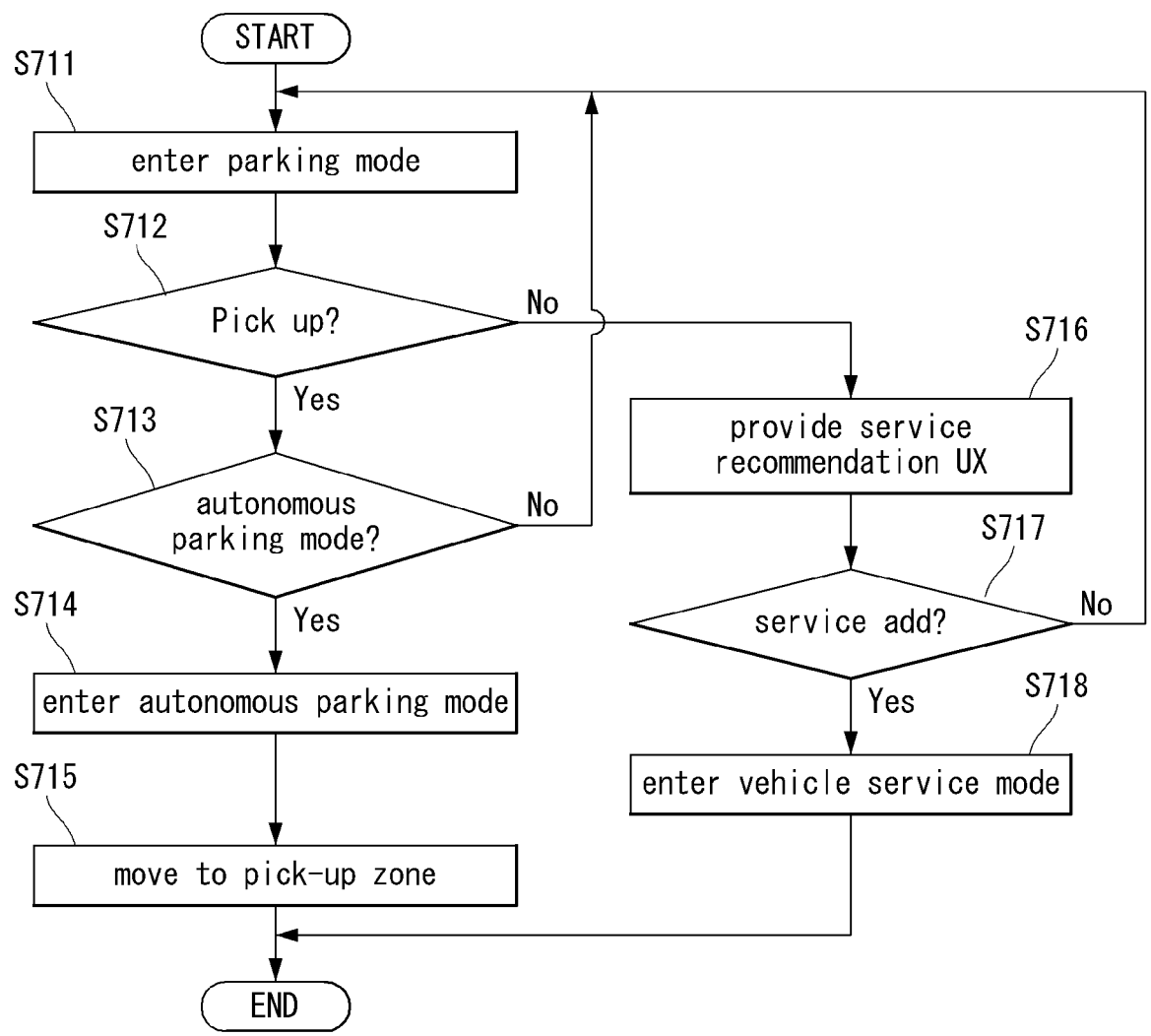
[FIG. 70]

[FIG. 71]

Service recommendation following services run smoothly

| service name | state | required time | select |
|---|---|---|---|
| car wash | smooth | 5min | √ |
|  |  |  | ☐ | total required time :

estimated end time :

register?

[FIG. 72]
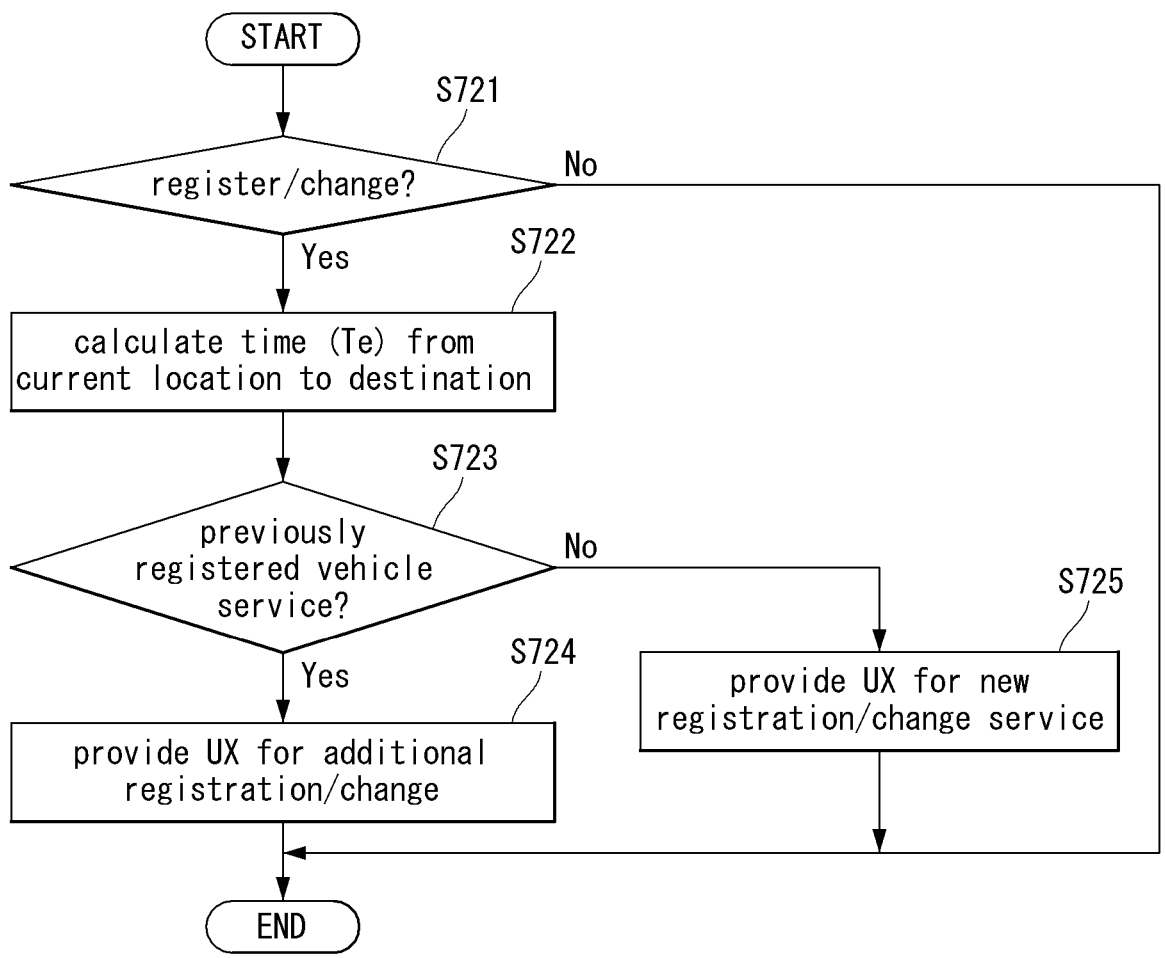

[FIG. 73A]
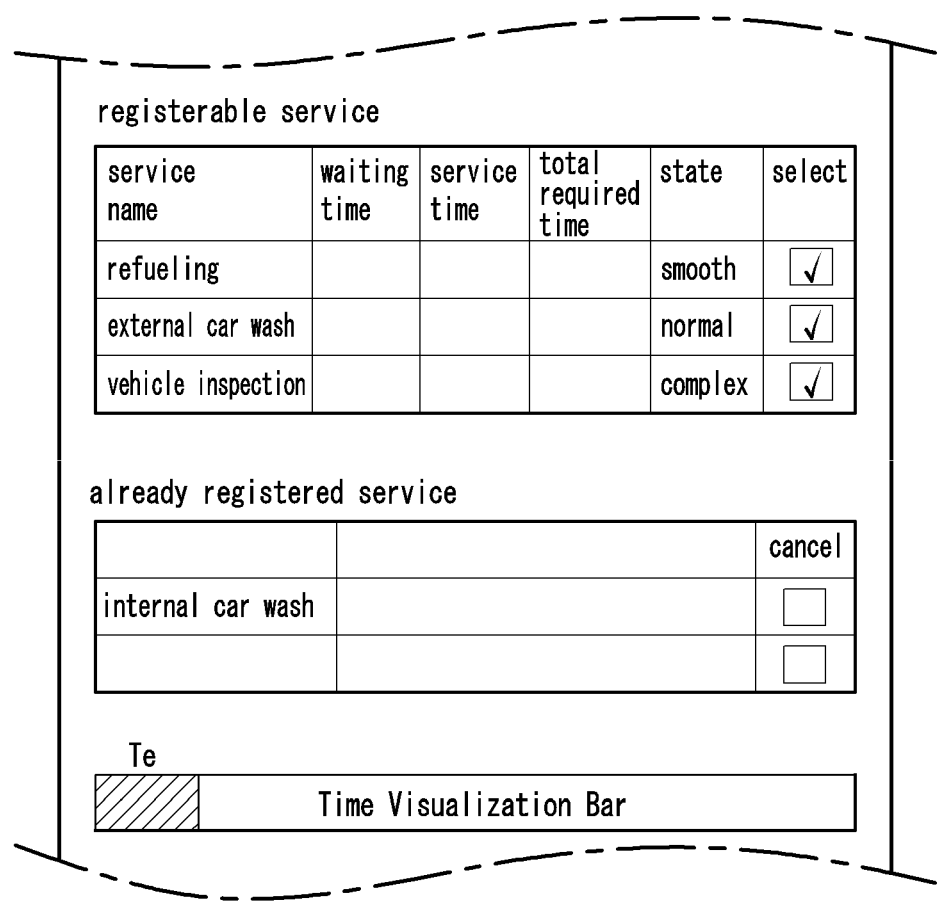

[FIG. 73B]
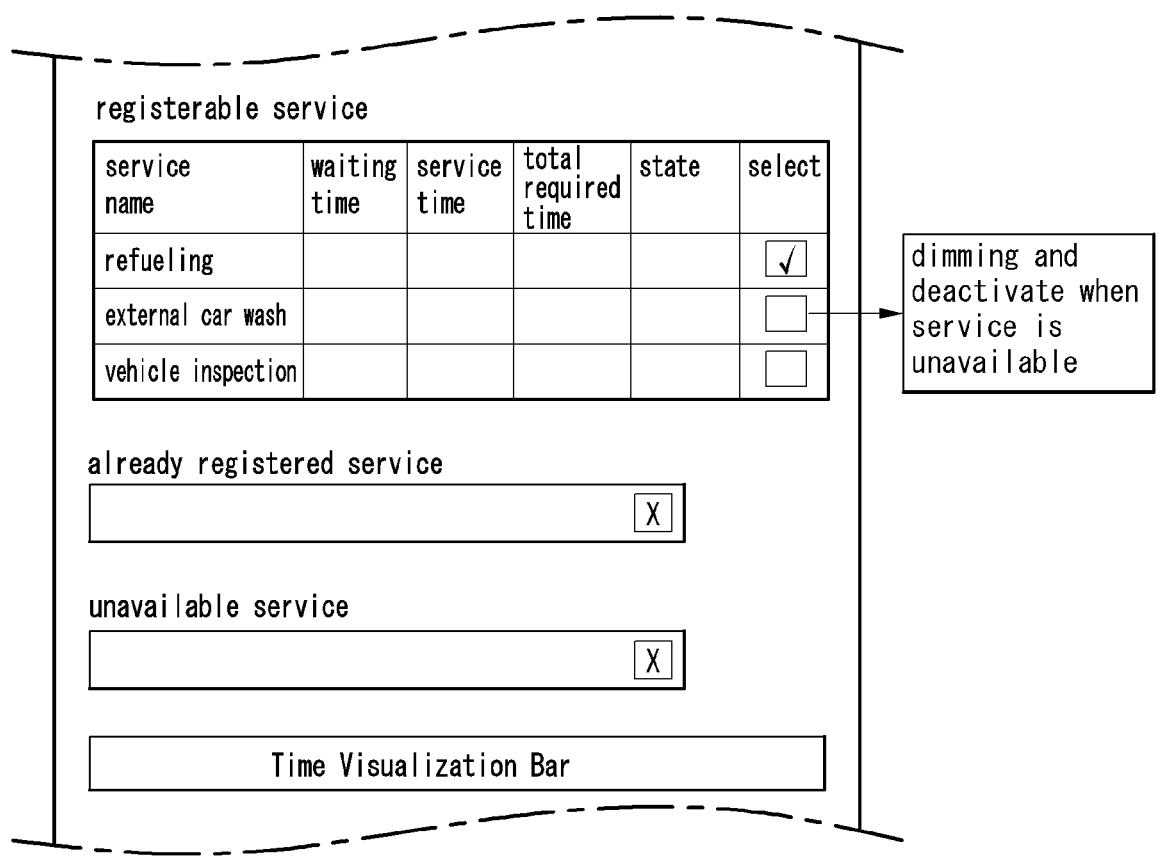

[FIG. 74]
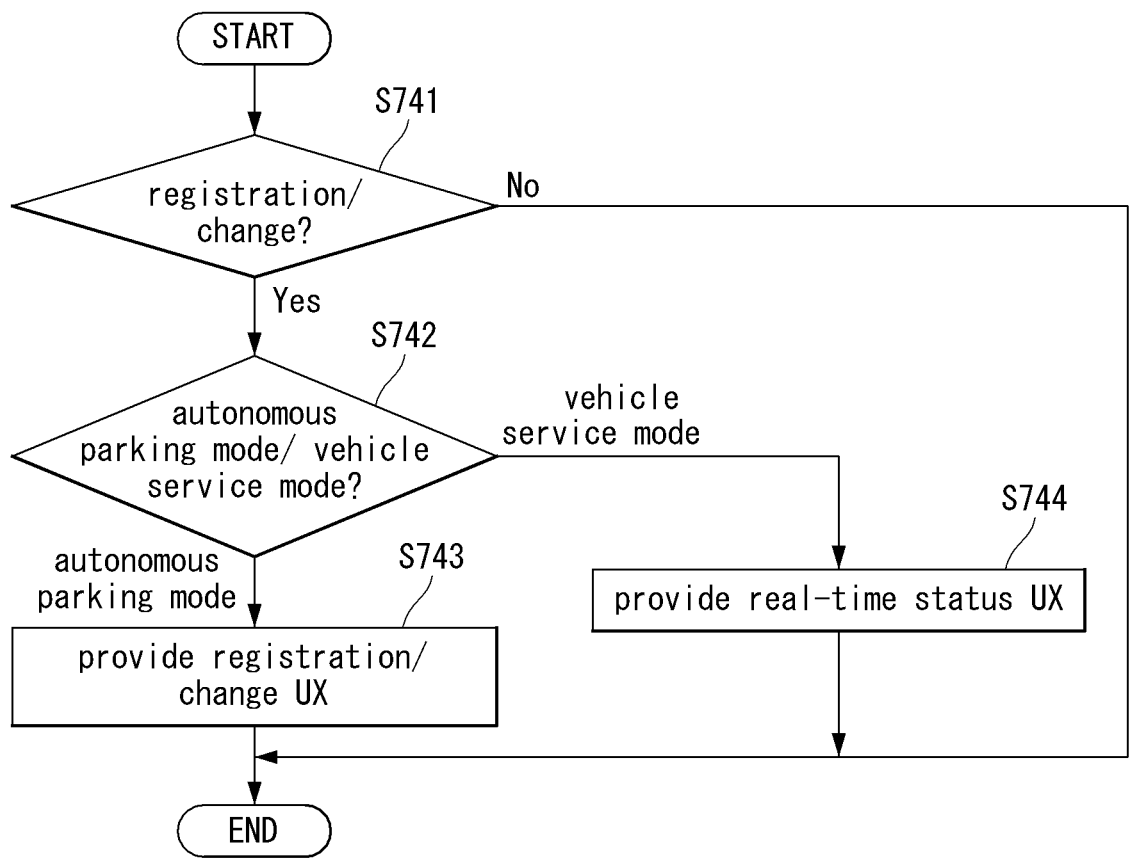

[FIG. 75]
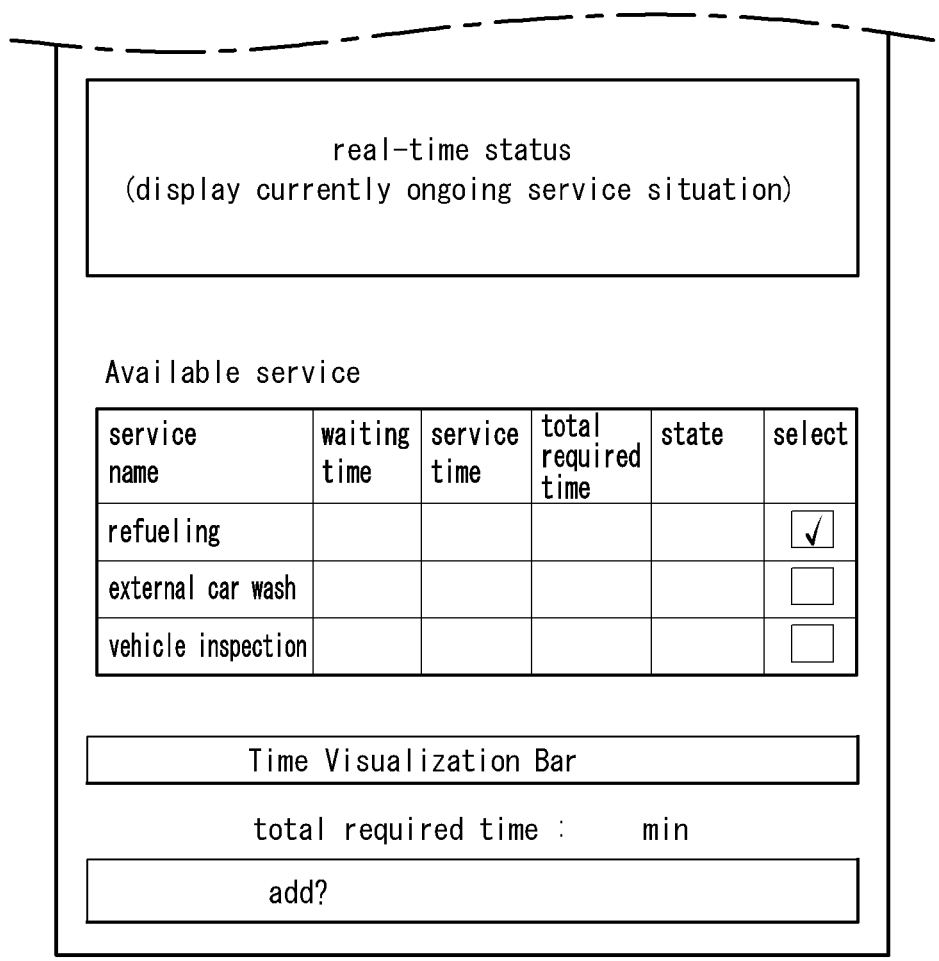

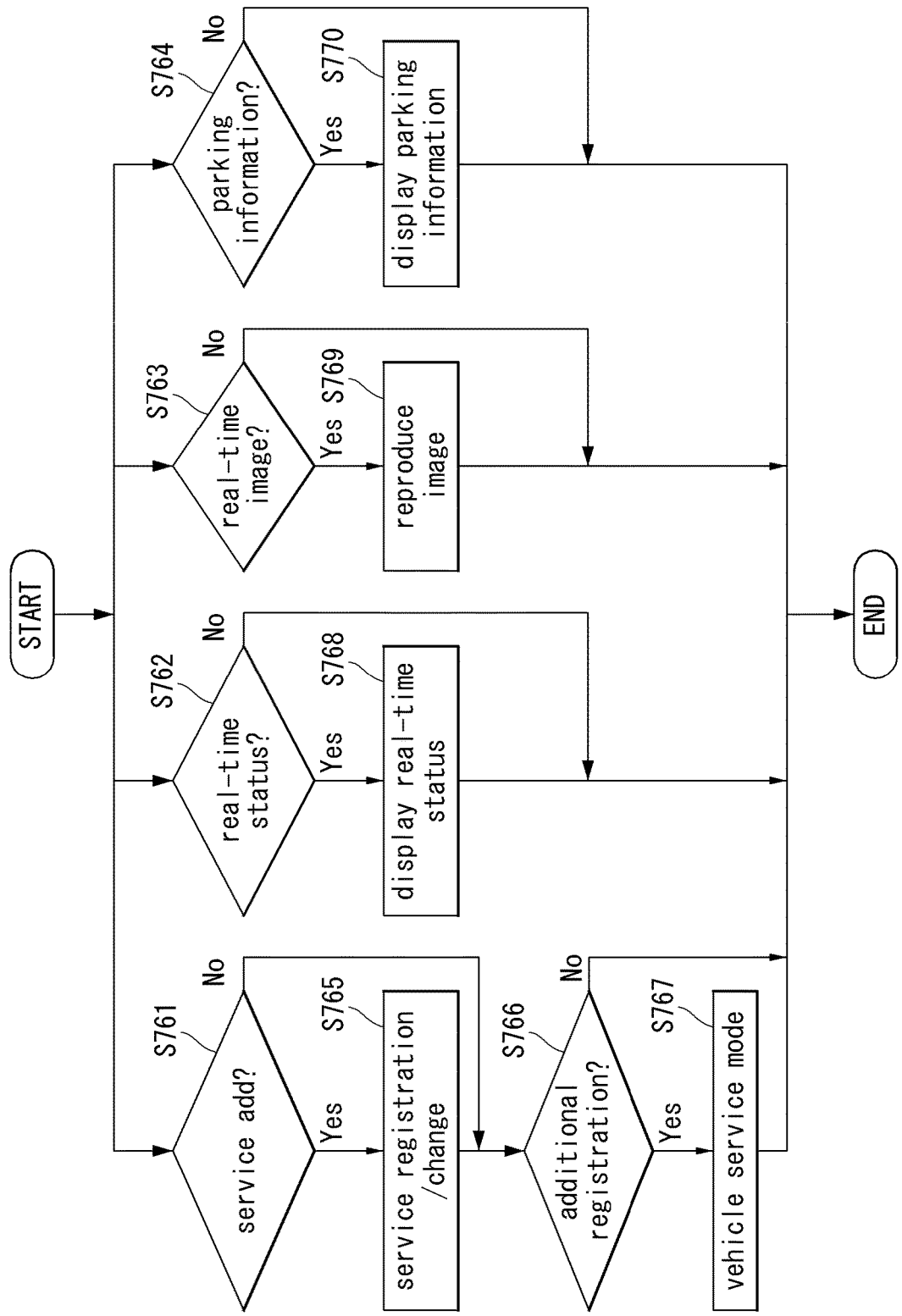
[FIG. 76]

[FIG. 77]
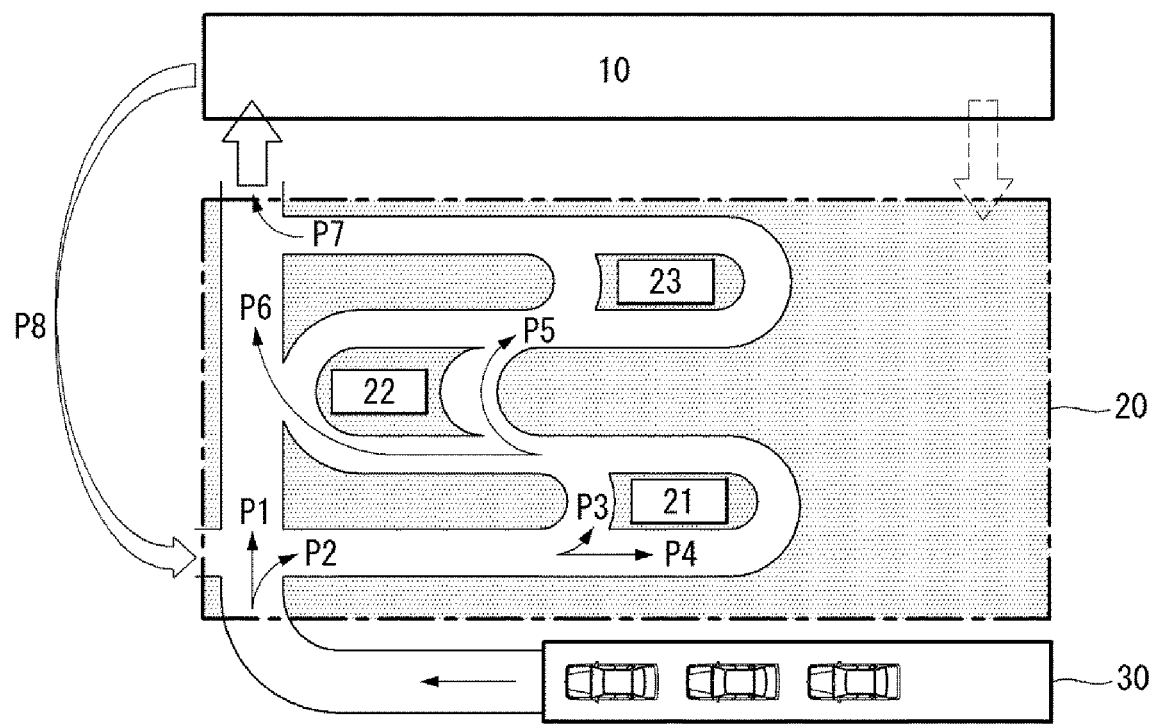

AUTONOMOUS VEHICLE AND SERVICE PROVIDING SYSTEM AND METHOD USING THE SAME

CROSS-REFERENCE TO RELATED APPLICATIONS

This application is a National Stage application under 35 U.S.C. § 371 of International Application No. PCT/KR2019/004922, filed on Apr. 23, 2019, the contents of which are hereby incorporated by reference in its entirety.

TECHNICAL FIELD

The present invention relates to an autonomous vehicle, and more particularly, to an autonomous vehicle capable of linking valet parking to various vehicle services using autonomous vehicle technologies, and a service providing system and method for using the same.

BACKGROUND ART

Autonomous vehicles may be operable by themselves without human interference. All of major makers have already entered autonomous vehicle business and devoted on research and development.

The autonomous vehicle may support an automatic parking service allowing a vehicle to search for an empty space and be parked without driver interference.

DISCLOSURE

Technical Problem

An embodiment of the present invention provides an autonomous vehicle linking parking and vehicle services using an autonomous vehicle, and a service providing method using the same.

Technical problems of the present invention are not limited to the above-mentioned technical problems and any other unmentioned technical problems may be clearly understood from the following description by those having ordinary skill in the art.

Technical Solution

Furthermore, in this specification, an autonomous vehicle according to at least one embodiment of the present invention includes a navigation system setting a service zone adjacent to a parking lot as a destination when there is a pre-registered vehicle service input through a user terminal, and setting the parking lot adjacent to the service zone as a destination after the pre-registered vehicle service is completed, and an operation system moving the vehicle to the destination through autonomous driving.

Furthermore, in this specification, a service providing system according to at least one embodiment of the present invention includes a service system including a management server connected to a surveillance camera system, a service provider server, and a management server connected to a communication device and providing at least one vehicle service; and a user terminal displaying a user interface screen guiding registration, change, cancellation of the vehicle service on a display, connected to the management server through a communication link and displaying data received from the management server on the display, and transmitting the user data to the management server. The service zone is located adjacent to the parking lot. The management server receives registration, change, and cancellation of the vehicle service of the service zone from the user terminal.

Furthermore, in this specification, a service providing method according to at least one embodiment of the present invention includes: disposing a service zone providing at least one vehicle service, adjacent to a parking lot; a vehicle autonomously driving from a pick-up zone to the service zone and receiving requested registered vehicle service through a user terminal in the service zone; the vehicle autonomously driving from the parking lot to the pick-up zone after the registered vehicle service is completed, and waiting in the pick-up zone.

Advantageous Effects

The present invention has an advantage in that a vehicle service is provided to a vehicle before it enters a parking lot or a vehicle which leaves a parking lot, whereby a vehicle service previously registered by the user may be provided to the user while the user is taking care of personal business.

The present invention has an advantage in that a vehicle service associated parking is provided to the vicinity of a parking lot, thereby improving user convenience, as well as providing an estimated time, an end time, and a real-time status of the vehicle service on a UX screen.

The present invention has an advantage in that user convenience and sales of service providers are increased in a smart building, a shopping mall, and the like.

Advantages and effects of the present disclosure are not limited to the foregoing effects and any other technical effects not mentioned herein may be easily understood by a person skilled in the art from the descriptions of claims.

DESCRIPTION OF DRAWINGS

FIG. 1 is a block diagram of a wireless communication system to which the methods proposed herein may be applied.

FIG. 2 shows an example of a basic operation of an autonomous vehicle and a 5G network in a 5G communication system.

FIG. 3 illustrates an example of application operation of an autonomous vehicle and a 5G network in a 5G communication system.

FIGS. 4 to 7 show an example of an operation of an autonomous vehicle using 5G communication.

FIG. 8 illustrates an example of a basic operation between a vehicle and a vehicle using 5G communication.

FIGS. 9 to 10 illustrate an example of an application operation between a vehicle and a vehicle using 5G communication.

FIG. 11 is a diagram illustrating an example of a 3GPP signal transmission/reception method.

FIG. 12 illustrates an SSB structure and FIG. 13 illustrates SSB transmission.

FIG. 14 illustrates an example of a random access procedure.

FIG. 15 shows an example of an uplink grant.

FIG. 16 shows an example of a conceptual diagram of uplink physical channel processing.

FIG. 17 shows an example of an NR slot in which a PUCCH is transmitted.

FIG. 18 is a block diagram of a transmitter and a receiver for hybrid beamforming FIG. 19 shows an example of beamforming using an SSB and a CSI-RS.

FIG. 20 is a flowchart illustrating an example of a DL BM process using an SSB.

FIG. 21 shows another example of DL BM process using a CSI-RS.

FIG. 22 is a flowchart illustrating an example of a process of determining a reception beam of a UE.

FIG. 23 is a flowchart illustrating an example of a transmission beam determining process of a BS.

FIG. 24 shows an example of resource allocation in time and frequency domains related to an operation of FIG. 21.

FIG. 25 shows an example of a UL BM process using an SRS.

FIG. 26 is a flowchart illustrating an example of a UL BM process using an SRS.

FIG. 27 is a diagram showing an example of a method of indicating a pre-emption.

FIG. 28 shows an example of a time/frequency set of pre-emption indication.

FIG. 29 shows an example of a narrowband operation and frequency diversity.

FIG. 30 is a diagram illustrating physical channels that may be used for MTC and a general signal transmission method using the same.

FIG. 31 is a diagram illustrating an example of scheduling for each of MTC and legacy LTE.

FIG. 32 shows an example of a frame structure when a subcarrier spacing is 15 kHz.

FIG. 33 shows an example of a frame structure when a subscriber spacing is 3.75 kHz.

FIG. 34 shows an example of a resource grid for NB-IoT uplink.

FIG. 35 shows an example of an NB-IoT operation mode.

FIG. 36 is a diagram illustrating an example of physical channels that may be used for NB-IoT and a general signal transmission method using the same.

FIG. 37 shows various scenarios of a sidelink.

FIG. 38 shows a protocol stack of a sidelink.

FIG. 39 shows a control plane protocol stack of a sidelink.

FIG. 40 shows an example of a signaling transmission/reception method in a sidelink communication mode 1/mode 3.

FIG. 41 shows an example of downlink control information transmission for sidelink communication.

FIG. 42 shows an example of a type of V2X application.

FIG. 43 shows a resource allocation method in a V2X sidelink.

FIG. 44 shows an example of a mode 3 operation.

FIG. 45 shows an example of a mode 4 operation.

FIG. 46 shows an example of sensing in mode 4 and resource selection.

FIG. 47 shows an example of V2X transmission resource selection/reservation.

FIGS. 48 to 50 illustrate standalone scenarios supporting V2X SL communication.

FIGS. 51 to 53 show an MR-DC scenario supporting V2X SL communication.

FIG. 54 is a diagram showing an appearance of a vehicle according to an embodiment of the present invention.

FIG. 55 is a view showing a vehicle according to an embodiment of the present invention from various angles of the outside.

FIG. 56 and FIG. 57 are diagrams showing an inside of a vehicle according to the embodiment of the present invention.

FIGS. 58 and 59 are views showing examples of objects related to traveling of a vehicle according to an embodiment of the present invention.

FIG. 60 is a detailed block diagram of a vehicle according to an embodiment of the present invention.

FIG. 61 is a diagram illustrating a service providing system using an autonomous vehicle according to an embodiment of the present invention.

FIG. 62 is a block diagram showing a server configuration shown in FIG. 61.

FIG. 63 is a state transition diagram showing a control method of the system shown in FIG. 61.

FIG. 64 is a flowchart illustrating an example of service registration, change, and cancellation using an autonomous vehicle according to an embodiment of the present invention.

FIGS. 65A to 65C are views showing an example of an UX screen in a normal driving mode, an autonomous driving parking mode, a vehicle service mode, and a parking mode.

FIG. 66 is a view showing an example of an UX screen for guiding vehicle service registration/change.

FIG. 67 is a flowchart illustrating a real-time service situation providing method in a service providing method using an autonomous vehicle according to an embodiment of the present invention.

FIG. 68 is a flowchart illustrating an example of a service recommendation method in a service providing method using an autonomous vehicle according to an embodiment of the present invention.

FIG. 69 is an example of an UX screen showing a real-time service situation of a vehicle in a service zone.

FIG. 70 is a flowchart illustrating a method of recommending an available vehicle service.

FIG. 71 is a diagram showing an example of a UX screen for service recommendation.

FIG. 72 is a flowchart illustrating an example of a service registration/changing method in a normal driving mode of a vehicle.

FIG. 73A is a view showing an example of a UX screen provided when there is a pre-registered vehicle service in service registration/change shown in FIG. 72.

FIG. 73B is a view showing an example of a UX screen provided when there is no pre-registered vehicle service in the service registration/change shown in FIG. 72.

FIG. 74 is a flowchart illustrating an UX method provided in an autonomous parking mode or a vehicle service mode.

FIG. 75 is a view showing an example of a real-time status UX screen in a UX method shown in FIG. 74.

FIG. 76 is a flowchart illustrating an example of the UX method when selecting registration/change, a current status, and a real-time image and parking information of a vehicle service.

FIG. 77 is a view showing an example of an autonomous travelling movement path of a vehicle according to a registered vehicle service;

BEST MODE

A service providing system according to at least one embodiment of the present invention includes: a service system including a surveillance camera system, a service provider server, and a management server connected to a communication system and providing at least one vehicle service; and a user terminal displaying a user interface screen guiding registration, change, and cancelation of the vehicle service on a display, connected to the management server through a communication link to display data received from the management server on the display, and transmitting user data to the management server. A service zone is disposed to be adjacent to a parking lot. The management server receives registration, change, and cancelation of a vehicle service in the service zone from the user terminal.

MODE FOR INVENTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus may be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Autonomous Vehicle and 5G Network

FIG. 1 is a block diagram of a wireless communication system to which methods proposed in the disclosure are applicable.

Referring to FIG. 1, a device including an autonomous driving module is defined as a first communication device (910 of FIG. 1 and see paragraph N for detailed description), and a processor 911 may perform detailed autonomous driving operations.

Another vehicle or a 5G network communicating with the autonomous driving device is defined as a second communication device (920 of FIG. 1, and see paragraph N for details), and a processor 921 may perform detailed autonomous driving operations.

Details of a wireless communication system, which is defined as including a first communication device, which is an autonomous vehicle, and a second communication device, which is a 5G network, may refer to paragraph N.

B. Operation Between 5G Network and Autonomous Vehicle Using 5G Communication FIG. 2 shows an example of a basic operation of an autonomous vehicle and a 5G network in a 5G communication system.

The autonomous vehicle transmits specific information to the 5G network (S1).

The specific information may include autonomous driving related information.

The 5G network may determine whether the vehicle is remotely controlled (S2).

Here, the 5G network may include a server or a module for performing autonomous driving-related remote control.

The 5G network may transmit information (or signal) related to remote control to the autonomous vehicle (S3).

FIG. 3 shows an example of an application operation of an autonomous vehicle and the 5G network in a 5G communication system.

The autonomous vehicle carries out an initial access procedure with the 5G network (S20).

The initial access procedure includes a cell search for acquiring a downlink (DL) synchronization, and process for acquiring system information, and the like, which will be described in detail in paragraph F.

Then, the autonomous vehicle carries out a random access procedure with the 5G network (S21).

The random access procedure includes a process of transmitting a preamble for uplink (UL) synchronization acquisition or UL data transmission, receiving a random access response, and the like, which will be described in detail in paragraph G.

The 5G network transmits a UL grant for scheduling transmission of specific information to the autonomous vehicle (S22).

The UL Grant reception includes a time/frequency resource scheduling for UL data transmission to the 5G network, which will be described in detail in paragraph H.

Also, the autonomous vehicle transmits specific information to the 5G network on the basis of the UL grant (S23).

The 5G network determines whether the vehicle is remotely controlled (S24).

Then, the autonomous vehicle receives a DL grant via a physical downlink control channel to receive a response to specific information from the 5G network (S25).

The 5G network transmits information (or a signal) related to remote control to the autonomous vehicle on the basis of the DL grant (S26).

Meanwhile, FIG. 3 shows an example in which the initial access procedure or the random access procedure and the DL grant receiving process of the autonomous vehicle and 5G communication are combined through the process of S20 to S26, but the present invention is not limited thereto.

For example, the initial access procedure and/or the random access procedure may be performed through the steps S20, S22, S23, S24, and S25. Also, for example, the initial access procedure and/or the random access procedure may be performed through steps S21, S22, S23, S24, and S26. Also, a process of combining an AI operation and a downlink grant receiving process may be performed through steps S23, S24, S25, and S26.

In FIG. 3, an operation of the autonomous vehicle is exemplarily described through steps S20 to S26, but the present invention is not limited thereto.

For example, the operation of the autonomous vehicle may be performed by selectively combining steps S20, S21, S22, and S25 with steps S23 and S26. Also, for example, the operation of the autonomous vehicle may include steps S21, S22, S23, and S26. For example, the operation of the autonomous vehicle may include steps S20, S21, S23, and S26. For example, the operation of the autonomous vehicle may include steps S22, S23, S25, and S26.

FIGS. 4 to 7 show an example of an operation of an autonomous vehicle using 5G communication.

Referring to FIG. 4, the autonomous vehicle including an autonomous driving module performs an initial access procedure with a 5G network on the basis of an synchronization signal block (SSB) to acquire DL synchronization and system information (S30).

Also, the autonomous vehicle carries out a random access procedure with the 5G network for UL synchronization acquisition and/or UL transmission (S31).

Also, the autonomous vehicle receives UL grant from the 5G network to transmit specific information (S32).

Also, the autonomous vehicle transmits the specific information to the 5G network on the basis of the UL grant (S33).

Also, the autonomous vehicle receives a DL grant for receiving a response to specific information from the 5G network (S34).

Also, the autonomous vehicle receives information (or signal) related to remote control from the 5G network on the basis of the DL grant (S35).

A beam management (BM) process may be added to step S30, a beam failure recovery process related to physical random access channel (PRACH) transmission may be added to S31. A QCL in connection with a beam reception direction of a PDCCH including the UL grant may be added to step S32, and a QCL relationship in connection with a beam transmission direction of a physical uplink control channel (PUCCH)/physical uplink shared channel (PUSCH) including the specific information may be added to step S33. Also, a QCL relationship in connection with the beam reception direction of the PDCCH including the DL grant may be added to step S34, and details thereof will be described in paragraph I.

Next, referring to FIG. 5, the autonomous vehicle carries out an initial access procedure with the 5G network on the basis of the SSB to acquire DL synchronization and system information (S40).

Also, the autonomous vehicle carries out a random access procedure with the 5G network for UL synchronization acquisition and/or UL transmission (S41).

Also, the autonomous vehicle transmits the specific information to the 5G network on the basis of a configured grant (S42). The process of the configured grant instead of performing the UL grant from the 5G network will be described in detail in paragraph H.

The autonomous vehicle receives information (or a signal) related to remote control from the 5G network on the basis of the configured grant (S43).

Next, referring to FIG. 6, the autonomous vehicle carries out an initial access procedure with the 5G network on the basis of the SSB to acquire DL synchronization and system information (S50).

The autonomous vehicle carries out a random access procedure with the 5G network for UL synchronization acquisition and/or UL transmission (S51).

Then, the autonomous vehicle receives DownlinkPreemption IE from the 5G network (S52).

Then, the autonomous vehicle receives the DCI format 2_1 including a preliminary indication from the 5G network on the basis of DownlinkPreemption IE (S53).

The autonomous vehicle does not (or expects or assumes) reception of eMBB data in a resource (PRB and/or OFDM symbol) indicated by the pre-emption indication (S54).

The operation related to the preemption indication will be described in detail in paragraph J.

Then, the autonomous vehicle receives UL grant from the 5G network to transmit specific information (S55).

Then, the autonomous vehicle transmits specific information to the 5G network on the basis of the UL grant (S56).

The autonomous vehicle receives a DL grant for receiving a response to specific information from the 5G network (S57).

The autonomous vehicle receives the information (or signal) related to remote control from the 5G network on the basis of the DL grant (S58).

Next, referring to FIG. 7, the autonomous vehicle carries out an initial access procedure with the 5G network on the basis of the SSB to acquire DL synchronization and system information (S60).

The autonomous vehicle carries out a random access procedure with the 5G network for UL synchronization acquisition and/or UL transmission (S61).

The autonomous vehicle receives a UL grant from the 5G network to transmit specific information (S62).

The UL grant includes information on the number of repetitions regarding transmission of the specific information, and the specific information is repeatedly transmitted on the basis of the information on the number of repetitions (S63).

The autonomous vehicle transmits specific information to the 5G network on the basis of the UL grant.

The repeated transmission of the specific information is performed through frequency hopping, first specific information may be transmitted in a first frequency resource and second specific information may be transmitted in a second frequency resource.

The specific information may be transmitted through a narrowband of 6 RB (Resource Block) or 1 RB (Resource Block).

Then, the autonomous vehicle receives a DL grant for receiving a response to specific information from the 5G network (S64).

Then, the autonomous vehicle receives the information (or signal) related to remote control from the 5G network on the basis of the DL grant (S65).

The mMTC described in FIG. 7 will be described in detail in paragraph K.

C. Autonomous Driving Operation Between Vehicles Using 5G Communication

FIG. 8 illustrates an example of a basic operation between vehicles using 5G communication.

A first vehicle transmits specific information to a second vehicle (S61).

The second vehicle transmits a response to the specific information to the first vehicle (S61).

Here, details of transmission/reception of the specific information and the response to the specific information may be referred to the contents disclosed in paragraph M describing the operation of V2X communication, and it means that FIG. 8 and the contents disclosed in M may be combined to be applied.

Meanwhile, a configuration of a vehicle-to-vehicle application operation may vary depending on whether the 5G network is involved directly (sidelink communication transmission mode 3) or indirectly (sidelink communication transmission mode 4) in resource allocation for the specific information and the response to the specific information.

FIGS. 9 to 10 illustrate an example of a vehicle-to-vehicle application operation using 5G communication.

FIG. 9 shows an embodiment in which the 5G network directly participates in resource allocation of signal transmission/reception.

The 5G network may transmit DCI format 5A to the first vehicle for scheduling of mode 3 transmission (PSCCH and/or PSSCH transmissions) (S70).

Here, the physical sidelink control channel (PSCCH) is a 5G physical channel for scheduling specific information transmission, and physical sidelink shared channel (PSSCH) is a 5G physical channel for transmitting specific information.

The first vehicle transmits SCI format 1 for scheduling transmission of specific information to the second vehicle on the PSCCH (S71).

Also, the first vehicle transmits specific information on the PSSCJ to the second vehicle (S72).

FIG. 10 shows an embodiment in which a 5G network is indirectly involved in resource allocation of signal transmission/reception.

Referring to FIG. 10, the first vehicle senses a resource for mode 4 transmission in a first window (S80).

Then, the first vehicle selects a resource for mode 4 transmission in a second window on the basis of a sensing result (S81).

Here, the first window refers to a sensing window and the second window refers to a selection window.

The first vehicle transmits SCI format 1 for scheduling transmission of specific information on the PSCCH to the second vehicle on the basis of the selected resource (S82).

Then, the first vehicle transmits specific information on the PSSCH to the second vehicle (S83).

D. Introduction

Hereinafter, downlink (DL) refers to communication from a base station (BS) to user equipment (UE), and uplink (UL) refers to communication from a UE to a BS. In the downlink, a transmitter may be part of the BS and a receiver may be part of the UE. In the uplink, a transmitter may be part of the UE and a receiver may be part of the BS. Herein, the UE may be represented as a first communication device and the BS may be represented as a second communication device. The BS may be replaced with a term such as a fixed station, a Node B, an evolved NodeB (eNB), a next generation nodeB (gNB), a base transceiver system (BTS), an access point (AP), a network or a 5G (5th generation), artificial intelligence (AI) system, a road side unit (RSU), robot, and the like. Also, the UE may be replaced with a terminal, a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, a vehicle, a robot, an AI module, and the like.

Techniques described herein may be used in a variety of wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3rd Generation Partnership Project (3GPP) Long Term Evolution (LTE) is a part of Evolved UMTS (E-UMTS) using E-UTRA. LTE-Advanced (LTE-A)/LTE-A pro is an evolution of 3GPP LTE. 3GPP NR NR(New Radio or New Radio Access Technology) is an evolution of 3GPP LTE/LTE-A/LTE-A pro.

For clarity, the following description focuses on a 3GPP communication system (e.g., LTE-A, NR), but technical features of the present invention is not limited thereto. LTE refers to technology after 3GPP TS 36.xxx Release 8. In detail, LTE technology after 3GPP TS 36.xxx Release 10 is referred to as LTE-A, and LTE technology after 3GPP TS 36.xxx Release 13 is referred to as LTE-A pro. 3GPP 5G (5th generation) technology refers to technology after TS 36.xxx Release 15 and technology after TS 38.XXX Release 15. The technology after TS 38.xxx Release 15 may be referred to as 3GPP NR, and technology after TS 36.xxx Release 15 may be referred to as enhanced LTE. "xxx" refers to a standard document detail number. LTE/NR may be collectively referred to as a 3GPP system.

In this disclosure, a node refers to a fixed point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be a BS. For example, the node may be a radio remote head (RRH) or a radio remote unit (RRU). The RRH or RRU generally has a power level lower than a power level of a BS. At least one antenna is installed per node. The antenna may refer to a physical antenna or refer to an antenna port, a virtual antenna, or an antenna group. A node may be referred to as a point.

In this specification, a cell refers to a prescribed geographical area to which one or more nodes provide a communication service. A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times.

In this specification, communicating with a specific cell may refer to communicating with a BS or a node which provides a communication service to the specific cell. In addition, a DL/UL signal of a specific cell refers to a DL/UL signal from/to a BS or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between a BS or node which provides a communication service to the specific cell and a UE.

Meanwhile, a "cell" associated with radio resource may be defined as a combination of DL resources and UL resources, that is, a combination of a DL component carrier (CC) and a UL CC. A cell may be configured to be a DL resource alone or a combination of DL resources and UL resources. If carrier aggregation is supported, a linkage between a carrier frequency of a DL resource (or DL CC) and a carrier frequency of a UL resource (or UL CC) may be indicated by system information transmitted through a corresponding cell. Here, the carrier frequency may be the same as or different from a center frequency of each cell or CC. Hereinafter, a cell operating at a primary frequency will be referred to as a primary cell (Pcell) or a PCC, and a cell operating at a secondary frequency will be referred to as a secondary cell (Scell) Or SCC. The Scell may be configured after the UE performs a radio resource control (RRC) connection establishment with the BS to establish an RRC connection therebetween, that is, after the UE is RRC_CONNECTED. Here, RRC connection may refer to a channel through which an RRC of the UE and an RRC of the BS may exchange RRC messages with each other. The Scell may be configured to provide additional radio resources to the UE. Depending on the capabilities of the UE, the Scell may form a set of serving cells for the UE together with the Pcell. In the case of a UE which is in the RRC_CONNECTED state but is not configured in carrier aggregation or does not support carrier aggregation, there is only one serving cell that is only configured as the Pcell.

Cells support unique wireless access technologies. For example, transmission/reception according to LTE radio access technology (RAT) is performed on an LTE cell, and transmission/reception according to 5G RAT is performed on a 5G cell.

A carrier aggregation (CA) system refers to a system for supporting a wide bandwidth by aggregating a plurality of carriers each having a narrower bandwidth than a target bandwidth. A CA system is different from OFDMA technology in that DL or UL communication is performed using a plurality of carrier frequencies each of which forms a system bandwidth (or a channel bandwidth), whereas the OFDM system carries a base frequency band divided into a plurality of orthogonal subcarriers on a single carrier frequency to perform DL or UL communication. For example, in the case of OFDMA or orthogonal frequency division multiplexing (OFDM), one frequency band having a constant system bandwidth is divided into a plurality of subcarriers having a certain subscriber spacing, and information/data is mapped in the plurality of subcarriers, and the frequency band to which the information/data is mapped is unconverted and transmitted as a carrier frequency of the frequency band. In the case of wireless carrier aggregation, frequency bands having their own system bandwidth and carrier frequency may be simultaneously used for communication, and each frequency band used for carrier aggregation may be divided into a plurality of subcarriers having a predetermined subcarrier spacing.

The 3GPP-based communication standard defines DL physical channels corresponding to resource elements carrying information derived from a higher layer of a physical layer (e.g., a medium access control (MAC) layer, a radio link control (RLC) layer, a packet data convergence protocol (PDCP) layer, a radio resource control (RRC) layer, a service data adaptation protocol (SDAP), and a non-access stratum (NAS) layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), and a physical downlink control channel (PDCCH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS, a positioning RS (PRS), channel state information RS (CSI-RS), and a demodulation reference signal (DMRS) may be defined as DL RSs. Meanwhile, the 3GPP-based communication standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In this specification, a physical downlink control channel (PDCCH) and a physical downlink shared channel (PDSCH) may refer to a set of a time-frequency resources or a set of resource elements carrying downlink control information (DCI) and downlink data, respectively. In addition, a physical uplink control channel, a physical uplink shared channel (PUSCH), and a physical random access channel refer to a set of a time-frequency resources or a set of resource elements carrying uplink control information (UCI), uplink data and random access signals, respectively. Hereinafter, UE's transmitting an uplink physical channel (e.g., PUCCH, PUSCH, or PRACH) means transmitting UCI, uplink data, or a random access signal on the corresponding uplink physical channel or through then uplink physical channel. BS's receiving an uplink physical channel may refer to receiving DCI, uplink data, or random access signal on or through the uplink physical channel. BS's transmitting a downlink physical channel (e.g., PDCCH and PDSCH) has the same meaning as transmitting DCI or downlink data on or through the corresponding downlink physical channel. UE's receiving a downlink physical channel may refer to receiving DCI or downlink data on or through the corresponding downlink physical channel.

In this specification, a transport block is a payload for a physical layer. For example, data given to a physical layer from an upper layer or a medium access control (MAC) layer is basically referred to as a transport block.

In this specification, HARQ (Hybrid Automatic Repeat and reQuest) is a kind of error control method. HARQ-acknowledgement (HARQ-ACK) transmitted through the downlink is used for error control on uplink data, and HARQ-ACK transmitted on the uplink is used for error control on downlink data. A transmitter that performs the HARQ operation transmits data (e.g., a transport block, a codeword) and waits for an acknowledgment (ACK). A receiver that performs the HARQ operation sends an acknowledgment (ACK) only when data is properly received, and sends a negative acknowledgment (NACK) if an error occurs in the received data. The transmitter may transmit (new) data if ACK is received, and retransmit data if NACK is received. After the BS transmits scheduling information and data according to the scheduling information, a time delay occurs until the ACK/NACK is received from the UE and retransmission data is transmitted. This time delay occurs due to channel propagation delay and a time taken for data decoding/encoding. Therefore, when new data is sent after the current HARQ process is finished, a blank space occurs in the data transmission due to the time delay. Therefore, a plurality of independent HARQ processes are used to prevent generation of the blank space in data transmission during the time delay period. For example, if there are seven transmission occasions between an initial transmission and retransmission, the communication device may operate seven independent HARQ processes to perform data transmission without a blank space. Utilizing the plurality of parallel HARQ processes, UL/DL transmissions may be performed continuously while waiting for HARQ feedback for a previous UL/DL transmission.

In this specification, channel state information (CSI) refers to information indicating quality of a radio channel (or a link) formed between a UE and an antenna port. The CSI may include at least one of a channel quality indicator (CQI), a precoding matrix indicator (PMI), a CSI-RS resource indicator (CRI), an SSB resource indicator (SSBRI), a layer indicator (LI), a rank indicator (RI), or a reference signal received power (RSRP).

In this specification, frequency division multiplexing (FDM) may refer to transmission/reception of signals/channels/users at different frequency resources, and time division multiplexing (TDM) may refer to transmission/reception of signals/channels/users at different time resources.

In the present invention, a frequency division duplex (FDD) refers to a communication scheme in which uplink communication is performed on an uplink carrier and downlink communication is performed on a downlink carrier wave linked to the uplink carrier, and time division duplex (TDD) refers to a communication scheme in which uplink and downlink communications are performed by dividing time on the same carrier.

For background information, terms, abbreviations, etc. used in the present specification, may refer to those described in standard documents published before the present invention. For example, the following document may be referred:

3GPP LTE
3GPP TS 36.211: Physical channels and modulation
3GPP TS 36.212: Multiplexing and channel coding
3GPP TS 36.213: Physical layer procedures
3GPP TS 36.214: Physical layer; Measurements
3GPP TS 36.300: Overall description
3GPP TS 36.304: User Equipment (UE) procedures in idle mode
3GPP TS 36.314: Layer 2—Measurements
3GPP TS 36.321: Medium Access Control (MAC) protocol
3GPP TS 36.322: Radio Link Control (RLC) protocol
3GPP TS 36.323: Packet Data Convergence Protocol (PDCP)
3GPP TS 36.331: Radio Resource Control (RRC) protocol
3GPP TS 23.303: Proximity-based services (Prose); Stage 2
3GPP TS 23.285: Architecture enhancements for V2X services
3GPP TS 23.401: General Packet Radio Service (GPRS) enhancements for Evolved Universal Terrestrial Radio Access Network (E-UTRAN) access
3GPP TS 23.402: Architecture enhancements for non-3GPP accesses
3GPP TS 23.286: Application layer support for V2X services; Functional architecture and information flows
3GPP TS 24.301: Non-Access-Stratum (NAS) protocol for Evolved Packet System (EPS); Stage 3
3GPP TS 24.302: Access to the 3GPP Evolved Packet Core (EPC) via non-3GPP access networks; Stage 3
3GPP TS 24.334: Proximity-services (ProSe) User Equipment (UE) to ProSe function protocol aspects; Stage 3
3GPP TS 24.386: User Equipment (UE) to V2X control function; protocol aspects; Stage 3
3GPP NR
3GPP TS 38.211: Physical channels and modulation
3GPP TS 38.212: Multiplexing and channel coding
3GPP TS 38.213: Physical layer procedures for control
3GPP TS 38.214: Physical layer procedures for data
3GPP TS 38.215: Physical layer measurements
3GPP TS 38.300: NR and NG-RAN Overall Description
3GPP TS 38.304: User Equipment (UE) procedures in idle mode and in RRC inactive state
3GPP TS 38.321: Medium Access Control (MAC) protocol
3GPP TS 38.322: Radio Link Control (RLC) protocol
3GPP TS 38.323: Packet Data Convergence Protocol (PDCP)
3GPP TS 38.331: Radio Resource Control (RRC) protocol
3GPP TS 37.324: Service Data Adaptation Protocol (SDAP)
3GPP TS 37.340: Multi-connectivity; Overall description
3GPP TS 23.287: Application layer support for V2X services; Functional architecture and information flows
3GPP TS 23.501: System Architecture for the 5G System
3GPP TS 23.502: Procedures for the 5G System
3GPP TS 23.503: Policy and Charging Control Framework for the 5G System; Stage 2
3GPP TS 24.501: Non-Access-Stratum (NAS) protocol for 5G System (5GS); Stage 3
3GPP TS 24.502: Access to the 3GPP 5G Core Network (5GCN) via non-3GPP access networks
3GPP TS 24.526: User Equipment (UE) policies for 5G System (5GS); Stage 3

E. 3GPP Signal Transmission/Reception Method

FIG. 8 is a diagram illustrating an example of a 3GPP signal transmission/reception method.

Referring to FIG. 8, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). The initial cell search procedure is described in detail in paragraph F. below.

After initial cell search, the UE can acquire broadcast information in the cell by receiving a physical broadcast channel (PBCH) from the BS. Further, the UE can receive a downlink reference signal (DL RS) in the initial cell search step to check a downlink channel state.

After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed. The random access procedure is described in detail in paragraph G. below.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH.

The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

F. Initial Access (IA) Process

Synchronization Signal Block (SSB) Transmission and Related Operation

FIG. 9 illustrates an SSB structure. The UE can perform cell search, system information acquisition, beam alignment for initial access, and DL measurement on the basis of an SSB. The SSB is interchangeably used with a synchronization signal/physical broadcast channel (SS/PBCH) bloc.

Referring to FIG. 9, the SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers. The PBCH is encoded/decoded on the basis of a polar code and modulated/demodulated according to quadrature phase shift keying (QPSK). The PBCH in the OFDM symbol includes data resource elements (REs) to which a complex modulation value of a PBCH is mapped and DMRS REs to which a demodulation reference signal (DMRS) for the PBCH is mapped. There are three DMRS REs per resource block of the OFDM symbol, and there are three data REs between the DMRS REs.

Cell Search

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

The cell search procedure of the UE may be summarized as shown in Table 1 below.

TABLE 1

| | Type of Signals | Operations |
|---|---|---|
| 1st step | PSS | SS/PBCH block (SSB) symbol timing acquisition Cell ID detection within a cell ID group(3 hypothesis) |
| 2nd Step | SSS | Cell ID group detection (336 hypothesis) |
| 3rd Step | PBCH DMRS | SSB index and Half frame (HF) index (Slot and frame boundary detection) |
| 4th Step | PBCH | Time information (80 ms, System Frame Number (SFN), SSB index, HF) Remaining Minimum System Information (RMSI) Control resource set (CORESET)/ Search space configuration |
| 5th Step | PDCCH and PDSCH | Cell access information RACH configuration |

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

FIG. 10 illustrates SSB transmission.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS). An SSB burst set is configured at a start portion of the SSB period. The SSB burst set includes a 5 ms time window (i.e., half-frame), and the SSB may be transmitted up to N times within the SS burst set. The maximum transmission number L of the SSB may be given as follows according to a frequency band of a carrier wave. One slot includes a maximum of two SSBs.

For frequency range up to 3 GHz, L=4

For frequency range from 3 GHz to 6 GHz, L=8

For frequency range from 6 GHz to 52.6 GHz, L=64

A time position of an SSB candidate in the SS burst set may be defined according to a subscriber spacing. The SSB candidate time position is indexed from 0 to L−1 (SSB index) in time order within the SSB burst set (i.e., half-frame).

A plurality of SSBs may be transmitted within a frequency span of a carrier wave. Physical layer cell identifiers of these SSBs need not be unique, and other SSBs may have different physical layer cell identifiers.

The UE may acquire the DL synchronization by detecting the SSB. The UE may identify a structure of the SSB burst set on the basis of the detected SSB (time) index and thus detect a symbol/slot/half-frame boundary. The number of the frame/half-frame to which the detected SSB belongs may be identified using system frame number (SFN) information and half-frame indication information.

Specifically, the UE may acquire a 10-bit SFN for a frame to which the PBCH belongs from the PBCH. Next, the UE may acquire 1-bit half-frame indication information. For example, if the UE detects a PBCH with a half-frame indication bit set to 0, it may determine that the SSB, to which the PBCH belongs, belongs to a first half-frame in the frame, and if the UE detects a PBCH with a half-frame indication bit set to 1, it may determine that the SSB, to which the PBCH belongs, belongs to a second half-frame in the frame. Finally, the UE may acquire an SSB index of the SSB to which the PBCH belongs on the basis of a DMRS sequence and PBCH payload carried by the PBCH.

Acquisition of System Information (SI)

SI is divided into a master information block (MIB) and a plurality of system information blocks (SIBs). The SI other than the MIB may be referred to as remaining minimum system information (RMSI). Details thereof may be referred to the following:

The MIB includes information/parameters for monitoring the PDCCH scheduling PDSCH carrying system information block1 (SIB1) and is transmitted by the BS through the PBCH of the SSB. For example, the UE may check whether a control resource set (CORESET) exists for the Type 0-PDCCH common search space on the basis of the MIB. The Type 0-PDCCH common search space is a kind of PDCCH search space and is used to transmit a PDCCH for scheduling an SI message. If the Type 0-PDCCH common search space is present, the UE may determine (i) a plurality of contiguous resource blocks and one or more consecutive resource blocks constituting a CORESET on the basis of information in the MIB (e.g., pdcch-ConfigSIB1) and (ii) a PDCCH occasion (e.g., time domain position for PDCCH reception). If no Type 0-PDCCH common search space exists, pdcch-ConfigSIB1 provides information on a frequency location where SSB/SIB1 exists and information on a frequency range where SSB/SIB1 does not exist.

SIB1 includes information related to availability and scheduling (e.g., transmission periodicity and SI-window size) of the remaining SIBs (hereinafter, SIBx, x is an integer equal to or greater than 2). For example, SIB1 may indicate whether the SIBx is periodically broadcast or provided according to a request from the UE on an on-demand basis. If SIBx is provided on the on-demand basis, SIB1 may include information necessary for the UE to perform the SI request. The SIB1 is transmitted through the PDSCH, the PDCCH for scheduling the SIB1 is transmitted through the Type 0-PDCCH common search space, and the SIB1 is transmitted through the PDSCH indicated by the PDCCH.

The SIBx is included in the SI message and transmitted via the PDSCH. Each SI message is transmitted within a time window (i.e., SI-window) that occurs periodically.

G. Random Access Procedure

The random access procedure of the UE may be summarized as shown in Table 2 and FIG. 11.

TABLE 2

| | Signal type | Acquired operation/information |
|---|---|---|
| First step | PRACH preamble in UL | Acquire initial beam<br>Random selection of random access preamble ID |
| Second step | Random access response on PDSCH | Timing advance information<br>Random access preamble ID<br>Initial UL grant, temporary C-RNTI |
| Third step | UL transmission on PUSCH | RRC connection request<br>UE identifier |
| Fourth step | Contention resolution on DL | Temporary C-RNTI on PDCCH for initial access<br>C-RNTI on PDCCH for RRC_CONNECTED UE |

The random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure.

FIG. 11 illustrates an example of a random access procedure. In particular, FIG. 11 illustrates a contention-based random access procedure.

First, a UE can transmit a random access preamble through a PRACH as Msg1 of a random access procedure in UL.

Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

Multiple preamble formats are defined by one or more RACH OFDM symbols and different cyclic prefixes (and/or guard time). RACH configuration for a cell is included in the system information of the cell and is provided to the UE. The RACH configuration includes information on a subcarrier spacing of the PRACH, available preambles, preamble format, and the like. The RACH configuration includes association information between SSBs and RACH (time-frequency) resources. The UE transmits a random access preamble in the RACH time-frequency resource associated with the detected or selected SSB.

A threshold value of the SSB for the RACH resource association may be set by the network, and RACH preamble is transmitted or retransmitted on the basis of the SSB in which reference signal received power (RSRP) measured on the basis of the SSB satisfies the threshold value. For example, the UE may select one of the SSB (s) satisfying the threshold value and may transmit or retransmit the RACH preamble on the basis of the RACH resource associated with the selected SSB.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

When the random access response information includes timing advance information for UL synchronization and an UL grant, and when a temporary UE receives a random response information regarding the UE itself on the PDSCH, the UE may know timing advance information for UL synchronization, an initial UL grant, and a UE temporary cell RNTI (cell RNTI, C-RNTI). The timing advance information is used to control uplink signal transmission timing. In order to ensure that the PUSCH/PUCCH transmission by the UE is better aligned with the subframe timing at a network end, the network (e.g. BS) may measure a time difference between the PUSCH/PUCCH/SRS reception and subframes and send timing advance information on the basis of the time difference. The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

Meanwhile, the contention-free random access procedure may be performed when the UE performs handover to another cell or BS or when the contention-free random access procedure is requested by a BS command. A basic process of the contention-free random access procedure is similar to the contention-based random access procedure. However, unlike the contention-based random access procedure in which the UE randomly selects a preamble to be used among a plurality of random access preambles, in the case of the contention-free random access procedure, a preamble (hereinafter referred to as a dedicated random access preamble) to be used by the UE is allocated by the BS to the UE. Information on the dedicated random access preamble may be included in an RRC message (e.g., a handover command) or may be provided to the UE via a PDCCH order. When the random access procedure is started, the UE transmits a dedicated random access preamble to the BS. When the UE receives the random access procedure from the BS, the random access procedure is completed.

As mentioned above, the UL grant in the RAR schedules PUSCH transmission to the UE. The PUSCH carrying initial UL transmission based on the UL grant in the RAR will be referred to as Msg3 PUSCH. The content of the RAR UL grant starts at an MSB and ends at a LSB and is given in Table 3.

TABLE 3

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

The TPC command is used to determine transmission power of the Msg3 PUSCH and is interpreted, for example, according to Table 4.

TABLE 4

| TPC command | value [dB] |
|---|---|
| 0 | −6 |
| 1 | −4 |
| 2 | −2 |
| 3 | 0 |
| 4 | 2 |
| 5 | 4 |
| 6 | 6 |
| 7 | 8 |

In the contention-free random access procedure, the CSI request field in the RAR UL grant indicates whether the UE includes an aperiodic CSI report in the corresponding PUSCH transmission. A subcarrier spacing for the Msg3 PUSCH transmission is provided by an RRC parameter. The UE will transmit the PRACH and Msg3 PUSCH on the same uplink carrier of the same service providing cell. A UL BWP for Msg3 PUSCH transmission is indicated by SIB1 (SystemInformationBlock1).

H. DL and UL Transmitting/Receiving Operations

DL Transmitting/Receiving Operation

A downlink grant (also referred to as a downlink assignment) may be divided into (1) dynamic grant and (2) configured grant. The dynamic grant, which is intended to maximize resource utilization, refers to a method of data transmission/reception on the basis of dynamic scheduling by the BS.

The BS schedules downlink transmission through a DCI. The UE receives on the PDCCH the DCI for downlink scheduling (i.e., including scheduling information of the PDSCH) from the BS. DCI format 1_0 or 1_1 may be used for downlink scheduling. The DCI format 1_1 for downlink scheduling may include, for example, the following information: an identifier for DCI format, a bandwidth part indicator, a frequency domain resource assignment, time domain resource assignment, MCS.

The UE may determine a modulation order, a target code rate, and a transport block size for the PDSCH on the basis of the MCS field in the DCI. The UE may receive the PDSCH in time-frequency resource according to frequency domain resource allocation information and time domain resource allocation information.

The DL grant is also referred to as semi-persistent scheduling (SPS). The UE may receive an RRC message including a resource configuration for transmission of DL data from the BS. In the case of the DL SPS, an actual DL configured grant is provided by the PDCCH and is activated or deactivated by the PDCCH. If the DL SPS is configured, at least the following parameters are provided to the UE via RRC signaling from the BS: a configured scheduling RNTI (CS-RNTI) for activation, deactivation and retransmission; and cycle. The actual DL grant of the DL SPS is provided to the UE by the DCI in the PDCCH addressed to the CS-RNTI. The UE activates an SPS associated with the CS-RNTI if specific fields of the DCI in the PDCCH addressed to the CS-RNTI are set to specific values for scheduling activation. The UE may receive downlink data through the PDSCH on the basis of the SPS.

UL Transmitting/Receiving Operation

The BS transmits a DCI including uplink scheduling information to the UE. The UE receives on the PDCCH the DCI for uplink scheduling (i.e., including scheduling information of the PUSCH) from the BS. DCI format 0_0 or 0_1 may be used for uplink scheduling. The DCI format 0_1 for uplink scheduling may include the following information: an identifier for DCI format, a bandwidth part indicator, a frequency domain resource assignment, a time domain resource assignment, MCS.

The UE transmits uplink data on the PUSCH on the basis of the DCI. For example, when the UE detects the PDCCH including the DCI format 0_0 or 0_1, the UE transmits the PUSCH according to an instruction based on the DCI. Two transmission schemes are supported for PUSCH transmission: codebook-based transmission and non-codebook-based transmission.

When an RRC parameter 'txConfig' receives an RRC message set to 'codebook', the UE is configured to a codebook-based transmission. Meanwhile, when an RRC message in which the RRC parameter 'txConfig' is set to 'nonCodebook' is received, the UE is configured to a non-codebook-based transmission. The PUSCH may be semi-statically scheduled by the DCI format 0_0, by the DCI format 0_1, or by RRC signaling.

The uplink grant may be divided into (1) a dynamic grant and (2) a configured grant.

FIG. 12 shows an example of an uplink grant. FIG. 12(a) illustrates an UL transmission process based on the dynamic grant, and FIG. 12(b) illustrates an UL transmission process based on the configured grant.

A dynamic grant, which is to maximize utilization of resources, refers to a data transmission/reception method based on dynamic scheduling by a BS. This means that when the UE has data to be transmitted, the UE requests uplink resource allocation from the BS and transmits the data using only uplink resource allocated by the BS. In order to use the uplink radio resource efficiently, the BS must know how much data each UE transmits on the uplink. Therefore, the UE may directly transmit information on uplink data to be transmitted to the BS, and the BS may allocate uplink resources to the UE on the basis of the information. In this case, the information on the uplink data transmitted from the UE to the BS is referred to as a buffer status report (BSR), and the BSR relates to the amount of uplink data stored in a buffer of the UE.

Referring to FIG. 12(a), an uplink resource allocation process for actual data when the UE does not have an uplink radio resource available for transmission of the BSR is illustrated. For example, since the UE which does not have a UL grant cannot available for UL data transmission cannot transmit the BSR through a PUSCH, the UE must request resource for uplink data must by starting transmission of a scheduling request via a PUCCH, and in this case, an uplink resource allocation process of five steps is used.

Referring to FIG. 12(a), if there is no PUSCH resource for transmitting a BSR, the UE first transmits a scheduling request (SR) to the BS in order to be allocated a PUSCH resource. The SR is used by the UE to request the BS for PUSCH resources for uplink transmission when a reporting event occurs but there is no PUSCH resource available to the UE. Depending on whether there is a valid PUCCH resource for the SR, the UE transmits the SR via the PUCCH or initiates a random access procedure. When the UE receives the UL grant from the BS, it transmits the BSR to the BS via the PUSCH resource allocated by the UL grant. The BS checks the amount of data to be transmitted by the UE on the uplink on the basis of the BSR and transmits a UL grant to the UE. The UE receiving the UL grant transmits actual uplink data to the BS through the PUSCH on the basis of the UL grant.

Referring to FIG. 12(b), the UE receives an RRC message including a resource configuration for transmission of UL data from the BS. There are two types of UL-configured grants in the NR system: Type 1 and Type 2. In the case of UL-configured grant type 1, an actual UL grant (e.g., time resource, frequency resource) is provided by RRC signaling, and in the case of Type 2, an actual UL grant is provided by the PDCCH and is activated or deactivated by the PDCCH. If the grant type 1 is configured, at least the following parameters are provided to the UE via RRC signaling from the BS: CS-RNTI for retransmission; periodicity of the configured grant type 1; information about a start symbol index S and a symbol length L for an intra-slot PUSCH; time domain offset representing an offset of the resource for SFN=0 in the time domain; MCS index indicating modulation order, target code rate, and transport block size. If the grant type 2 is configured, at least the following parameters are provided to the UE via RRC signaling from the BS: CS-RNTI for activation, deactivation and retransmission; periodicity of configured grant type 2. The actual UL grant of the configured grant type 2 is provided to the UE by the DCI in the PDCCH addressed to the CS-RNTI. If the specific fields of the DCI in the PDCCH addressed to the CS-RNTI are set to a specific value for scheduling activation, the UE activates the configured grant type 2 associated with the CS-RNTI.

The UE may perform uplink transmission via the PUSCH on the basis of the configured grant according to the type 1 or type 2.

Resources for initial transmission by the configured grant may or may not be shared by one or more UEs.

FIG. 13 shows an example of a conceptual diagram of uplink physical channel processing.

Each of the blocks shown in FIG. 13 may be performed in each module in the physical layer block of a transmission device. More specifically, the uplink signal processing in FIG. 13 may be performed in the processor of the UE/BS described in this specification. Referring to FIG. 13, the uplink physical channel processing may be performed through scrambling, modulation mapping, layer mapping, transform precoding, precoding, resource element mapping, and SC-FDMA signal generation (SC-FDMA signal generation). Each of the above processes may be performed separately or together in each module of the transmission device. The transform precoding is spreading UL data in a special way to reduce a peak-to-average power ratio (PAPR) of a waveform, and is a kind of discrete Fourier transform (DFT). OFDM using a CP together with the transform precoding that performs DFT spreading is called DFT-s-OFDM, and OFDM using a CP without DFT spreading is called CP-OFDM. Transform precoding may optionally be applied if it is enabled for the UL in an NR system. That is, the NR system supports two options for UL waveforms, one of which is CP-OFDM and the other is DFT-s-OFDM. Whether the UE must use the CP-OFDM as a UL transmit waveform or the DFT-s-OFDM as a UL transmit waveform is provided from the BS to the UE via RRC parameters. FIG. 13 is a conceptual diagram of uplink physical channel processing for DFT-s-OFDM. In the case of CP-OFDM, the transform precoding among the processes of FIG. 13 is omitted.

More specifically, the transmission device scrambles coded bits in a codeword by a scrambling module, and then transmits the coded bits through a physical channel. Here, the codeword is acquired by encoding a transport block. The scrambled bits are modulated by a modulation mapping module into complex-valued modulation symbols. The modulation mapping module may modulate the scrambled bits according to a predetermined modulation scheme and arrange the modulated bits as complex-valued modulation symbols representing a position on a signal constellation. pi/2-BPSK (pi/2-Binary Phase Shift Keying), m-PSK (m-Phase Shift Keying) or m-QAM (m-Quadrature Amplitude Modulation) may be used for modulating the coded data. The complex-valued modulation symbols may be mapped to one or more transport layers by a layer mapping module. The complex-valued modulation symbols on each layer may be precoded by a precoding module for transmission on an antenna port. If the transform precoding is enabled, the precoding module may perform precoding after performing transform precoding on the complex-valued modulation symbols as shown in FIG. 13. The precoding module may process the complex-valued modulation symbols in a MIMO manner according to multiple transmission antennas to output antenna-specific symbols, and distribute the antenna-specific symbols to a corresponding resource element mapping module. An output z of the precoding module may be acquired by multiplying an output y of the layer mapping module by a precoding matrix W of N×M. Here, N is the number of antenna ports and M is the number of layers. The resource element mapping module maps the complex-valued modulation symbols for each antenna port to an appropriate resource element in the resource block allocated for transmission. The resource element mapping module may map the complex-valued modulation symbols to appropriate subcarriers and multiplex the same according to users. The SC-FDMA signal generation module (CP-OFDM signal generation module if the transform precoding is disabled) modulates the complex-valued modulation symbol according to a specific modulation scheme, for example, an OFDM scheme, to generate a complex-valued time domain OFDM (Orthogonal Frequency Division Multiplexing) symbol signal. The signal generation module may perform Inverse Fast Fourier Transform (IFFT) on the antenna specific symbol, and a CP may be inserted into the time domain symbol on which the IFFT has been performed. The OFDM symbol undergoes digital-to-analog conversion, upconverting, and the like, and transmitted to a reception device through each transmission antenna. The signal generation module may include an IFFT module and a CP inserter, a digital-to-analog converter (DAC), and a frequency uplink converter.

A signal processing procedure of a reception device may be the reverse of the signal processing procedure of the transmission device. Details thereof may be referred to the above contents and FIG. 13.

Next, the PUCCH will be described.

The PUCCH supports a plurality of formats, and the PUCCH formats may be classified according to symbol duration, payload size, multiplexing, and the like. Table 5 below illustrates PUCCH formats.

TABLE 5

| Format | PUCCH length in OFDM symbols | Number of bits | Usage | Etc. |
| --- | --- | --- | --- | --- |
| 0 | 1-2 | ≤2 | 1 | Sequence selection |
| 1 | 4-14 | ≤2 | 2 | Sequence modulation |

TABLE 5-continued

| Format | PUCCH length in OFDM symbols | Number of bits | Usage | Etc. |
| --- | --- | --- | --- | --- |
| 2 | 1-2 | >2 | 4 | CP-OFDM |
| 3 | 4-14 | >2 | 8 | DFT-s-OFDM(no UE multiplexing) |
| 4 | 4-14 | >2 | 16 | DFT-s-OFDM(Pre DFT orthogonal cover code(OCC)) |

The PUCCH formats shown in Table 5 may be divided into (1) a short PUCCH and (2) a long PUCCH. PUCCH formats 0 and 2 may be included in the short PUCCH, and PUCCH formats 1, 3 and 4 may be included in the long PUCCH.

FIG. 14 shows an example of an NR slot in which a PUCCH is transmitted.

The UE transmits one or two PUCCHs through serving cells in different symbols in one slot. When the UE transmits two PUCCHs in one slot, at least one of the two PUCCHs has a structure of the short PUCCH.

I. eMBB (Enhanced Mobile Broadband Communication)

In the case of the NR system, a massive multiple input multiple output (MIMO) environment in which the transmit/receive antennas are significantly increased may be considered. That is, as the large MIMO environment is considered, the number of transmit/receive antennas may increase to several tens or hundreds or more. Meanwhile, the NR system supports communication in above 6 GHz band, that is, the millimeter frequency band. However, the millimeter frequency band has a frequency characteristic in which signal attenuation according to a distance is very sharp due to the use of a frequency band which is too high. Therefore, an NR system using the band of 6 GHz or higher uses a beamforming technique in which energy is collected and transmitted in a specific direction, not in all directions, in order to compensate for sudden propagation attenuation characteristics. In the massive MIMO environment, a hybrid type beamforming technique combining an analog beamforming technique and a digital beamforming technique is required depending on a position to which a beamforming weight vector/precoding vector is applied, to reduce complexity of hardware implementation, increase performance using multiple antennas, obtain flexibility of resource allocation, and facilitate beam control for each frequency.

Hybrid Beamforming

FIG. 15 illustrates an example of a block diagram of a transmitter and a receiver for hybrid beamforming.

As a method for forming a narrow beam in a millimeter frequency band, a beam forming scheme in which energy is increased only in a specific direction by transmitting the same signal using a phase difference suitable for a large number of antennas in a BS or a UE is mainly considered. Such beamforming scheme includes digital beamforming to create a phase difference in a digital baseband signal, analog beamforming to create a phase difference in a modulated analog signal using time delay (i.e., cyclic shift), and hybrid beamforming using both digital beamforming and analog beamforming, or the like. If each antenna element has an RF unit (or transceiver unit (TXRU)) to adjust transmission power and phase, independent beamforming is possible for each frequency resource. However, it is not effective in terms of price to install an RF unit in all 100 antenna elements. That is, since the millimeter frequency band requires a large number of antennas to compensate for the sudden attenuation characteristics and digital beamforming requires an RF component (e.g., a digital-to-analog converter (DAC), a mixer, a power amplifier, a linear amplifier, and the like), implementation of digital beamforming in the millimeter frequency band causes the price of the communication device to increase. Therefore, when a large number of antennas are required such as in the millimeter frequency band, the use of analog beamforming or hybrid beamforming is considered. In the analog beamforming scheme, a plurality of antenna elements are mapped to one TXRU and a direction of a beam is adjusted by an analog phase shifter. Such an analog beamforming scheme may generate only one beam direction in the entire band, and thus, it cannot perform frequency selective beamforming (BF). Hybrid BF is an intermediate form of digital BF and analog BF and has B RF units fewer than Q antenna elements. In the case of the hybrid BF, directions of beams that may be transmitted at the same time is limited to B or less, although there is a difference depending on a method of connecting the B RF units and Q antenna elements.

Beam Management (BM)

The BM process includes processes for acquiring and maintaining a set of BS (or a transmission and reception point (TRP)) and/or UE beams that may be used for downlink (DL) and uplink (UL) transmission/reception and may include the following processes and terms.

beam measurement: operation for BS or UE to measure characteristic of received beamforming signal.

beam determination: operation for BS or UE to select its own Tx beam/Rx beam.

beam sweeping: an operation to cover spatial domain using transmission and/or reception beam during a predetermined time interval in a predetermined manner.

beam report: an operation for UE to report information of beamformed signal on the basis of beam measurement.

The BM process may be classified into (1) DL BM process using SSB or CSI-RS and (2) UL BM process using SRS (sounding reference signal). Also, each BM process may include Tx beam sweeping to determine Tx beam and Rx beam sweeping to determine Rx beam.

DL BM Process

The DL BM process may include (1) transmission of beamformed DL RSs (e.g., CSI-RS or SSB) by the BS, and (2) beam reporting by the UE.

Here, the beam report may include a preferred DL RS ID(s) and a corresponding reference signal received power (RSRP). The DL RS ID may be an SSBRI (SSB Resource Indicator) or a CRI (CSI-RS Resource Indicator).

FIG. 16 shows an example of beamforming using SSB and CSI-RS.

As shown in FIG. 16, the SSB beam and the CSI-RS beam may be used for beam measurement. The measurement metric is an RSRP per resource/block. The SSB may be used for coarse beam measurement, and the CSI-RS may be used for fine beam measurement. SSB may be used for both Tx beam sweeping and Rx beam sweeping. Rx beam sweeping using the SSB may be performed by attempting to receive the SSB while the UE changes the Rx beam for the same SSBRI across multiple SSB bursts. Here, one SS burst may include one or more SSBs, and one SS burst set includes one or more SSB bursts.

1. DL BM Using SSB

FIG. 17 is a flowchart illustrating an example of a DL BM process using SSB.

A configuration for beam report using the SSB is performed at the time of channel state information (CSI)/beam configuration in RRC_CONNECTED.

The UE receives from the BS a CSI-ResourceConfig IE including a CSI-SSB-ResourceSetList for the SSB resources used for the BM (S410). The RRC parameter csi-SSB-ResourceSetList represents a list of SSB resources used for beam management and reporting in one resource set. Here, the SSB resource set may be configured to {SSBx1, SSBx2, SSBx3, SSBx4}. The SSB index may be defined from 0 to 63.

The UE receives signals on the SSB resources from the BS on the basis of the CSI-SSB-ResourceSetList (S420).

If the CSI-RS reportConfig associated with reporting on the SSBRI and reference signal received power (RSRP) is configured, the UE reports the best SSBRI and its corresponding RSRP to the BS S430). For example, if the reportQuantity of the CSI-RS reportConfig IE is set to 'ssb-Index-RSRP', the UE reports the best SSBRI and a corresponding RSRP to the BS.

When the CSI-RS resource is configured in the same OFDM symbol (s) as the SSB and 'QCL-Type D' is applicable, the UE may assume that the CSI-RS and the SSB are quasi co-located (QCL-ed) in terms of 'QCL-TypeD'. Here, QCL-TypeD may refer to QCL-ed between antenna ports in terms of spatial Rx parameter. The same receive beam may be applied when the UE receives signals of a plurality of DL antenna ports in the QCL-TypeD relationship. Details of QCL may refer to a section 4. QCL below.

2. DL BM Using CSI-RS

Referring to the use of CSI-RS, i) if a repetition parameter is set for a specific CSI-RS resource set and TRS_info is not configured, CSI-RS is used for beam management. ii) If the repetition parameter is not set and TRS_info is set, the CSI-RS is used for a tracking reference signal (TRS). Iii) If the repetition parameter is not set and TRS_info is not set, the CSI-RS is used for CSI acquisition.

(RRC Parameter) If the repetition is set to 'ON', it relates to a Rx beam sweeping process of the UE. If the repetition is set to 'CON', the UE may assume that if NZP-CSI-RS-ResourceSet is configured, signals of at least one CSI-RS resource in the NZP-CSI-RS-ResourceSet are transmitted in the same downlink space domain filter. That is, at least one CSI-RS resource in the NZP-CSI-RS-ResourceSet is transmitted through the same Tx beam. Here, signals of at least one CSI-RS resource in the NZP-CSI-RS-ResourceSet may be transmitted in different OFDM symbols.

Meanwhile, if the repetition is set to 'OFF', it relates to a Tx beam sweeping process of the BS. If the repetition is set to 'OFF', the UE does not assume that signals of at least one CSI-RS resource in the NZP-CSI-RS-ResourceSet are transmitted in the same downlink spatial domain transmission filter. That is, the signals of at least one CSI-RS resource in the NZP-CSI-RS-ResourceSet are transmitted through different Tx beams. FIG. 18 shows another example of the DL BM process using CSI-RS.

FIG. 18(a) shows a process of Rx beam determination (or refinement) of the UE, and FIG. 18(b) shows a Tx beam sweeping process of the BS. FIG. 18(a) shows a case where the repetition parameter is set to 'CON', and FIG. 18(b) shows a case where the repetition parameter is set to 'OFF'.

A process of determining the Rx beam of the UE will be described with reference to FIGS. 18(a) and 19.

FIG. 19 is a flowchart illustrating an example of a process of determining a reception beam of a UE.

The UE receives an NZP CSI-RS resource set IE including the RRC parameter regarding 'repetition' from the BS through RRC signaling (S610). Here, the RRC parameter 'repetition' is set to 'ON'.

The UE repeatedly receives signals on the resource(s) in the CSI-RS resource in which the RRC parameter 'repetition' is set to 'CON' in different OFDM (s) through the same Tx beam (or DL space domain transmission filter) of the BS (S620).

The UE determines its own Rx beam (S630).

The UE omits the CSI reporting (S640). That is, the UE may omit CSI reporting when the uplink RRC parameter 'repetition' is set to 'ON'.

A Tx beam determining process of the BS will be described with reference to FIGS. 18(b) and 20.

FIG. 20 is a flowchart illustrating an example of a transmission beam determining process of the BS.

The UE receives an NZP CSI-RS resource set IE including an RRC parameter regarding 'repetition' from the BS through RRC signaling (S710). Here, the RRC parameter 'repetition' is set to 'OFF' and is related to the Tx beam sweeping process of the BS.

The UE receives signals on the resources in the CSI-RS resource in which the RRC parameter 'repetition' is set to 'OFF' through different Tx beams (DL spatial domain transmission filters) of the BS (S720).

The UE selects (or determines) the best beam (S730)

The UE reports an ID (e.g., CRI) for the selected beam and related quality information (e.g., RSRP) to the BS (S740). That is, the UE reports the CRI and the RSRP to the BS when the CSI-RS is transmitted for the BM.

FIG. 21 shows an example of resource allocation in time and frequency domains related to the operation of FIG. 18.

When repetition 'ON' is set in the CSI-RS resource set, a plurality of CSI-RS resources are repeatedly used by applying the same transmission beam, and when repetition 'OFF' is set in the CSI-RS resource set, different CSI-RS resources may be transmitted in different transmission beams.

3. DL BM-Related Beam Indication

The UE may receive a list of up to M candidate transmission configuration indication (TCI) states for at least a quasi co-location (QCL) indication via RRC signaling. Here, M depends on UE capability and may be 64.

Each TCI state may be configured with one reference signal (RS) set. Table 6 shows an example of a TCI-State IE. The TCI-State IE is associated with a quasi co-location (QCL) type corresponding to one or two DL reference signals (RSs).

TABLE 6

```
-- ASN1START
-- TAG-TCI-STATE-START
TCI-State ::=        SEQUENCE {
    tci-StateId                        TCI-StateId,
    qcl-Type1                          QCL-Info,
    qcl-Type2                          QCL-Info
                     OPTIONAL,    -- Need R
    ...
}
QCL-Info ::=         SEQUENCE {
    cell
```

TABLE 6-continued

```
    ServCellIndex
                     OPTIONAL,       -- Need R
    bwp-Id                            BWP-Id
                     OPTIONAL, -- Cond CSI-RS-
Indicated
        referenceSignal               CHOICE {
            csi-rs
            NZP-CSI-RS-ResourceId,
            ssb
            SSB-Index
        },
        qcl-Type
        ENUMERATED {typeA, typeB, typeC, typeD},
        ...
    }
-- TAG-TCI-STATE-STOP
-- ASN1STOP
```

In Table 6, 'bwp-Id' denotes a DL BWP where RS is located, 'cell' denotes a carrier where RS is located, 'referencesignal' denotes a reference antenna port(s) which is a QCL-ed source for target antenna port(s) or a reference signal including the same. The target antenna port(s) may be CSI-RS, PDCCH DMRS, or PDSCH DMRS.

4. QCL (Quasi-co Location)

The UE may receive a list including up to M TCI-state configurations to decode the PDSCH according to the detected PDCCH having an intended DCI for the UE and a given cell. Here, M depends on the UE capability.

As illustrated in Table 6, each TCI-State includes a parameter for establishing a QCL relationship between one or two DL RSs and the DM-RS port of the PDSCH. The QCL relationship is configured with a RRC parameter qcl-Type1 for the first DL RS and a qcl-Type2 (if set) for the second DL RS.

The QCL type corresponding to each DL RS is given by the parameter 'qcl-Type' in QCL-Info and may have one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is a specific NZP CSI-RS, corresponding NZP CSI-RS antenna ports may be instructed/configured to be QCL-ed with a specific TRS in terms of QCL-Type A and QCL-ed with a specific SSB in terms of QCL-Type D. The thusly instructed/configured UE may receive the corresponding NZP CSI-RS using a Doppler and delay value measured by the QCL-TypeA TRS and apply a reception beam used for receiving the QCL-TypeD SSB to the corresponding NZP CSI-RS reception.

UL BM Process

In the UL BM, a Tx beam-Rx beam reciprocity (or beam correspondence) may be or may not be established depending on UE implementation. If the Tx beam-Rx beam reciprocity is established in both the BS and the UE, a UL beam pair may be matched through a DL beam pair. However, if the Tx beam-Rx beam reciprocity is not established in either the BS or the UE, a UL beam pair determining process is required, apart from DL beam pair determination.

In addition, even when the BS and the UE maintain beam correspondence, the BS may use the UL BM process for DL Tx beam determination without requesting the UE to report a preferred beam.

The UL BM may be performed through beamformed UL SRS transmission and whether to apply the UL BM of the SRS resource set is configured by the RRC parameter in a (RRC parameter) usage. If the usage is configured as 'Beam-Management (BM)', only one SRS resource may be transmitted for each of a plurality of SRS resource sets at a given time instant.

The UE may be configured with one or more sounding reference signal (SRS) resource sets (through RRC signaling, etc.) set by the (RRC parameter) SRS-ResourceSet. For each SRS resource set, SRS resources may be set for the UE. Here, K is a natural number, and a maximum value of K is indicated by SRS_capability.

Like the DL BM, the UL BM process may also be divided into Tx beam sweeping of the UE and Rx beam sweeping of the BS.

FIG. 22 shows an example of a UL BM process using SRS.

FIG. 22(a) shows a process of determining Rx beamforming of a BS, and FIG. 22(b) shows a process of sweeping Tx beam of the UE.

FIG. 23 is a flowchart illustrating an example of a UL BM process using SRS.

The UE receives RRC signaling (e.g., SRS-Config IE) including an (RRC parameter) usage parameter set to 'beam management' from the BS (S1010). An SRS-Config IE is used for configuration of SRS transmission. The SRS-Config IE includes a list of SRS-Resources and a list of SRS-ResourceSets. Each SRS resource set refers to a set of SRS-resources.

The UE determines Tx beamforming for the SRS resource to be transmitted on the basis of SRS-SpatialRelation Info included in the SRS-Config IE (S1020). Here, the SRS-SpatialRelation Info is configured for each SRS resource and indicates whether to apply the same beamforming as that used in SSB, CSI-RS, or SRS for each SRS resource.

If SRS-SpatialRelationInfo is configured in the SRS resource, the same beamforming as that used in SSB, CSI-RS, or SRS is applied and transmitted. However, if SRS-SpatialRelationInfo is not configured in the SRS resource, the UE randomly determines the Tx beamforming and transmits the SRS through the determined Tx beamforming (S1030).

More specifically, regarding P-SRS in which 'SRS-ResourceConfigType' is set to 'periodic':

i) If the SRS-SpatialRelationInfo is set to 'SSB/PBCH', the UE transmits the corresponding SRS by applying the same spatial domain transmission filter (or generated from the corresponding filter) as the spatial domain Rx filter used for receiving SSB/PBCH; or ii) If the SRS-SpatialRelationInfo is set to 'CSI-RS', the UE transmits the SRS by applying the same spatial domain transmission filter used for receiving the CSI-RS; or iii) When SRS-SpatialRelationInfo is set to 'SRS', the UE transmits the corresponding SRS by applying the same spatial domain transmission filter used for transmitting the SRS.

In addition, the UE may receive or may not receive a feedback on the SRS from the BS as in the following three cases (S1040).

i) When Spatial_Relation_Info is set for all SRS resources in the SRS resource set, the UE transmits the SRS to the beam indicated by the BS. For example, if Spatial_Relation_Info indicates SSB, CRI, or SRI in which Spatial_Relation_Info is the same, the UE repeatedly transmits the SRS on the same beam.

ii) Spatial_Relation_Info may not be set for all SRS resources in the SRS resource set. In this case, the UE may freely transmit while changing the SRS beamforming.

iii) Spatial_Relation_Info may only be set for some SRS resources in the SRS resource set. In this case, the SRS is transmitted on the indicated beam for the set SRS resource, and for an SRS resource in which Spatial_Relation_Info is not set, the UE may transit the SRS resource by randomly applying Tx beamforming.

A Beam Failure Recovery (BFR) Process

In a beamformed system, a radio link failure (RLF) may occur frequently due to rotation, movement, or beamforming blockage of the UE. Therefore, BFR is supported in NR to prevent frequent occurrence of the RLFs. The BFR is similar to the radio link failure recovery process and may be supported if the UE knows the new candidate beam(s).

For beam failure detection, the BS configures beam failure detection reference signals for the UE, and if the number of times of beam failure indications from the physical layer of the UE reaches a threshold set by the RRC signaling within a period set by the RRC signaling of the BS, the UE declares beam failure.

After the beam failure is detected, the UE triggers a beam failure recovery by initiating a random access procedure on the PCell; and performs beam failure recovery by selecting a suitable beam (If the BS provides dedicated random access resources for certain beams, they are prioritized by the UE). Upon completion of the random access procedure, beam failure recovery is considered to be completed.

J. URLLC (Ultra-Reliable and Low Latency Communication)

The URLLC transmission defined by the NR may refer to transmission for (1) a relatively low traffic size, (2) a relatively low arrival rate, (3) an extremely low latency requirement (e.g., 0.5, 1 ms), (4) relatively short transmission duration (e.g., 2 OFDM symbols), and (5) urgent service/message, etc.

In the case of UL, transmission for a particular type of traffic (e.g., URLLC) needs to be multiplexed with other previously scheduled transmissions (e.g., eMBB) to meet a more stringent latency requirement. In this regard, one method is to give information indicating that a scheduled UE will be preempted for a specific resource, and allow the URLLC UE to use the resource for UL transmission.

Pre-Emption Indication

In the case of NR, dynamic resource sharing between eMBB and URLLC is supported. eMBB and URLLC services may be scheduled on non-overlapping time/frequency resources and URLLC transmission may occur on scheduled resources for ongoing eMBB traffic. The eMBB UE may not know whether PDSCH transmission of the UE is partially punctured and the UE may not be able to decode the PDSCH due to corrupted coded bits. In consideration of this, NR provides a preemption indication. The preemption indication may also be referred to as an interrupted transmission indication.

With respect to the preamble indication, the UE receives DownlinkPreemption IE through RRC signaling from the BS. Table 7 below shows an example of the DownlinkPreemption IE.

TABLE 7

```
-- ASN1START
-- TAG-DOWNLINKPREEMPTION-START
DownlinkPreemption ::=          SEQUENCE {
    int-RNTI                        RNTI-Value,
    timeFrequencySet                ENUMERATED {set0, set1},
    dci-PayloadSize                 INTEGER (0..maxINT-DCI-
PayloadSize),
    int-ConfigurationPerServingCell         SEQUENCE (SIZE
(1..maxNrofServingCells)) OF INT-ConfigurationPerServingCell,
    ...
}
INT-ConfigurationPerServingCell ::= SEQUENCE {
    servingCellId                   ServCellIndex,
    positionInDCI                   INTEGER (0..maxINT-DCI-PayloadSize-
1)
}
-- TAG-DOWNLINKPREEMPTION-STOP
-- ASN1STOP
```

If the UE is provided with the DownlinkPreemption IE, the UE is configured with an INT-RNTI provided by a parameter int-RNTI in the DownlinkPreemption IE to monitor a PDCCH conveying the DCI format 2_1. The UE is further configured with a set of serving cells and a corresponding set of locations for fields in the DCI format 2_1 by positionInDCl by an INT-ConfigurationPerServing Cell including a set of serving cell indices provided by a servingCellID, is configured with an information payload size for DCI format 2_1 by dci-PayloadSize, and is configured with granularity of time-frequency resources by timeFrequencySect.

The UE receives the DCI format 2_1 from the BS on the basis of the DownlinkPreemption IE.

If the UE detects the DCI format 2_1 for a serving cell in the set of serving cells, the UE may assume there is no transmission to the UE in PRBs and symbols indicated by the DCI format 2_1 among sets of PRBs and sets of symbols in the last monitoring period before a monitoring period to which the DCI format 2_1 belongs. For example, referring to FIG. 9A, the UE determines that a signal in the time-frequency resource indicated by pre-emption is not a DL transmission scheduled for the UE itself and decodes data on the basis of signals received in the remaining resource area.

FIG. 24 is a diagram showing an example of an preemption indication method.

A combination of {M,N} is set by the RRC parameter timeFrequencySet. {M, N}={14,1}, {7,2}.

FIG. 25 shows an example of a time/frequency set of a preemption indication.

A 14-bit bitmap for a preemption indication indicates one or more frequency parts (N>=1) and/or one or more time domain parts (M>=1). In the case of {M, N}={14,1}, as shown in FIG. 25(a), 14 parts in the time domain correspond one-to-one to 14 bits of the 14-bit bit map, and a part corresponding to a bit set to 1, among the 14 bits, is part including pre-empted resources. In the case of {M, N}={7, 2}, as shown in FIG. 25(b), the time-frequency resources of the monitoring period is divided into seven parts in the time domain and two parts in the frequency domain, so as to be divided into a total of 14 time-frequency parts. The total of 14 time-frequency parts correspond one-to-one to the 14 bits of the 14-bit bitmap, and the part corresponding to the bit set to 1 among the 14 bits includes the pre-empted resources.

K. MMTC (Massive MTC)

The massive machine type communication (mMTC) is one of the 5G scenarios for supporting a hyper-connection service that simultaneously communicates with a large number of UEs. In this environment, the UE intermittently performs communication with a very low transfer rate and mobility. Therefore, mMTC is aimed at how low cost and for how long the UE can be driven. In this regard, MTC and NB-IoT, which are dealt with in 3GPP will be described.

Hereinafter, a case where a transmission time interval of a physical channel is a subframe will be described as an example. For example, a case where a minimum time interval from a start of transmission of one physical channel (e.g., MPDCCH, PDSCH, PUCCH, PUSCH) to a start of transmission of a next physical channel is one subframe will be described as an example. In the following description, the subframe may be replaced by a slot, a mini-slot, or multiple slots.

MTC (Machine Type Communication)

MTC (Machine Type Communication), which is an application that does not require much throughput applicable to M2M (Machine-to-Machine) or IoT (Internet-of-Things), refers to a communication technology adopted to meet the requirements of the IoT service in 3GPP (3rd Generation Partnership Project).

The MTC may be implemented to meet the criteria of (1) low cost & low complexity, (2) enhanced coverage, and (3) low power consumption.

In 3GPP, MTC has been applied since release 10 (3GPP standard document version 10.x.x.) and features of MTC added for each release of 3GPP will be briefly described.

First, the MTC described in 3GPP Release 10 and Release 11 relates to a load control method. The load control method is to prevent IoT (or M2M) devices from suddenly loading the BS. More specifically, 3GPP Release 10 relates to a method of controlling a load by disconnecting IoT devices when the load occurs, and Release 11 relates to a method of preventing connection of the UE in advance by informing the UE about connection to a cell later through system information of the cell. In Release 12, features for low cost MTC are added, for which UE category 0 is newly defined. The UE category is an indicator indicating how much data the UE may handle at a communication modem. A UE in UE category 0 is a UE with a reduced peak data rate and relaxed radio frequency (RF) requirements, thus reducing baseband and RF complexity. In Release 13, a technology called eMTC (enhanced MTC) was introduced, which allows the UE to operate only at 1.08 MHz, a minimum frequency bandwidth supported by legacy LTE, thereby lowering the price and power consumption of the UE.

The contents described hereinafter is features mainly related to eMTC but may also be equally applicable to the MTC, eMTC, 5G (or NR) unless otherwise mentioned. Hereinafter, for convenience of explanation, MTC will be collectively described.

Therefore, the MTC described below may referred to as the enhanced MTC (eMTC), the LTE-M1/M2, BL (bandwidth reduced low complexity/CE (coverage enhanced), non-BL UE (in enhanced coverage), NR MTC, enhanced BL/CE, and the like. That is, the term MTC may be replaced with terms to be defined in the 3GPP standard in the future.

MTC General Features (1) MTC operates only within a specific system bandwidth (or channel bandwidth).

MTC may use six resource blocks (RBs) in the system band of the legacy LTE as shown in FIG. 26 or use a specific number of RBs in the system band of the NR system. The frequency bandwidth in which the MTC operates may be defined in consideration of a frequency range of NR and subcarrier spacing. Hereinafter, a specific system or frequency bandwidth in which the MTC operates is referred to as an MTC narrowband (NB). In the NR, the MTC may operate in at least one bandwidth part (BWP) or in a specific band of BWP.

MTC follows a narrowband operation to transmit and receive physical channels and signals, and a maximum channel bandwidth in which the MTC UE is operable is reduced to 1.08 MHz or six (LTE) RBs.

The narrowband may be used as a reference unit in resource allocation units of some downlink and uplink channels, and a physical location of each narrowband in the frequency domain may be defined to be different depending on the system bandwidth.

The bandwidth of 1.08 MHz defined in MTC is defined for the MTC UE to follow the same cell search and random access procedure as the legacy UE.

MTC may be supported by cells having a bandwidth (e.g., 10 MHz) much larger than 1.08 MHz but the physical channels and signals transmitted and received by the MTC are always limited to 1.08 MHz. The system with having much larger bandwidth may be legacy LTE, NR systems, 5G systems, and the like.

A narrowband is defined as six non-overlapping consecutive physical resource blocks in the frequency domain.

FIG. 26(*a*) is a diagram showing an example of a narrowband operation, and FIG. 26(*b*) is a diagram showing an example of repetition having RF retuning.

Frequency diversity by RF retuning will be described with reference to FIG. 26(*b*).

Due to narrowband RF, single antenna and limited mobility, the MTC supports limited frequency, space and time diversity. In order to reduce fading and outage, frequency hopping is supported by MTC between different narrow bands by RF retuning.

In MTC, frequency hopping is applied to different uplink and downlink physical channels when repetition is possible. For example, if 32 subframes are used for PDSCH transmission, first 16 subframes may be transmitted on a first narrowband. Here, the RF front end is retuned to another narrow band, and the remaining 16 subframes are transmitted on the second narrow band.

The narrowband of MTC may be set to the UE via system information or DCI (downlink control information) transmitted by the BS.

(2) The MTC operates in a half duplex mode and uses a limited (or reduced) maximum transmit power. The half duplex mode refers to a mode in which a communication device operates only in an uplink or a downlink at one frequency at one time point and operates in a downlink or an uplink at another frequency at another time point. For example, when the communication device operates in the half-duplex mode, the communication device performs communication using the uplink frequency and the downlink frequency, and the communication device may not use the uplink frequency and the downlink frequency at the same time. The communication device divides time to perform uplink transmission through the uplink frequency and the downlink reception by re-tuning to the downlink frequency for another predetermined time.

(3) MTC does not use channels (defined in legacy LTE or NR) that must be distributed over the entire system bandwidth of the legacy LTE or NR. For example, in the MTC, the PDCCH of the legacy LTE is not used because the PDCCH is distributed over the entire system bandwidth. Instead, a new control channel, MPDCCH (MTC PDCCH), is defined in the MTC. The MPDCCH is transmitted/received within a maximum of 6 RBs in the frequency domain.

(4) MTC uses the newly defined DCI format. For example, DCI formats 6-0A, 6-0B, 6-1A, 6-1B, 6-2, etc., may be used as a DCI format for MTC (see 3GPP TS 36.212).

(5) In the case of MTC, a physical broadcast channel (PBCH), a physical random access channel (PRACH), an MTC physical downlink control channel (MPDCCH), a physical downlink shared channel (PDSCH), a physical uplink control channel (PUCCH), and a physical uplink shared channel (PUSCH) may be repeatedly transmitted. Due to the MTC repeated transmission, an MTC channel may be decoded even when signal quality or power is very poor, such as in an inadequate environment such as a basement, thereby increasing a cell radius and increasing a penetration effect.

(6) In MTC, PDSCH transmission based on PDSCH scheduling (DCI) and PDSCH scheduling may occur in different subframes (cross-subframe scheduling).

(7) In the LTE system, the PDSCH carrying a general SIB1 is scheduled by the PDCCH, whereas all the resource allocation information (e.g., subframe, transport block size, narrowband index) for SIB1 decoding is determined by a parameter of the MIB and no control channel is used for SIB1 decoding of the MTC.

(8) All resource allocation information (subframe, TBS, subband index) for SIB2 decoding is determined by several SIB1 parameters and no control channel for SIB2 decoding of MTC is used.

(9) The MTC supports an extended paging (DRX) cycle. Here, the paging period refers to a period during which the UE must be wake up to check whether there is a paging from a network even when the UE is in a discontinuous reception (DRX) mode in which it does not attempt to receive a downlink signal for power saving.

(10) MTC may use the same PSS (Primary Synchronization Signal)/SSS (Secondary Synchronization Signal)/CRS (Common Reference Signal) used in legacy LTE or NR. In the case of NR, the PSS/SSS is transmitted on an SSB basis, and a tracking RS (TRS) is a cell-specific RS and may be used for frequency/time tracking.

MTC Operation Mode and Level

Next, an MTC operation mode and level will be described. MTC is classified into two operation modes (first mode, second mode) and four different levels for coverage improvement as shown in Table 8 below.

The MTC operation mode is referred to as a CE (Coverage Enhancement) mode. In this case, the first mode may be referred to as a CE mode A, and the second mode may be referred to as a CE mode B.

TABLE 8

| Mode | Level | Description |
| --- | --- | --- |
| Mode A | Level 1 | No repetition for PRACH |
|  | Level 2 | Small Number of Repetition for PRACH |
| Mode B | Level 3 | Medium Number of Repetition for PRACH |
|  | Level 4 | Large Number of Repetition for PRACH |

The first mode is defined for small coverage enhancement to support full mobility and CSI (channel state information, in which there is no repetition or fewer repetition times. The second mode is defined for UEs with extremely poor coverage conditions that support CSI feedback and limited mobility, in which a large number of repetitive transmissions is defined. The second mode provides a coverage improvement of up to 15 dB. Each level of MTC is defined differently in the random access procedure and the paging process.

The MTC operation mode is determined by the BS, and each level is determined by the MTC UE. Specifically, the BS transmits RRC signaling including information on the MTC operation mode to the UE. Here, the RRC signaling may be an RRC connection setup message, an RRC connection reconfiguration message or an RRC connection reestablishment message.

Thereafter, the MTC UE determines a level in each operation mode and transmits the determined level to the BS. Specifically, the MTC UE determines a level in an operation mode on the basis of measured channel quality (e.g., reference signal received power (RSRP), reference signal received quality (RSRQ), or signal to interference plus noise ratio (SINR), and transmits an RACH preamble using a PRACH resource (e.g., frequency, time, preamble resource for PRACH) corresponding to the determined level, thereby informing the BS about the determined level.

MTC Guard Period

As discussed above, MTC operates in narrow band. The location of the narrow band used in the MTC may be different for each particular time unit (e.g., subframe or slot). The MTC UE may tune to different frequencies depending on the time units. A certain amount of time is required for frequency retuning, and certain amount of time is defined as a guard period of MTC. That is, a guard period is required when frequency retuning is performed while transitioning from one time unit to the next time unit, and transmission and reception do not occur during the guard period.

MTC Signal Transmission/Reception Method

FIG. 27 is a diagram illustrating physical channels that may be used for MTC and a general signal transmission method using the same.

In step S1001, the MTC UE, which is powered on again or enters a new cell, performs an initial cell search operation such as synchronizing with the BS. To this end, the MTC UE receives a primary synchronization signal (PSS) and a secondary synchronization signal (SSS) from the BS, adjusts synchronization with the BS, and acquires information such as a cell ID. The PSS/SSS used in the initial cell search operation of the MTC may be a PSS/SSS, a resynchronization signal (RSS), or the like of an legacy LTE.

Thereafter, the MTC UE may receive a physical broadcast channel (PBCH) signal from the BS to acquire broadcast information in a cell.

Meanwhile, the MTC UE may receive a downlink reference signal (DL RS) in an initial cell search step to check a downlink channel state. The broadcast information transmitted through the PBCH is a master information block (MIB), and in the LTE, the MIB is repeated by every 10 ms.

Among the bits of the MIB of the legacy LTE, reserved bits are used in MTC to transmit scheduling for a new SIB1-BR (system information block for bandwidth reduced device) including a time/frequency location and a transport block size. The SIB-BR is transmitted directly on the PDSCH without any control channel (e.g., PDCCH, MPDDCH) associated with the SIB-BR.

Upon completion of the initial cell search, the MTC UE may receive an MPDCCH and a PDSCH according to the MPDCCH information to acquire more specific system information in step S1002. The MPDCCH may be transmitted only once or repeatedly. The maximum number of repetitions of the MPDCCH is set to the UE by RRC signaling from the BS.

Thereafter, the MTC UE may perform a random access procedure such as steps S1003 to S1006 to complete the connection to the BS. A basic configuration related to the RACH process of the MTC UE is transmitted by SIB2. In addition, SIB2 includes parameters related to paging. In the 3GPP system, a paging occasion (PO) refers to a time unit in which the UE may attempt to receive paging. The MTC UE attempts to receive the MPDCCH on the basis of a P-RNTI in the time unit corresponding to its PO on the narrowband (PNB) set for paging. The UE that has successfully decoded the MPDCCH on the basis of the P-RNTI may receive a PDSCH scheduled by the MPDCCH and check a paging message for itself. If there is a paging message for itself, the UE performs a random access procedure to access a network.

For the random access procedure, the MTC UE transmits a preamble through a physical random access channel (PRACH) (S1003), and receives a response message (RAR) for the preamble through the MPDCCH and the corresponding PDSCH. (S1004). In the case of a contention-based random access, the MTC UE may perform a contention resolution procedure such as transmission of an additional PRACH signal (S1005) and reception of the MPDCCH signal and corresponding PDSCH signal (S1006). The signals and/or messages Msg 1, Msg 2, Msg 3, and Msg 4 transmitted in the RACH process in the MTC may be repeatedly transmitted, and the repeat pattern is set to be different according to the CE level. Msg1 denotes a PRACH preamble, Msg2 denotes a random access response (RAR), Msg3 denotes UL transmission on the basis of a UL grant included in the RAR, and Msg4 denotes a DL transmission of the BS to Msg3.

For random access, PRACH resources for the different CE levels are signaled by the BS. This provides the same control of a near-far effect on the PRACH by grouping together UEs experiencing similar path loss. Up to four different PRACH resources may be signaled to the MTC UE.

The MTC UE estimates RSRP using a downlink RS (e.g., CRS, CSI-RS, TRS, and the like), and selects one of different PRACH resources (e.g., frequency, time, and preamble resources for PRACH) for the random access on the basis of the measurement result. The RAR for the PRACH and search spaces for the contention resolution messages for PRACH are also signaled at the BS via system information.

The MTC UE that has performed the above-described process may then receive an MPDCCH signal and/or a PDSCH signal (S1007) and transmit a physical uplink shared channel (PUSCH) signal and/or a physical uplink control channel (PUCCH) (S1108) as a general uplink/ downlink signal transmission process. The MTC UE may transmit uplink control information (UCI) to the BS through the PUCCH or PUSCH. The UCI may include HARQ-ACK/ NACK, scheduling request (SR), and/or CSI.

When RRC connection to the MTC UE is established, the MTC UE monitors the MPDCCH in a search space set to acquire uplink and downlink data allocation and attempts to receive the MDCCH.

In the case of MTC, the MPDCCH and the PDSCH scheduled by the MDCCH are transmitted/received in different subframes. For example, the MPDCCH having the last repetition in subframe #n schedules the PDSCH starting at subframe #n+2. The DCI transmitted by the MPDCCH provides information on how many times the MPDCCH is repeated so that the MTC UE may know when the PDSCH transmission is started. For example, when the DCI in the MPDCCH started to be transmitted from the subframe #n includes information that the MPDCCH is repeated 10 times, a last subframe in which the MPDCCH is transmitted is the subframe #n+9 and transmission of the PDSCH may start at subframe #n+11.

The PDSCH may be scheduled in the same as or different from a narrow band in which the MPDCCH scheduling the PDSCH is present. If the MPDCCH and the corresponding PDSCH are located in different narrow bands, the MTC UE needs to retune the frequency to the narrow band in which the PDSCH is present before decoding the PDSCH.

For uplink data transmission, scheduling may follow the same timing as legacy LTE. For example, the MPDCCH which is lastly transmitted at subframe #n may schedule PUSCH transmission starting at subframe #n+4.

FIG. 28 shows an example of scheduling for MTC and legacy LTE, respectively.

In the legacy LTE, the PDSCH is scheduled using the PDCCH, which uses the first OFDM symbol(s) in each subframe, and the PDSCH is scheduled in the same subframe as the subframe in which the PDCCH is received.

In contrast, the MTC PDSCH is cross-subframe scheduled, and one subframe between the MPDCCH and the PDSCH is used as a time period for MPDCCH decoding and RF retuning. The MTC control channel and data channel may be repeated over a large number of subframes including up to 256 subframes for the MPDCCH and up to 2048 subframes for the PDSCH so that they may be decoded under extreme coverage conditions.

NB-IoT (Narrowband-Internet of Things)

The NB-IoT may refer to a system for supporting low complexity, low power consumption through a system bandwidth (system BW) corresponding to one resource block (RB) of a wireless communication system.

Here, NB-IoT may be referred to as other terms such as NB-LTE, NB-IoT enhancement, enhanced NB-IoT, further enhanced NB-IoT, NB-NR. That is, NB-IoT may be replaced with a term defined or to be defined in the 3GPP standard, and hereinafter, it will be collectively referred to as 'NB-IoT' for convenience of explanation.

The NB-IoT is a system for supporting a device (or UE) such as machine-type communication (MTC) in a cellular system so as to be used as a communication method for implementing IoT (i.e., Internet of Things). Here, one RB of the existing system band is allocated for the NB-IoT, so that the frequency may be efficiently used. Also, in the case of NB-IoT, each UE recognizes a single RB as a respective carrier, so that RB and carrier referred to in connection with NB-IoT in the present specification may be interpreted to have the same meaning.

Hereinafter, a frame structure, a physical channel, a multi-carrier operation, an operation mode, and general signal transmission/reception related to the NB-IoT in the present specification are described in consideration of the case of the legacy LTE system, but may also be extendedly applied to a next generation system (e.g., an NR system, etc.). In addition, the contents related to NB-IoT in this specification may be extendedly applied to MTC (Machine Type Communication) oriented for similar technical purposes (e.g., low-power, low-cost, coverage enhancement, etc.).

Hereinafter, a case where a transmission time interval of a physical channel is a subframe are described as an example. For example, a case where a minimum time interval from the start of transmission of one physical channel (e.g., NPDCCH, NPDSCH, NPUCCH, NPUSCH) to the start of transmission of a next physical channel is one subframe will be described, but in the following description, the subframe may be replaced by a slot, a mini-slot, or multiple slots.

Frame Structure and Physical Resource of NB-IoT

First, the NB-IoT frame structure may be configured to be different according to subcarrier spacing. Specifically, FIG. 29 shows an example of a frame structure when a subscriber spacing is 15 kHz, and FIG. 30 shows an example of a frame structure when a subscriber spacing is 3.75 kHz. However, the NB-IoT frame structure is not limited thereto, and NB-IoT for other subscriber spacings (e.g., 30 kHz) may be considered with different time/frequency units.

In addition, although the NB-IoT frame structure on the basis of the LTE system frame structure has been exemplified in the present specification, it is merely for the convenience of explanation and the present invention is not limited thereto. The method described in this disclosure may also be extendedly applied to NB-IoT based on a frame structure of a next-generation system (e.g., NR system).

Referring to FIG. 29, the NB-IoT frame structure for a 15 kHz subscriber spacing may be configured to be the same as the frame structure of the legacy system (e.g., LTE system) described above. For example, a 10 ms NB-IoT frame may include ten 1 ms NB-IoT subframes, and the 1 ms NB-IoT subframe may include two 0.5 ms NB-IoT slots. Further, each 0.5 ms NB-IoT may include 7 OFDM symbols.

Alternatively, referring to FIG. 30, the 10 ms NB-IoT frame may include five 2 ms NB-IoT subframes, the 2 ms NB-IoT subframe may include seven OFDM symbols and one guard period (GP). Also, the 2 ms NB-IoT subframe may be represented by an NB-IoT slot or an NB-IoT RU (resource unit).

Next, physical resources of the NB-IoT for each of downlink and uplink will be described.

First, the physical resources of the NB-IoT downlink may be configured by referring to physical resources of other wireless communication system (e.g., LTE system, NR system, etc.), except that a system bandwidth is limited to a certain number of RBs (e.g., one RB, i.e., 180 kHz). For example, when the NB-IoT downlink supports only the 15-kHz subscriber spacing as described above, the physical resources of the NB-IoT downlink may be configured as resource regions limiting a resource grid of the LTE system shown in FIG. 31 to one RB in the frequency domain.

Next, in the case of the NB-IoT uplink physical resource, the system bandwidth may be limited to one RB as in the case of downlink. For example, if the NB-IoT uplink supports 15 kHz and 3.75 kHz subscriber spacings as described above, a resource grid for the NB-IoT uplink may be expressed as shown in FIG. 31. In this case, the number of subcarriers NULsc and the slot period Tslot in the uplink band in FIG. 31 may be given as shown in Table 9 below.

TABLE 9

| Subcarrier spacing | NULsc | Tslot |
|---|---|---|
| $\Delta f$ = 3.75 kHz | 48 | 6144 · Ts |
| $\Delta f$ = 15 kHz | 12 | 15360 · Ts |

In NB-IoT, resource units (RUs) are used for mapping the PUSCH for NB-IoT (hereinafter referred to as NPUSCH) to resource elements. RU may include NULsymb*NULslot SC-FDMA symbols in the time domain and include NRUsc number of consecutive subcarriers in the frequency domain. For example, NRUsc and NULsymb may be given by Table 10 below for frame structure type 1, which is a frame structure for FDD, and may be given by Table 11 below for frame structure type 2, which is frame structure for TDD.

TABLE 10

| NPUSCH format | $\Delta f$ | NRUsc | NULslots | NULsymb |
|---|---|---|---|---|
| 1 | 3.75 kHz | 1 | 16 | 7 |
|   | 15 kHz | 1 | 16 |   |
|   |   | 3 | 8 |   |
|   |   | 6 | 4 |   |
|   |   | 12 | 2 |   |
| 2 | 3.75 kHz | 1 | 4 |   |
|   | 15 kHz | 1 | 4 |   |

TABLE 11

| NPUSCH format | $\Delta f$ | Supported up-link-downlink configurations | NRUsc | NULslots | NULsymb |
|---|---|---|---|---|---|
| 1 | 3.75 kHz | 1, 4 | 1 | 16 | 7 |
|   | 15 kHz | 1, 2, 3, 4, 5 | 1 | 16 |   |
|   |   |   | 3 | 8 |   |
|   |   |   | 6 | 4 |   |
|   |   |   | 12 | 2 |   |
| 2 | 3.75 kHz | 1, 4 | 1 | 4 |   |
|   | 15 kHz | 1, 2, 3, 4, 5 | 1 | 4 |   |

Physical Channel of NB-IoT

A BS and/or a UE supporting the NB-IoT may be configured to transmit/receive physical channels and/or physical signals configured separately from the legacy system. Hereinafter, specific contents related to physical channels and/or physical signals supported by the NB-IoT will be described.

An orthogonal frequency division multiple access (OFDMA) scheme may be applied to the NB-IoT downlink on the basis of a subscriber spacing of 15 kHz. Through this, co-existence with other systems (e.g., LTE system, NR system) may be efficiently supported by providing orthogonality between subcarriers. A downlink physical channel/signal of the NB-IoT system may be represented by adding 'N (Narrowband)' to distinguish it from the legacy system. For example, a downlink physical channel may be referred to as an NPBCH (narrowband physical broadcast channel), an NPDCCH (narrowband physical downlink control channel), or an NPDSCH (narrowband physical downlink shared channel), and a downlink physical signal may be referred to as an NPSS (narrowband primary synchronization signal), an NSSS (narrowband secondary synchronization signal), an NRS (narrowband reference signal), an NPRS (narrowband positioning reference signal), an NWUS (narrowband wake up signal), and the like. Generally, the downlink physical channels and physical signals of the NB-IoT may be configured to be transmitted on the basis of a time domain multiplexing scheme and/or a frequency domain multiplexing scheme. In the case of NPBCH, NPDCCH, NPDSCH, etc., which are the downlink channels of the NB-IoT system, repetition transmission may be performed for coverage enhancement. In addition, the NB-IoT uses a newly defined DCI format. For example, the DCI format for NB-IoT may be defined as DCI format NO, DCI format N1, DCI format N2, and the like.

In the NB-IoT uplink, a single carrier frequency division multiple access (SC-FDMA) scheme may be applied on the basis of a subscriber spacing of 15 kHz or 3.75 kHz. As mentioned in the downlink section, the physical channel of the NB-IoT system may be expressed by adding 'N (Narrowband)' to distinguish it from the existing system. For example, the uplink physical channel may be represented by a narrowband physical random access channel (NPRACH) or a narrowband physical uplink shared channel (NPUSCH), and the uplink physical signal may be represented by a narrowband demodulation reference signal (NDMRS), or the like. NPUSCH may be divided into NPUSCH format 1 and NPUSCH format 2. In one example, NPUSCH Format 1 may be used for uplink shared channel (UL-SCH) transmission (or transport), and NPUSCH Format 2 may be used for uplink control information transmission such as HARQ ACK signaling. In the case of NPRACH, which is an uplink channel of the NB-IoT system, repetition transmission may be performed for coverage enhancement. In this case, repetition transmission may be performed by applying frequency hopping.

Multi-Carrier Operation of NB-IoT

Next, a multi-carrier operation of the NB-IoT will be described. The multicarrier operation may refer to that multiple carriers set for different uses (i.e., different types) are used for transmitting/receiving channels and/or signals between the BS and/or UE in the NB-lot.

The NB-IoT may operate in a multi-carrier mode. Here, in the NB-IoT, a carrier wave in the N-lot may be classified as an anchor type carrier (i.e., an anchor carrier, an anchor PRB) and a non-anchor type carrier a non-anchor type carrier (i.e., non-anchor carrier).

The anchor carrier may refer to a carrier that transmits NPSS, NSSS, NPBCH, and NPDSCH for a system information block (N-SIB) for initial access from a point of view of the BS. That is, in NB-IoT, the carrier for initial access may be referred to as an anchor carrier and the other(s) may be referred to as a non-anchor carrier. Here, only one anchor carrier wave may exist in the system, or there may be a plurality of anchor carrier waves.

Operation Mode of NB-IoT

Next, an operation mode of the NB-IoT will be described. In the NB-IoT system, three operation modes may be supported. FIG. 32 shows an example of operation modes supported in the NB-IoT system. Although the operation mode of the NB-IoT is described herein on the basis of an LTE band, this is for convenience of explanation and may be extendedly applied to other system bands (e.g. NR system band).

Specifically, FIG. 32(*a*) shows an example of an in-band system, FIG. 32(*b*) shows an example of a guard-band system, and FIG. 32(*c*) Represents an example of a stand-alone system. In this case, the in-band system may be expressed as an in-band mode, the guard-band system may be expressed as a guard-band mode, and the stand-alone system may be expressed in a stand-alone mode.

The in-band system may refer to a system or mode that uses a specific RB in the (legacy) LTE band. The in-band system may be operated by allocating some resource blocks of the LTE system carrier.

A guard-band system may refer to a system or mode that uses NB-IoT in a space reserved for a guard-band of the legacy LTE band. The guard-band system may be operated by allocating a guard-band of an LTE carrier not used as a resource block in the LTE system. For example, the (legacy) LTE band may be configured to have a guard-band of at least 100 kHz at the end of each LTE band, and with two non-contiguous guard-bands for 200 kHz for NB-IoT may be used.

As described above, the in-band system and the guard-band system may be operated in a structure in which NB-IoT coexists in the (legacy) LTE band.

By contrast, the stand-alone system may refer to a system or mode that is configured independently of the legacy LTE band. The stand-alone system may be operated by separately allocating frequency bands (e.g., reassigned GSM carriers in the future) used in a GERAN (GSM EDGE radio access network).

The three operation modes described above may be operated independently of each other, or two or more operation modes may be operated in combination.

NB-IoT Signal Transmission/Reception Process

FIG. 33 is a diagram illustrating an example of physical channels that may be used for NB-IoT and a general signal transmission method using the same. In a wireless communication system, an NB-IoT UE may receive information from a BS through a downlink (DL) and the NB-IoT UE may transmit information to the BS through an uplink (UL). In other words, in the wireless communication system, the BS may transmit information to the NB-IoT UE through the downlink and the BS may receive information from the NB-IoT UE through the uplink.

The information transmitted/received by the BS and the NB-IoT UE includes data and various control information, and various physical channels may exist depending on the type/purpose of the information transmitted/received by the BS and NB-IoT UE. The signal transmission/reception method of the NB-IoT may be performed by the above-described wireless communication devices (e.g., BS and UE).

The NB-IoT UE, which is powered on again or enters a new cell, may perform an initial cell search operation such as adjusting synchronization with the BS, or the like (S11). To this end, the NB-IoT UE receives NPSS and NSSS from the BS, performs synchronization with the BS, and acquires cell identity information. Also, the NB-IoT UE may receive the NPBCH from the BS and acquire the in-cell broadcast information. In addition, the NB-IoT UE may receive a DL RS (downlink reference signal) in the initial cell search step to check a downlink channel state.

After completion of the initial cell search, the NB-IoT UE may receive the NPDCCH and the corresponding NPDSCH to acquire more specific system information (S12). In other words, the BS may transmit more specific system information by transmitting the NPDCCH and corresponding NPDSCH to the NB-IoT UE after completion of the initial cell search.

Thereafter, the NB-IoT UE may perform a random access procedure to complete connection to the BS (S13 to S16).

Specifically, the NB-IoT UE may transmit a preamble to the BS via the NPRACH (S13). As described above, the NPRACH may be configured to be repeatedly transmitted on the basis of frequency hopping or the like to enhance coverage or the like. In other words, the BS may (repeatedly) receive a preamble through the NPRACH from the NB-IoT UE.

Thereafter, the NB-IoT UE may receive a random access response (RAR) for the preamble from the BS through the NPDCCH and the corresponding NPDSCH (S14). In other words, the BS may transmit the RAR for the preamble to the NB-IoT UE through the NPDCCH and the corresponding NPDSCH.

Thereafter, the NB-IoT UE transmits the NPUSCH to the BS using scheduling information in the RAR (S15), and may perform a contention resolution procedure such as the NPDCCH and the corresponding NPDSCH (S16). In other words, the BS may receive the NPUSCH from the UE using the scheduling information in the NB-IoT RAR, and perform the contention resolution procedure.

The NB-IoT UE that has performed the above-described process may perform NPDCCH/NPDSCH reception (S17) and NPUSCH transmission (S18) as a general uplink/downlink signal transmission process. In other words, after performing the above-described processes, the BS may perform NPDCCH/NPDSCH transmission and NPUSCH reception as a general signal transmission/reception process to the NB-IoT UE.

In the case of NB-IoT, as mentioned above, NPBCH, NPDCCH, NPDSCH, and the like may be repeatedly transmitted for coverage improvement and the like. In the case of NB-IoT, UL-SCH (i.e., general uplink data) and uplink control information may be transmitted through the NPUSCH. Here, the UL-SCH and the uplink control information (UCI) may be configured to be transmitted through different NPUSCH formats (e.g., NPUSCH format 1, NPUSCH format 2, etc.).

Also, the UCI may include HARQ ACK/NACK (Hybrid Automatic Repeat and reQuest Acknowledgement/Negative-ACK), SR (Scheduling Request), CSI (Channel State Information), and the like. As described above, the UCI in the NB-IoT may generally be transmitted via the NPUSCH. Also, in response to a request/instruction from the network (e.g., BS), the UE may transmit the UCI via the NPUSCH in a periodic, aperiodic, or semi-persistent manner.

L. Sidelink (SL)

A sidelink (SL) or device-to-device (D2D) communication technology refers to a scheme in which geographically adjacent UEs communicate directly. D2D communication technology was developed as a technology that uses mainly unlicensed frequency bands such as Wi-Fi direct and Bluetooth, which have already been commercialized. However, for the purpose of improving the frequency utilization efficiency of a cellular system, the D2D communication technology utilizing licensed frequency bands has been developed and standardized.

Generally, D2D communication is used to be limited in terms of communication between objects or machine-to-machine (M2M), but D2D communication in this specification may include communication between various types of devices having communication functions such as smartphones, personal computers, vehicles, robots, and the like, as well as a simple device equipped with a communication function.

3GPP, which defines the standard for cellular systems, uses the term sidelink (SL) instead of the term D2D communication and uses the terms such as V2X sidelink, NR V2X, etc., in particular when it relates to V2X. That is, the sidelink may represent a broader term including the V2X sidelink.

Sidelink may largely include sidelink discovery, sidelink communication, sidelink synchronization, and the like. The sidelink communication is a concept including V2X sidelink communication.

In the case of 3GPP, the sidelink communication between UEs is described as transmission mode 1 and transmission mode 2. In particular, V2X sidelink communication between vehicles is described as transmission mode 3 and transmission mode 4.

Contents that may be generally applicable to the sidelink will be described and the V2X sidelink and NR V2X will be described in detail.

Hereinafter, a case where a transmission time interval of a physical channel is a subframe will be described as an example. For example, a case where a minimum time interval from the start of transmission of one physical channel (e.g., PSCCH, PSCCH, PSDCH) to the start of transmission of a next physical channel is one subframe will be described as an example, but the subframe may be replaced by slots, mini-slots, or multiple slots in the following description.

FIG. 37 shows an example of various scenarios of the sidelink.

The scenario of sidelink may be divided into (1) out-of-coverage network, (2) partial-coverage network, and (3) in-coverage network (1) depending on whether UE 1 and UE 2 are located in-coverage or out-of-coverage.

The in-coverage network may be divided into in-coverage-single-cell and in-coverage-multi-cell according to the number of cells corresponding to coverage of the BS. FIG. 37(a) shows an example of the out-of-coverage network scenario of D2D communication. The out-of-coverage network scenario refers to performing sidelink between UEs without BS control.

In FIG. 37(a), it can be seen that only UE 1 and UE 2 exist and UE 1 and UE 2 directly communicate with each other. FIG. 37(b) shows an example of a partial-coverage network scenario of a sidelink. The partial-coverage network scenario refers to performing a sidelink between a UE located in a network coverage and a UE located outside the network coverage. In FIG. 37(b), it can be seen that UE 1 located in the network coverage and UE 2 located outside the network coverage communicate with each other. FIG. 37(c) shows an example of an in-coverage-single-cell scenario, and FIG. 37(d) shows an example of an in-coverage-multi-cell scenario. The In-coverage network scenario refers to the UEs performing sidelink through control of the BS within the network coverage. In FIG. 37(c), UE 1 and UE 2 are located in the same network coverage (or cell) and perform sidelink under the control of the BS. In FIG. 37(d), UE 1 and UE 2 are located within a network coverage but within different network coverages. UE 1 and UE 2 perform a sidelink under the control of the BS managing each network coverage.

Sidelink transmission may operate in an uplink spectrum in the case of FDD and may operate in an uplink (or downlink) subframe in the case of TDD. TDM (Time Division Multiplexing) may be used for multiplexing sidelink transmission and uplink transmission. Depending on the capability of the UE, the sidelink transmission and the uplink transmission do not occur simultaneously in a specific UE. For example, sidelink transmission does not occur in a sidelink subframe partially or entirely overlapping an uplink subframe used for uplink transmission. Also, the sidelink transmission and the downlink transmission do not occur at the same time. Also, transmission and reception of the sidelink do not occur at the same time. As for a structure of a physical resource used for the sidelink transmission, a structure of the uplink physical resource may be used in the same manner. However, a last symbol of the sidelink subframe includes a guard period and is not used for sidelink transmission. The sidelink may largely include sidelink discovery, sidelink communication, V2X sidelink communication, and sidelink synchronization.

Sidelink communication is a communication mode in which a UE may communicate directly via a PC5 interface. This communication mode is supported when the UE is served by the E-UTRAN and when the UE is outside an E-UTRA coverage. To perform synchronization for out-of-coverage operation, the UEs may operate as a synchronization source by transmitting a sidelink broadcast control channel (SBCCH) and a synchronization signal.

The SBCCH conveys the most important system information needed to receive other sidelink channels and signals. The SBCCH is transmitted at a fixed period of 40 ms together with a synchronization signal. When the UE is in network coverage, the content of the SBCCH is derived or acquired from parameters signaled by the BS.

If the UE is out of coverage, when the UE selects another UE as a synchronization reference, the content of the SBCCH is derived from the received SBCCH. Otherwise, the UE uses a configured parameter.

There are two preset subframes at every 40 ms for external operation of coverage. The UE receives the synchronization signal and the SBCCH at one subframe and transmits the synchronization signal and the SBCCH at another subframe when the UE becomes a synchronization source according to a defined criteria.

The UE performs sidelink communication on subframes defined over a duration of a sidelink control period. The sidelink control period is a period during which resources are allocated to cells for sidelink control information and sidelink data transmission. Within the sidelink control period, the UE transmits sidelink control information and sidelink data.

Sidelink control information indicates a layer 1 ID and transmission characteristics (e.g., MCS, location of resources and timing alignment for sidelink control period).

Sidelink Wireless Protocol Structure

A UE radio protocol structure for a sidelink regarding a user plane and a control plane will be described.

FIG. 38 shows a protocol stack for a sidelink.

Specifically, FIG. 38(a) shows a protocol stack for a user plane in which PDCP, RLC, and MAC sublayers (terminated in another UE) perform functions on the user plane.

An access stratum protocol stack of the PC5 interface includes PDCP, RLC, MAC, and PHY as shown in FIG. 38(a).

FIG. 38(b) shows a control plane protocol stack for the SBCCH to which the implementation(s) of the present disclosure may be applied. The access stratum (AS) protocol stack for the SBCCH in the PC5 interface includes RRC, RLC, MAC and PHY as shown in FIG. 38(b).

A control plane for establishing, maintaining and releasing logical connections for one-to-one sidelink communication is shown in FIG. 39. FIG. 39 shows a control plane protocol stack for a one-to-one sidelink.

Further details of the sidelink protocol stack may refer to 3GPP TS 23.303, 3GPP TS 23.285, 3GPP TS 24.386, and the like.

Sidelink Discovery

Since a plurality of transmission/reception UEs are distributed at arbitrary positions in a sidelink, a sidelink discovery process for confirming existence of neighboring UEs is required before a specific UE performs sidelink communication with neighboring UEs. Also, the sidelink discovery may be used for various commercial purposes such as advertisement, coupon issuance, friend finding, and the like in UEs within a nearby area, as well as confirmation of the existence of neighboring UEs as described above.

Sidelink discovery may be applied within network coverage. Here, the signal (or message) transmitted periodically by the UEs for the sidelink discovery may be referred to as a discovery message, a discovery signal, a beacon, or the like. Hereinafter, for convenience of explanation, a signal periodically transmitted by UEs for sidelink discovery is collectively referred to as a discovery message.

When UE 1 has a role of transmitting a discovery message, UE 1 transmits the discovery message and UE 2 receives the discovery message. The transmission and reception roles of UE 1 and UE 2 may be changed. The transmission from UE 1 may be received by one or more UE(s) such as UE 2.

The discovery message may include a single MAC PDU, and here, the single MAC PDU may include a UE identifier (ID) and an application identifier (application ID).

A physical sidelink discovery channel (PSDCH) may be defined as a channel for transmitting the discovery message. The structure of the PSDCH channel may reuse the PUSCH structure.

Two types of resource allocation methods for sidelink discovery (sidelink discovery type 1, sidelink discovery type 2B) may be used.

In the case of the sidelink discovery type 1, the BS may allocate resources for transmitting the discovery message in a non-UE specific manner. Specifically, a radio resource pool (i.e., a discovery pool) for discovery transmission and reception, which includes a plurality of subframe sets and a plurality of resource block sets is allocated within a specific period (hereinafter, referred to as a 'discovery period'), and a discovery transmit UE randomly selects a specific resource in the radio resource pool and then transmits a discovery message. This periodic discovery resource pool may be allocated for discovery signal transmission in a semi-static manner. Configuration information of the discovery resource pool for discovery transmission includes a discovery period and subframe set and a resource block set information that may be used for the transmission of the discovery signal in the discovery period. Such configuration information of the discovery resource pool may be transmitted to the UE by RRC signaling. In the case of an in-coverage UE, the discovery resource pool for the discovery transmission may be established by the BS and informed to the UE using RRC signaling (e.g., SIB (system information block)). The discovery resource pool allocated for discovery in one discovery period may be multiplexed to time-frequency resource blocks having the same size by TDM and/or FDM, and the time-frequency resource blocks having the same size may be referred to as "discovery resource". The discovery resource may be divided into one subframe unit, and each subframe may include two resource blocks (RBs) per slot. One discovery resource may be used by a UE for the transmission of a discovery MAC PDU. In addition, the UE may repeatedly transmit the discovery signal within the discovery period for transmission of one transport block. Transmission of the MAC PDU transmitted by one UE may be repeated (e.g., four times) in a discovery cycle (i.e., the radio resource pool) in a contiguous or non-contiguous manner. The number of transmissions of the discovery signal for one transport block may be sent to the UE by higher layer signaling. The UE may randomly select a first discovery resource from a discovery resource set that may be used for repeated transmission of MAC PDUs and other discovery resources may be determined in conjunction with the first discovery resource. For example, a predetermined pattern may be previously set and a next discovery resource may be determined according to the preset pattern according to a location of the first selected discovery resource. In addition, the UE may randomly select each discovery resource within a discovery resource set that the UE may use for repeated transmission of MAC PDUs.

In the sidelink discovery type 2, resources for transmitting a discovery message are allocated UE-specifically. Type 2 is further subdivided into Type 2A and Type 2B. Type 2A is a method in which the BS allocates resources for each instance of transmission of a discovery message of the UE within a discovery period, and Type 2B is a method for allocating resources in a semi-persistent manner. In the case of the sidelink discovery type 2B, the RRC_CONNECTED UE requests allocation of resources for transmission of the sidelink discovery message from the BS through RRC signaling. Then, the BS may allocate resources through RRC signaling. When the UE transitions to the RRC IDLE state or when the BS withdraws the resource allocation via RRC signaling, the UE releases the most recently allocated transmission resource. In the case of the sidelink discovery type 2B, radio resources are allocated by RRC signaling, and activation/deactivation of the allocated radio resources may be determined by the PDCCH. A radio resource pool for receiving a discovery message may be established by the BS and informed to the UE using RRC signaling (e.g., SIB (system information block)).

The UE receiving the discovery message monitors all the discovery resource pools of the sidelink discovery type 1 and the type 2 described above in order to receive the discovery message.

The sidelink discovery scheme may be classified as a centralized discovery scheme that is supported by a central node such as a BS and a distributed discovery scheme in which the UE itself checks existence of a neighboring UE without the help of the central node. In the case of the distributed discovery scheme, dedicated resources may be periodically allocated as a resource for transmitting and receiving a discovery message by the UE, separately from cellular resources.

Sidelink Communication

The application coverage of the sidelink communication includes not only in-coverage and out-of-coverage but also network edge-of-coverage. Sidelink communication may be used for a purpose such as PS (public safety).

When UE 1 has a role of direct communication data transmission, UE 1 directly transmits communication data, and UE 2 directly receives communication data. The transmission and reception roles of UE 1 and UE 2 may be changed. Direct communication transmissions from UE 1 may be received by one or more UE(s), such as UE 2.

Sidelink discovery and sidelink communication may not be associated with each other and may be defined independently. That is, sidelink discovery is not required in groupcast and broadcast direct communication. As such, when sidelink discovery and sidelink direct communication are defined independently, UEs need not be aware of a neighboring UE. In other words, in the case of groupcast and broadcast direct communication, all the reception UEs in the group are not required to be close to each other.

A physical sidelink shared channel (PSSCH) may be defined as a channel for transmitting sidelink communication data. Also, as a channel for transmitting control information for sidelink communication (e.g., scheduling assignment (SA) for transmission of sidelink communication data, transmission format, etc.), a physical sidelink control channel (PSCCH) may be defined. The PSSCH and the PSCCH may reuse the PUSCH structure.

In the resource allocation method for sidelink communication, two modes (Mode 1/Mode 3, Mode 2/Mode 4) may be used.

Here, Mode 3/Mode 4 represents a resource allocation method for V2X sidelink communication, and this will be described in V2X.

Mode 1/Mode 3 refers to a method of scheduling resources that the BS uses to transmit data or control information for sidelink communication to the UE. Mode 1 applies in the in-coverage.

The BS configures a resource pool required for sidelink communication. The BS may transmit information on the resource pool required for the sidelink communication to the UE through RRC signaling. Here, the resource pool required for the sidelink communication may be divided into a control information pool (i.e., a resource pool for transmitting the PSCCH) and a sidelink data pool (i.e., a resource pool for transmitting the PSSCH).

When a transmission UE requests a resource for transmitting control information and/or data from the BS, the BS schedules control information and sidelink data transmission resources in the pool configured for the transmission D2D UE using the physical downlink control channel. Accordingly, the transmission UE transmits control information and sidelink data to a reception UE using the scheduled (i.e., allocated) resources.

Specifically, the BS may perform scheduling on resources (i.e., resources for transmitting PSCCH) for transmitting control information using DCI (Downlink Control Information) format 5 or DCI format 5A, and may perform scheduling on the SCI (I.e., a resource for transmitting the PSSCH) for transmitting sidelink data using sidelink control information format 0 or SCI format 1. Here, the DCI format 5 includes some fields of the SCI format 0, and the DCI format 5A includes some fields of the SCI format 1.

In the case of Mode 1/Mode 3, the transmission UE must be in the RRC_CONNECTED state in order to perform sidelink communication. The transmission UE transmits a scheduling request to the BS, and then a BSR (Buffer Status Report) process is performed for the UE to report the amount of uplink data to be transmitted so that the BS may determine the amount of resources requested by the transmission UE.

The reception UEs monitor the control information pool and decode control information related to itself to selectively decode sidelink data transmission associated with the control information. The reception UE may not decode the sidelink data pool according to a result of decoding the control information.

A specific example and signaling process for the above-described sidelink communication mode 1/mode 3 are as shown in FIGS. 40 and 41 below. In this case, as described above, the control information related to the sidelink communication is transmitted through the PSCCH, and the data information related to the sidelink communication is transmitted through the PSSCH.

FIG. 40 shows a sidelink operation process in sidelink communication mode 1/mode 3 under the control of a BS and a method for performing sidelink communication by transmitting/receiving information related to the sidelink operation process.

As shown in FIG. 40, a PSCCH resource pool 610 and/or a PSSCH resource pool 620 associated with sidelink communication may be preconfigured, and the preconfigured resource pools may be transmitted from the BS to the sidelink UEs via RRC signaling. Here, the PSCCH resource pool and/or the PSSCH resource pool may refer to reserved resources (i.e., dedicated resources) for sidelink communication. Here, the PSCCH is control information for scheduling the transmission of sidelink data (i.e., PSSCH), which may refer to a channel through which SCI format 0 is transmitted.

Also, the PSCCH is transmitted according to a PSCCH period, and the PSSCH is transmitted according to a PSSCH period. Scheduling on the PSCCH is performed through DCI format 5, and scheduling on the PSSCH is performed through SCI format 0. The DCI format 5 may be referred to as a sidelink grant.

Herein, the DCI format 5 includes resource information on the PSCCH (i.e., resource allocation information), a transmission power control (TPC) command on the PSCCH and PSSCH, zero padding (ZP) bit(s), and some fields of the SCI format 0 (e.g., frequency hopping flag, resource block assignment, and hopping resource allocation information, and time resource pattern (e.g., subframe pattern), etc.).

The fields of the SCI format 0 include a frequency hopping flag, a time resource pattern, a modulation and coding scheme (MCS), a TA indication (timing advance indication), a group destination ID, and the like, as information related to scheduling of the PSSCH (i.e., SCI format 0).

FIG. 41 shows a method of transmitting downlink control information for sidelink communication between UEs in a wireless communication system supporting sidelink communication.

First, a PSCCH resource pool and/or a PSSCH resource pool associated with sidelink are configured by a higher layer (step 1).

Thereafter, the BS transmits information on the PSCCH resource pool and/or the PSSCH resource pool to the sidelink UE through higher layer signaling (e.g., RRC signaling) (step 2).

Thereafter, the BS transmits control information related to transmission of the PSCCH (i.e., SCI Format 0) and/or transmission of the PSSCH (i.e., sidelink communication data) to the sidelink transmission UE via DCI Format 5 (step 3). The control information includes scheduling information of the PSCCH and/or PSSCH in the PSCCH resource pool and/or the PSSCH resource pool. For example, the control information may include resource allocation information, MCS level, time resource pattern, and the like.

Thereafter, the sidelink transmission UE transmits the PSCCH (i.e., SCI format 0) and/or the PSSCH (i.e., sidelink communication data) to the sidelink reception UE on the basis of the information received in step 3 (step 4). In this case, transmission of the PSCCH and transmission of the PSSCH may be performed together, and transmission of the PSSCH may be performed after transmission of the PSCCH.

Although not shown in FIG. 41, the sidelink transmission UE may request a transmission resource (i.e., a PSSCH resource) for sidelink data from the BS, and the BS may schedule resources for transmission of the PSCCH and the PSSCH. To this end, the sidelink transmission UE transmits a scheduling request (SR) to the BS, and then a BSR (Buffer Status Report) process for providing information on the amount of resources requested by the sidelink transmission UE to the BS may be performed.

The sidelink reception UEs may monitor the control information pool and decode control information related thereto, thus selectively decoding sidelink data transmission related to the corresponding control information.

Meanwhile, mode 2/mode 4 refers to a method in which the UE randomly selects a specific resource in a resource pool to transmit data or control information for sidelink communication. Mode 2/mode 4 is applied in out-of-coverage and/or in-coverage.

In the Mode 2, the resource pool for transmitting the control information and/or the resource pool for transmitting the sidelink communication data may be preconfigured or semi-statically configured. The UE is provided with the configured resource pool (time and frequency) and selects resources for the sidelink communication transmission in the resource pool. That is, the UE may select a resource for transmission of control information in the control information resource pool to transmit control information. The UE may also select resources in the data resource pool for sidelink communication data transmission.

In addition, in the sidelink broadcast communication, the control information is transmitted by a broadcasting UE. The control information informs a location of a resource for data reception in connection with the physical channel (i.e., the PSSCH) carrying the sidelink communication data.

Sidelink Synchronization

A sidelink synchronization signal/sequence (sidelink SS) may be used for the UE to acquire time-frequency synchronization. In particular, in the case of out of network coverage, control of the BS is impossible and thus new signals and procedures for establishing synchronization between UEs may be defined.

A UE that periodically transmits a sidelink synchronization signal may be referred to as a sidelink synchronization source or the like.

Each UE may have a plurality of physical layer sidelink synchronization identities. A predetermined number of (e.g., 333) physical layer sidelink synchronization identifiers are defined for the sidelink.

The sidelink synchronization signal includes a primary sidelink synchronization signal (PSSS) and a secondary sidelink synchronization signal (SSSS).

Before transmitting the sidelink synchronization signal, the UE may first search for a sidelink synchronization source. Then, when a sidelink synchronization source is searched, the UE may acquire time-frequency synchronization through a sidelink synchronization signal received from the searched sidelink synchronization source. Then, the corresponding UE may transmit the sidelink synchronization signal.

Also, a channel for transmitting system information and synchronization related information used for communication between UEs together with synchronization may be required, and the channel may be referred to as a physical sidelink broadcast channel (PSBCH).

M. V2X (Vehicle-to-Everything)

V2X communication includes communication between vehicle and all the entities, such as a vehicle-to-vehicle (V2V) designating communication between vehicles, a vehicle-to-infrastructure (V2I) designating communication between a vehicle and an eNB or an RSU (road side unit), vehicle-to-pedestrian (V2P) designating communication between UEs of a vehicle and an individual (pedestrians, bicycle drivers, vehicle drivers, or passengers), a vehicle-to-network (V2N), and the like.

A V2X communication may have the same meaning as a V2X sidelink or NR V2X or a wider meaning including a V2X sidelink or NR V2X.

The V2X communication may be applied to various services such as a forward collision warning, an automatic parking system, a cooperative adaptive cruise control (CACC), a control loss warning, a traffic queue warning, a traffic vulnerable people safety warning, emergency vehicle alarm, speed warning when traveling on winding road, traffic flow control, and the like.

V2X communication may be provided through a PC5 interface and/or the Uu interface. In this case, in a wireless communication system supporting V2X communication, there may exist certain network entities for supporting communication between the vehicle and all the entities. For example, the network entity may be an eNB, a roadside unit (RSU), a UE, or an application server (e.g., a traffic safety server).

In addition, the UE performing V2X communication may refer to a vehicle UE (V-UE), pedestrian UE, BS type (eNB type) RSU, a UE type RSU, a robot having a communication module, and the like, as well as a general handheld UE.

V2X communication may be performed directly between UEs or through the network entity(s). The V2X operation mode may be classified according to a method of performing V2X communication.

V2X communication is required to support pseudonymity and privacy of the UE when using a V2X application so that an operator or a third party may not track a UE identifier in V2X-supported region.

Terms frequently used in V2X communication are defined as follows.

RSU (road side unit): The RSU is a V2X serviceable device capable of transmitting/receiving with a moving vehicle using a V2I service. In addition, the RSU is a fixed infrastructure entity that supports a V2X application and may exchange messages with other entities that support the V2X application. RSU is a frequently used term in the existing ITS specification, and the reason for introducing this term in the 3GPP specification is to make it easier to read documents in the ITS industry. The RSU is a logical entity that combines the V2X application logic with functionality of a BS (referred to as a BS-type RSU) or a UE (referred to as a UE-type RSU).

V2I service: A type of V2X service, and an entity in which one side is a vehicle and the other side belongs to an infrastructure.

V2P service: A type of V2X service, one side thereof is a vehicle and the other side is a device carried by an individual (e.g., a portable UE carried by pedestrians, cyclists, drivers or passengers).

V2X service: A type of 3GPP communication service involving a transmission or reception device in a vehicle.

V2X enabled UE: UE supporting V2X service.

V2V service: A type of V2X service, both of which are vehicles.

V2V communication coverage: direct coverage between two vehicles participating in a V2V service.

The V2X application, called V2X (vehicle-to-everything), may include four types including (1) vehicle-to-vehicle (V2V), (2) vehicle-to-infrastructure (V2I), (3) vehicle-to-network (V2N), and (4) vehicle-to-pedestrian (V2P).

FIG. 42 illustrates a type of V2X application.

These four types of V2X applications may use "cooperative awareness" to provide more intelligent services for end users. This refers to collecting knowledge (e.g., information received from an adjacent other vehicle or sensor equipment) regarding a corresponding area environment for entities such as a vehicle, a road-based facility, an application server, and a pedestrian to handle and share the corresponding knowledge to provide intelligent information such as cooperation collision warning or autonomous driving.

These intelligent transport services and related message sets are defined in automotive standards developing organizations (SDOs) outside 3GPP.

Three basic classes for providing ITS services: road safety, traffic efficiency and other applications are described in, for example, ETSI TR 102 638 V1.1.1: "Vehicular Communications; Basic Set of Applications; Definitions".

A radio protocol architecture for a user plane for V2X communication and a radio protocol architecture for a control plane for V2X communication may be basically the same as a protocol stack architecture for sidelink (See FIG. 38). A wireless protocol architecture for the user plane includes a packet data convergence protocol (PDCP), a radio link control (RLC), a medium access control (MAC), and a physical layer (PHY), and the radio protocol architecture for the control plane may include radio resource control (RLC), an RLC, a MAC, and a physical layer. Further details of the protocol stack for V2X communication may refer to 3GPP TS 23.303, 3GPP TS 23.285, 3GPP TS 24.386, and the like.

FIG. 43 illustrates a resource allocation method in a sidelink in which V2X is used.

In the sidelink, as shown in FIG. 43(a), different sidelink control channels (PSCCHs) may be allocated and spaced apart from each other in the frequency domain, and different sidelink shared channels (PSSCHs) may be allocated and spaced apart from each other. Alternatively, as shown in FIG. 43(b), different PSCCHs may be consecutively allocated in the frequency domain and PSSCHs may also be consecutively allocated in the frequency domain.

V2X Synchronization

In time division multiple access (TDMA) and frequency division multiple access (FDMA) systems, accurate time and frequency synchronization is essential. If time and frequency synchronization is not accurate, intersymbol interference (ISI) and intercarrier interference (ICI) may arise to degrade system performance. This is the same with V2X as well. In V2X, a sidelink synchronization signal (SLSS) may be used in the physical layer and master information block-sidelink-V2X (MIB-SL-V2X) may be used in the radio link control (RLC) layer for time/frequency synchronization.

First, a source of synchronization or criteria of synchronization in V2X will be described. The UE may acquire information about time/frequency synchronization from at least one of global navigation satellite systems (GNSS), serving cell (BS), or other neighboring UEs.

Specifically, the UE may be directly synchronized to the GNSS or synchronized to another UE that is time/frequency synchronized to the GNSS. In a case where the GNSS is configured as a synchronous source, the UE may calculate a DFN and a subframe number using coordinated universal time (UTC) and (pre)configured DFN (direct frame number) offset.

Alternatively, the UE may be directly synchronized to the BS or synchronized to another UE that is time/frequency synchronized to the BS. For example, if the UE is within network coverage, the UE may receive synchronization information provided by the BS and may be directly synchronized to the BS. Thereafter, the UE may provide the synchronization information to another neighboring UE. if a BS timing is configured as a criterion for synchronization, the UE may follow a cell associated with a corresponding frequency (if within the cell coverage at the frequency) or follow a primary cell or a serving cell (when outside the cell coverage at the frequency) for synchronization and downlink measurements, A serving cell (BS) may provide a synchronization setup for a carrier used for V2X sidelink communication. In this case, the UE may follow the synchronization setup received from the BS. If no cell is detected from the carrier used for the V2X sidelink communication and no synchronization setup is received from the serving cell, the UE may follow a preset synchronization setup.

Alternatively, the UE may be synchronized to another UE that has not acquired the synchronization information either directly or indirectly from the BS or the GNSS. The source and preference of synchronization may be previously set to the UE or may be set via a control message provided by the BS.

The SLSS may be a sidelink-specific sequence and may include a primary sidelink synchronization signal (PSSS) and a secondary sidelink synchronization signal (SSSS).

Each SLSS may have a physical layer sidelink synchronization identity, and the value may be, for example, any of 0 to 335. A synchronization source may be identified depending on which of the above values is used. For example, 0, 168, and 169 may refer to Global Navigation Satellite System (GNSS), 1 to 167 may refer to BS, and 170 to 335 may refer to outside coverage. Alternatively, values 0 to 167 among the physical layer sidelink synchronization ID are values used by the network, and 168 to 335 may be values used outside the network coverage.

The UE providing synchronization information to another UE may be considered to operate as a synchronization reference. The UE may additionally provide information on synchronization together with the SLSS via a SL-BCH (sidelink broadcast channel).

Table 12 shows an example of MIB-SL-V2X (MasterinformationBlock-SL-V2X), which is an example of synchronization information transmitted through the SL-BCH.

TABLE 12

```
-- ASN1START
MasterInformationBlock-SL-V2X-r14 ::=    SEQUENCE {
    sl-Bandwidth-r14                         ENUMERATED {
                                                 n6, n15, n25, n50, n75, n100},
    tdd-ConfigSL-r14                         TDD-ConfigSL-r12,
    directFrameNumber-r14                    BIT STRING (SIZE (10)),
    directSubframeNumber-r14                 INTEGER (0..9),
```

TABLE 12-continued

| | |
|---|---|
| inCoverage-r14 | BOOLEAN, |
| reserved-r14 | BIT STRING (SIZE (27)) |
| } | |
| -- ASN1STOP | |

DirectFrameNumber indicates a frame number at which the SLSS and SL-BCH are transmitted for V2X sidelink communication. A subframe in the frame corresponding to 'directFrameNumber' is indicated by 'directSubframeNumber'.

If the 'inCoverage' value is 'TRUE', it indicates that the UE transmitting the MIB-SL-V2X is within the network (E-UTRAN) coverage. 'sl-Bandwidth' is a parameter indicating transmission band configuration. For example, n6 is an equation representing six resource blocks (RB), and n15 is an equation representing 15 resource blocks.

V2X Related Resource Allocation Method

There are transmission modes 1, 2, 3 and 4 in the sidelink.

In a transmission mode 1/3, the BS performs resource scheduling through the PDCCH (more specifically, DCI) to the UE 1, and the UE 1 performs D2D/V2X communication with the UE 2 according to the resource scheduling. The UE 1 may transmit sidelink control information (SCI) through the physical sidelink control channel (PSCCH) to the UE 2 and then transmit the data based on the SCI through a physical sidelink shared channel (PSSCH). Transmission mode 1 may be applied to D2D, and transmission mode 3 may be applied to V2X.

The transmission mode 2/4 may be a mode in which the UE performs scheduling by itself. More specifically, the transmission mode 2 is applied to the D2D, and the UE may perform the D2D operation by selecting resource by itself from the configured resource pool. Transmission mode 4 is applied to V2X, and the UE may perform a V2X operation after selecting resources by itself from a selection window through a sensing process. The UE 1 may transmit the SCI through the PSCCH to the UE 2 and then transmit the data based on the SCI through the PSSCH. Hereinafter, the transmission mode may be abbreviated as a mode.

The control information transmitted by the BS to the UE through the PDCCH is referred to as DCI (downlink control information), while the control information transmitted by the UE to the other UE through the PSCCH may be referred to as SCI. The SCI may convey sidelink scheduling information. There may be several formats in SCI, for example, SCI format 0 and SCI format 1.

SCI format 0 may be used for scheduling of the PSSCH. The SCI format 0 may include a frequency hopping flag (1 bit), a resource block allocation and a hopping resource allocation field (the number of bits may vary depending on the number of resource blocks of the sidelink), a time resource pattern, an MCS (modulation and coding scheme), a time advance indication, a group destination ID, and the like.

The SCI Format 1 may be used for scheduling of the PSSCH. The SCI format includes priority, resource reservation, frequency resource location of initial transmission and retransmission (the number of bits may vary depending on the number of subchannels of the sidelink), a time gap between initial transmission and retransmission, MCS, retransmission index, and the like.

The SCI format 0 may be used for transmission modes 1 and 2, and the SCI format 1 may be used for transmission modes 3 and 4.

Hereinafter, resource allocation in mode 3 and mode 4 applied to V2X will be described in detail. First, mode 3 will be described.

1. Mode 3

Mode 3 may be scheduled resource allocation. The UE may be in RRC_CONNECTED state to transmit data.

FIG. 44 illustrates a case where a UE performs a mode 3 operation.

The UE may request the BS for transmission/reception resources, and the BS may schedule the resource(s) for the UE regarding the sidelink control information and/or transmission/reception of data. Here, a sidelink SPS may be supported for scheduled resource allocation. The UE may transmit/receive sidelink control information and/or data with another UE using the allocated resources.

2. Mode 4

FIG. 45 illustrates a case where a UE performs a mode 4 operation.

Mode 4 may be UE autonomous resource selection. The UE may perform sensing for (re)selection of sidelink resources. The UE may randomly select/reserve sideline resource among remaining resources excluding specific resource on the basis of a sensing result. The UE may perform up to two parallel independent resource reservation processes.

Sensing and resource selection in Mode 4 will be described in detail.

FIG. 46 illustrates sensing and resource selection in mode 4.

As described above, the UE may perform sensing to select a mode 4 transmission resource.

For example, the UE may recognize transmission resources reserved by other UEs or resources used by other UEs through sensing in a sensing window, exclude the same from the selection window, and randomly select resource from less-interfered resource among the remaining resources.

For example, within a sensing window, the UE may decode a PSCCH including information on a period of the reserved resources and measure a PSSCH RSRP on the periodically determined resources on the basis of the PSCCH. Resources whose PSSCH RSRP value exceeds a threshold may be excluded from the selection window. Thereafter, the UE may randomly select sidelink resources from the remaining resources in the selection window.

Alternatively, the UE may measure received signal strength indication (RSSI) of periodic resources in the sensing window to identify resources with less interference corresponding to lower 20%, for example. The UE may then select sidelink resource among the resources included in the selection window among the periodic resources. For example, such a method may be used if decoding of PSCCH fails.

FIG. 47 illustrates a V2X transmission resource selection (/reservation) method according to a (partial) sensing operation.

Once the predefined conditions are met, selection of resource for V2X signal transmission may be triggered. For example, it is assumed that the transmission resource selection is triggered in in subframe #m. In this case, the UE may select resource for V2X signal transmission in a subframe period from subframes #m+T1 to #m+T2. The subframe period from the subframes #m+T1 to #m+T2 is called a selection window. The selection window may include, for example, 100 consecutive subframes.

From the selection window, the UE may select at least Y subframes as candidate resources. The Y value may be a preset value or a value set by the network. Alternatively, how to select Y subframes from the selection window may be a matter of UE implementation.

If the Y value is 50, for example, the UE may select which 50 subframes are to be selected from among 100 subframes constituting the selection window. For example, the UE may select 50 subframes with an odd subframe number among the 100 subframes, or may select 50 subframes with an even number of subframes. Alternatively, the UE may select 50 subframes by a certain rule.

In order to select (/reserve) a specific subframe among the Y subframes, for example, a subframe #N(SF #N) as a V2X transmission subframe capable of transmitting a V2X signal, the UE must sense at least one subframe linked to or associated with the subframe #N.

A subframe period defined for sensing is referred to as a sensing window, and may include, for example, 1000 subframes. That is, the sensing window may be composed of 1,000 milliseconds (ms) or 1 second.

For example, in a sensing window, the UE may sense subframes corresponding to subframes #N-100*k (here, k may be a set of each of the elements in the range [1, 10] and may be previously set or a value set by the network).

In FIG. 47, a case where the k value is {1, 3, 5, 7, 10} is illustrated. That is, the UE senses subframes #N-1000, #N-700, #N-500, #N-300, #N-100 to estimate/determine whether a subframe #N is being used by another V2X UE and/or whether there is interference exceeding a predetermined or signaled threshold value on the subframe #N, and finally select the subframe #N according to a result.

Here, a case where a basic unit of sensing is a subframe is described as an example, but the subframe may be replaced with a slot, a mini-slot, or multiple slots.

Carrier Reselection

Carrier reselection for V2X sidelink communication may be performed at the MAC layer on the basis of a channel busy ratio (CBR) of the configured carriers and the prose per-packet priority (PPPP) of a V2X message to be transmitted.

That is, CBR and PPPP may be considered as parameters related to carrier reselection. The CBR may refer to a portion of sub-channels in the resource pool where the S-RSSI measured by the UE is detected to exceed a predetermined threshold. There may be PPPP associated with each logical channel and the setting of the PPPP value should reflect latency required for both the UE and the BS.

When reselecting a carrier, one or more of the candidate carriers may be selected in ascending order from the lowest CBR.

Sidelink Congestion Control

A wireless environment of the sidelink communication may be easily congested due to density of vehicles, an increase in the amount of information to be transmitted, and the like. Here, various methods are applicable to reduce congestion. One example is distributed congestion control.

In the distributed congestion control, the UE determines a congestion state of the network and performs transmission control. Here, congestion control considering priority of traffic (for example, packets) is required.

Specifically, each UE measures channel congestion (CBR) and determines a maximum value ($CRlimit_k$) of channel usage rate ($CR_k$) that each traffic priority (e.g., k) may occupy according to the CRB. For example, the UE may derive the maximum $CRlimit_k$ of the channel usage rate for each traffic priority on the basis of the CBR measurement value and a predetermined table. In the case of higher priority traffic, a maximum value of the larger channel usage may be derived.

Thereafter, the UE may perform congestion control by limiting the sum of the channel usage ratios of traffic whose priority k is lower than i to a predetermined value or less. According to this method, a stronger channel usage constraint is applied to relatively lower priority traffic.

In addition, the UE may use methods such as adjusting a magnitude of transmission power, dropping a packet, determining whether to retransmit, and adjusting a size of a transmission RB (MCS adjustment).

NR V2X

To extend the 3GPP platform to the automotive industry during 3GPP releases 14 and 15, support for V2V and V2X services was introduced in LTE.

The requirements for supporting an enhanced V2X use case are largely grouped into four use case groups.

(1) Vehicle platooning allows a platoon in which vehicles move together to be dynamically formed. Every vehicle in the platoon acquires information from a leading vehicle to manage the platoon. This information allows the vehicles to run in a more coordinated manner than in the normal direction and to travel in the same direction and run together.

(2) Extended sensors allow raw or processed data collected from a vehicle, a road side unit, a pedestrian device, and a V2X application server through a local sensor or a live video image to be exchanged. The vehicle may raise awareness of an environment more than its sensor may detect, and may recognize an area situation more broadly and collectively. A high data transfer rate is one of the main features.

(3) Advanced driving enables semi-automatic or fully-automatic operation. Each vehicle and/or RSU may share its own recognition data acquired from the local sensor with a nearby vehicle, and allow the vehicle to synchronize and adjust trajectory or maneuver. Each vehicle shares a driving intention with a nearby driving vehicle.

(4) Remote driving allows a remote operator or V2X application to remotely drive a vehicle for passengers who cannot travel on their own or in a dangerous environment. Cloud computing-based operations may be used if fluctuation is limited and a path may be predicted like public transportation. High reliability and low latency are key requirements.

The following description is applicable to both NR SL (sidelink) and LTE SL, and may denote NR SL if RAT (radio access technology) is not indicated.

There are six operating scenarios considered in NR V2X:

FIGS. 48, 49, and 50 illustrate stand-alone scenarios that support V2X SL communication. Especially, 1) In scenario 1, the gNB provides control/configuration for V2X communication of a UE in both LTE SL and NR SL, 2) In scenario 2, the ng-eNB among the BSs of the LTE system provides control/configuration for V2X communication of the UE in both LTE SL and NR SL.

3) In scenario 3, the eNB provides control/configuration for V2X communication of the UE in both LTE SL and NR SL.

The gNB is a BS of the NR system, which provides an NR user/control plane protocol to the UE and is connected to a 5G core network. The ng-eNB is a BS of the LTE system, which provides an LTE user/control plane protocol to the UE and is connected to the core network of the 5G system. The eNB is a BS of the LTE system, which provides an LTE user/control plane protocol to the UE and is connected to an evolved packet core (EPC), which is a core network of the LTE system.

FIGS. 51, 52, and 53 illustrate MR-DC scenarios that support V2X SL communication. Especially, 10 In scenario 4, V2X communication of the UE in LTE SL and NR SL is controlled/configured by Uu while the UE is configured with EN-DC (Evolved-Universal Terrestrial Radio Access-New Radio Dual Connectivity), 2) In scenario 5, V2X communication of the UE in LTE SL and NR SL is controlled/configured by Uu while the UE is configured in NE-DC (NR-E-UTRA Dual Connectivity)

3) In scenario 6, V2X communication of the UE in LTE SL and NR SL is controlled/configured by Uu while the UE is configured to NGEN-DC (NG-RAN-E-UTRA UTRA Dual Connectivity).

EN-DC, NE-DC and NGEN-DC are a type of multi-RAT dual connectivity (MR-DC). MR-DC refers to that two RATs support connectivity to UE simultaneously. A wireless access node (e.g., BS) providing a control plane connection from the MR-DC to the core network is called a master node (MN), and the MN may be a master eNB (MeNB) in the EN-DC, may be a master gNB (MgNB) in the NGEN-DC, and may be a master gNB in the NE-DC. In a MR-DC, a secondary node (SN) is a wireless access node that provides additional resources to the UE without a control plane connection to the core network, and the SN may be an en-gNB in the EN-DC, may be an ng-eNB in the NE-DC, or may be a secondary gNB (SgNB) in the NGEN-DC. In the EN-DC, the UE is connected to one eNB serving as MN and one en-gNB serving as SN, and the eNB is connected to EPC and en-Gnb. In the EN-DC, the en-gNB may be connected to the EPC and other en-gNBs. In the NE-DC, the UE is connected to one ng-eNB serving as the MN and one gNB serving as the SN, the ng-eNB is connected to the 5GC, which is a 5G core network, and the gNB is connected to the ng-eNB through an Xn interface which is an interface between the eNB and the gNB. In the NGEN-DC, the UE is connected to one ng-eNB serving as an MN and one gNB serving as an SN, and the ng-eNB is connected to a 5GC, which is a 5G core network, and connected to the ng-eNB through an Xn interface.

SL broadcast, group cast, and unicast transmission are supported in in-coverage, out-of-coverage, and partial-coverage scenarios.

An AS protocol stack, which is a protocol stack under the NAS for the control plane of the PC5 interface, includes at least RRC, PDCP, RLC and MAC lower layers and physical layers.

Physical Layer Structure

A physical layer structure and processing for physical SL control channel (PSCCH), physical SL shared channel (PSSCH), physical SL feedback channel (PSFCH), and the like will be described. For a more detailed description of physical layer processing, the contents described above may be referred to.

Waveform

A single waveform is used for all SL channels of a carrier. CP-OFDM may be supported. DFT-S-OFDM may be supported, but SL synchronization, PSCCH and PSFCH coverage improvement may be considered. If multiple waveforms are supported, which of the waveforms is to be used may be determined according to a (pre-)configuration.

Subcarrier Spacing and Cyclic Prefix 15 kHz, 30 kHz, and 60 kHz subcarrier spacings in frequency range 1 (FR1) is supported at 60 kHz subcarrier spacing with a normal CP and an extended CP. In a frequency range (FR2), 60 kHz and 120 kHz subcarrier spacings are supported. In a given carrier, the UE does not need to receive SL transmission simultaneously in a combination of two or more of subcarrier spacings and CPs, and does not need to transmit SL transmission simultaneously in a combination of two or more of subcarrier spacings and CPs. A numerology configuration is part of the SL BWP configuration.

SL Bandwidth Part (BWP) and Resource Pool

BWP is defined for SL, and the same SL BWP is used for transmission and reception. At a licensed carrier, SL BWP is defined separately from Uu BWP. One SL BWP is (previously) configured for RRC IDLE and out-of-coverage NR V2X UE at one carrier. For UEs in RRC_CONNECTED mode, one SL BWP is activated at the carrier.

A resource pool is a set of time-frequency resources that may be used for SL transmission and/or reception. From a UE perspective, the resource pool is within the bandwidth of the UE within the SL BWP and has a single numerology. Multiple resource pools may be (previously) configured to the UE at one carrier.

HARQ Feedback

In the case of SL unicast and group cast, HARQ feedback and HARQ combining at the physical layer are supported. The HARQ-ACK feedback for the PSSCH is carried in the sideline feedback control information (SFCI) format through the PSFCH.

When SL HARQ feedback is enabled for unicast, in the case of a non-CBG (code block group) operation, if the reception UE successfully decodes the corresponding transport block (TB), HARQ-ACK is generated. After decoding the associated PSCCH targeting the reception UE, HARQ-NACK is generated if the TB is not successfully decoded.

When SL HARQ feedback is enabled for a group cast, the following two feedback operations for each TB, not a feedback for each CGB, may be possible.

(Option 1): If the reception UE fails to decode the corresponding TB after decoding the associated PSCCH, it transmits HARQ-NACK on the PSFCH. Otherwise, it does not send a signal on the PSFCH.

(Option 2): If the reception UE successfully decodes the TB, it transmits HARQ-ACK on the PSFCH. After decoding the relevant PSCCH targeting the reception UE, if the reception UE does not successfully decoded, it transmits HARQ-NACK on the PSFCH CSI Acquisition and Link Adaptation In NR V2X, when available, usefulness of information indicating a channel between the transmission UE and the reception UE and information indicating interference in the reception UE is considered. An example of this information may be CQI, PMI, RI, RSRP, RSRQ, path gain/path loss, SRS resource indicator (SRI), CSI-RS resource indicator (CRI), or the like.

Synchronization

V2X SL synchronization includes the following matters.

SL synchronization signal: SL primary synchronization signal (S-PSS), SL secondary synchronization signal (S-SSS)

Physical SL broadcast channel (PSBCH)

SL synchronization sources and process

The use of other SL signals and channels for SL synchronization, such as a reference signal and PSCCH/PSSCH, is also considered.

The S-PSS, the S-SSS, and the PSBCH are configured in a block format (S-SSB) that supports periodic transmission. The S-SSB has the same numerology (e.g., subcarrier spacing and CP length) as the PSCCH/PSSCH in the carrier and a transmission bandwidth thereof is within a (previously set) SL BWP.

The SL synchronization source may be GNSS, BS, and NR UE.

Resource Allocation

NR V2X may define at least two following SL resource allocation modes.

(Mode 1): The BS schedules the SL resource(s) to be used by the UE for SL transmission.

NR Uu may allocate NR SL resources for (i) a licensed carrier shared by NR Uu and NR SL and (ii) for a dedicated carrier of NR SL, and support the following operations dynamic resource allocation configured grant (Mode 2): The UE determines the SL transmission resource in the SL resource set by the BS/network or the preset SL resource, that is, the BS does not schedule.

A definition of SL resource allocation mode 2 is as follows.

a) The UE selects an SL resource to autonomously transmit.

b) The UE assists in selecting SL resources for other UE(s).

c) The UE is configured to an NR-configured grant (similar to UL grant type 1) for SL transmission d) The UE schedules SL transmission of other UEs Sensing and Resource Selection The sensing process is defined as decoding SCI(s) from other UEs and/or SL measurements. A process of considered resource (reselection) determines resource for SL transmission using a result of the sensing process.

Mode 2(a)

In a situation of a semi-persistent configuration in which resources are selected for multiple transmissions of different transport blocks (TBs) and a dynamic configuration in which resources are selected for each TB transmission, SL detection and resource selection process for mode 2(a) may be considered.

The following procedures may be used to identify the occupied SL resources.

Decoding of SL control channel transmission

SL measurement

SL transmission detection

Also, the following matters may be considered for SL resource selection.

How the UE selects resources for PSCCH and PSSCH transmissions (and other SL physical channels/defined signals)

What information the UE uses for the resource selection process

Mode 2(b)

Mode 2 (b) is a function that can be a part of the operations of the modes 2(a), 2(c), and 2(d).

Mode 2(c)

For out-of-coverage operation, mode 2(c) assumes (previous) configuration of a single or multiple SL transmission patterns defined in each SL resource pool. For in-coverage operation, mode 2(c) assumes that a BS configuration represents a single or multiple SL transmission patterns defined in each SL resource pool. If one pattern is configured for the transmission UE, the UE does not perform a sensing process, and if multiple patterns are configured, the sensing process may be generated.

The 'pattern' is defined by a size and location of resources and the number of resources in time and frequency.

Mode 2(d)

A process of becoming a scheduling UE for in-coverage and out-of-coverage scenarios or playing the role may be considered as follows.

The scheduling UE is configured by the BS.

An application layer or pre-configuration selects the scheduling UE.

The reception UE schedules transmission of the transmission UE during the session The scheduling UE is determined by multiple UEs including a finally selected UE. The UE may autonomously determine to function as the scheduling UE/scheduling UE functions.

Hereinafter, the wireless communication system block diagram shown in FIG. 1 will be described in detail.

N. Wireless Communication Device

Referring to FIG. 1, a wireless communication system includes a first communication device 910 and/or a second communication device 920. 'A and/or B' may be interpreted to have the same meaning as 'includes at least one of A or B.' The first communication device may represent a BS and the second communication device may represent a UE (alternatively, the first communication device may represent a UE and the second communication device may represent a BS).

The first and second communication devices may include processors 911 and 921, memories 914 and 924, one or more Tx/Rx RF modules 915 and 925, Tx processors 912 and 922, Rx processors 913 and 923, and antennas 916 and 926, respectively. The Tx/Rx module is also called a transceiver. The processor implements the functions, procedures and/or methods discussed above. More specifically, in the DL (communication from the first communication device to the second communication device), a higher layer packet from the core network is provided to the processor 911. The processor implements the function of a layer 2 (i.e., L2) layer. In the DL, the processor multiplexes a logical channel and a transport channel, provides radio resource allocation to the second communication device 920, and is responsible for signaling to the second communication device. A transmission (TX) processor 912 implements various signal processing functions for the L1 layer (i.e., the physical layer). The signal processing function facilitates forward error correction (FEC) in the second communication device, and includes coding and interleaving. The encoded and interleaved signals are scrambled and modulated into complex-valued modulation symbols. For modulation, BPSK (Quadrature Phase Shift Keying), QPSK (Quadrature Phase Shift Keying), 16 QAM (quadrature amplitude modulation), 64 QAM, 246 QAM, and the like may be used. The complex-valued modulation symbols (hereinafter referred to as modulation symbols) are divided into parallel streams, each stream being mapped to an OFDM subcarrier and multiplexed with a reference signal (RS) in the time and/or frequency domain, and combined together using IFFT (Inverse Fast Fourier Transform) to create a physical channel carrying a time domain OFDM symbol stream. The OFDM symbol stream is spatially precoded to produce multiple spatial streams. Each spatial stream may be provided to a different antenna 916 via a separate Tx/Rx module (or transceiver, 915). Each Tx/Rx module may upconvert each spatial stream into an RF carrier for transmission. In the second communication device, each Tx/Rx module (or transceiver, 925) receives a signal of the RF carrier via each antenna 926 of each Tx/Rx module. Each Tx/Rx module restores the RF carrier signal to a baseband signal and provides it to the reception (RX) processor 923. The RX processor implements various signal processing functions of the L1 (i.e., the physical layer). The RX processor may perform spatial processing on the information to recover any spatial stream directed to the second communication device. If multiple spatial streams are directed to the second communication device, they may be combined into a single OFDMA symbol stream by multiple RX processors. The RX processor transforms the OFDM symbol stream, which is a time domain signal, into a frequency domain signal using a fast Fourier transform (FFT). The frequency domain signal includes a separate OFDM symbol stream for each subcarrier of the OFDM signal. The modulation symbols and the reference signal on each subcarrier are recovered and demodulated by determining the most likely signal constellation points sent by the first communication device. These soft decisions may be based on channel estimate values. Soft decisions are decoded and deinterleaved to recover data and control signals originally transmitted by the first communication device on the physical channel. The corresponding data and control signals are provided to the processor 921.

The UL (communication from the second communication device to the first communication device) is processed in the first communication device 910 in a manner similar to that described in connection with a receiver function in the second communication device 920. Each Tx/Rx module 925 receives a signal via each antenna 926. Each Tx/Rx module provides an RF carrier and information to RX processor 923. The processor 921 may be related to the memory 924 that stores program code and data. The memory may be referred to as a computer-readable medium.

The above-mentioned 5G communication technology may be applied in combination with the methods proposed in this specification to be described later in FIGS. 54 to 77, or may be supplemented to specify or clarify the technical features of the methods proposed in this specification.

A vehicle of the present invention may be embodied as an internal combustion engine vehicle having an engine as a power source, a hybrid vehicle having an engine and an electric motor as a power source, an electric vehicle having an electric motor as a power source, and the like.

In the following embodiments, a user may be interpreted as a driver or an owner of a vehicle and a user terminal. The user terminal may be, but is not limited to, a mobile terminal, for example, a smart phone, which can be carried by the user and capable of executing phone calls and various applications. For example, the user terminal may include one or more of a mobile terminal, a personal computer (PC), a notebook computer, and a user interface device of a vehicle. The user interface device of the vehicle may be an in-vehicle infotainment (IVI) system.

One or more of the user terminal, the vehicle, and the server may be associated with artificial intelligence, robots, augmented reality (AR), and virtual reality (VR).

Hereinafter, various embodiments of the present invention will be described in detail with reference to the accompanying drawings.

Referring to FIGS. 54 to 60, the overall length of the vehicle 100 refers to a length from the front end to the rear end of the vehicle 100, the overall width of the vehicle 100 refers to the width of the vehicle 100, and the overall height of the vehicle 100 refers to the height from the bottom of the wheel to the roof of the vehicle 100. In FIG. 54, the overall length direction L may refer to a reference direction for the measurement of the overall length of the vehicle 100, the overall width direction W may refer to a reference direction for the measurement of the overall width of the vehicle 100, and the overall height direction H may refer to a reference direction for the measurement of the overall height of the vehicle 100. In FIGS. 54 to 59, the vehicle is illustrated in the form of a sedan but is not limited thereto.

The vehicle 100 may be remotely controlled by an external device. The external device may be a server, another vehicle, or the like. The server may perform remote control on the vehicle 100 when the vehicle 100 is determined to require remote control.

In the present invention, a service zone providing various services related to the vehicle (hereinafter referred to as "vehicle service") is arranged near a parking lot, thereby linking parking and vehicle services. The vehicle services may include services related to the vehicle 10, such as refueling, vehicle inspection, car wash services, and the like.

As shown in FIGS. 61 and 62, the server may register (reserves), changes, real-time management, and the like regarding the vehicle service in a service zone disposed between a pick-up area and a parking lot. The server may set a path to receive the vehicle service selected by a user and analyze an estimated time or the like.

The estimated time may include an estimated service waiting time for each of the vehicle service items, a total estimated required time obtained by adding the estimated service time and all the vehicle services selected by the user, an estimated end time, and the like. The server may remotely control the vehicle 100 to autonomously drive along a path established between the pick-up area and the parking lot.

The vehicle 100 may autonomously drive to a destination without a driver or driver interference in a normal driving mode. The normal driving mode is divided into a manual mode, an autonomous driving mode, and a remote control mode depending on a subject who controls the vehicle 100. In the manual mode, the vehicle is operated by the driver. In the autonomous driving mode, the controller 170 or the operation system 700 directly controls the vehicle 100 without driver interference to drive to a destination set by the driver. The autonomous driving mode includes autonomous parking to search for an empty space in a parking lot to park the vehicle therein. The remote control mode allows an external device to control the vehicle 100 without driver interference.

A user may select one of the autonomous driving mode, the manual mode, and the remote control mode through a user interface device 200.

The vehicle 100 may be automatically switched to one of the autonomous driving mode, the manual mode, and the remote control mode on the basis of at least one of driver state information, vehicle traveling information, and vehicle state information.

The driver state information may be generated through the user interface device 200 and provided to the controller 170. The driver state information may be generated on the basis of an image or biometric information of the driver detected through an internal camera 220 or a biometric sensing unit 230. For example, the driver state information may include a gaze, facial expression, behavior, and driver location information of the driver acquired from the image acquired through the internal camera 220. The driver state information may include biometric information of the user acquired through the biometric sensing unit 230. The driver state information may indicate a direction the gate of the driver, sleepiness of the driver, a health state of the driver, an emotional state of the driver, and the like.

The vehicle traveling information may be generated on the basis of object information provided by the object detection device 300 or information received through the communication device 400. The vehicle traveling information may include location information of the vehicle 100, posture information of the vehicle 100, information on another vehicle OB11 received from the other vehicle OB11, information on a traveling path of the vehicle 100, navigation information including a map, and the like.

The vehicle traveling information may include a kind, location, and movement of an object present near the vehicle 100, presence or absence of a lane detected near the vehicle 100, and the like. In addition, the vehicle traveling information may include traveling information of the other vehicle 100, a lay-by (a space for drivers to stop) near the vehicle 100, a possibility of collision between the vehicle and an object, pedestrian or bicycle information detected near the vehicle 100, a signal state near the vehicle 100, a movement of the vehicle 100, and the like.

The vehicle traveling information may be generated by linking at least one of the object detection device 300, the communication device 400, the navigation system 770, the sensing unit 120, and the interface unit 130, and provided to the controller 170.

The vehicle state information may be information related to states of various devices provided in the vehicle 100. For example, the vehicle state information includes information on a charged state of a battery, information on an operational state of the user interface device 200, the object detection device 300, the communication device 400, a maneuvering device 500, a vehicle drive device 600, an operation system 700, and information on whether each device is abnormal.

The vehicle state information may indicate whether a GPS signal of the vehicle 100 is normally received, whether at least one of the sensors provided in the vehicle 100 is abnormal, and whether each of the devices provided in the vehicle 100 normally operates.

On the basis of the object information generated by the object detection device 300, a control mode of the vehicle 100 may be switched from the manual mode to the autonomous driving mode or may be switched from the autonomous driving mode to the manual mode.

The control mode of the vehicle 100 may be switched from the manual mode to the autonomous driving mode or switched from the autonomous driving mode to the manual mode on the basis of the information received through the communication device 400.

The control mode of the vehicle 100 may be switched from the manual mode to the autonomous driving mode or from the autonomous driving mode to the manual mode on the basis of the information, data, and signals provided by the external device.

When the vehicle 100 is operated in the autonomous driving mode, the vehicle 100 may travel under the control of the operation system 700. In the autonomous driving mode, the vehicle 100 may be operated on the basis of information generated in a driving system 710, a parking-out system 740, and a vehicle parking system 750.

When the vehicle 100 is operated in the manual mode, the vehicle 100 may travel according to a user input received through the maneuvering device 500.

When the vehicle 100 is operated in the remote control mode, the vehicle 100 may receive a remote control signal transmitted from the external device through the communication device 400. The vehicle 100 may be controlled in response to the remote control signal.

As illustrated in FIG. 60, the vehicle 100 may include the user interface device 200, the object detection device 300, the communication device 400, the maneuvering device 500, a vehicle drive device 600, the operation system 700, a navigation system 770, a sensing unit 120, an interface unit 130, a memory 140, a controller 170, and a power supply unit 190.

Any other component than the components illustrated in FIG. 60 may be further included or some components may be omitted.

The user interface device 200 is provided to support communication between the vehicle 100 and a user. The user interface device 200 may receive a user input, and provide information generated in the vehicle 100 to the user. The vehicle 100 may enable User Interfaces (UI) or User Experience (UX) through the user interface device 200.

The user interface device 200 may include an input unit 210, an internal camera 220, a biometric sensing unit 230, an output unit 250, and a processor 270.

The input unit 210 is configured to receive a user command from a user, and data collected in the input unit 210 may be analyzed by the processor 270 and then recognized as a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170. The voice input unit 211 may include one or more microphones.

The gesture input unit 212 may convert a gesture input of a user into an electrical signal. The converted electrical signal may be provided to the processor 270 or the controller 170. The gesture input unit 212 may include at least one selected from among an infrared sensor and an image sensor for sensing a gesture input of a user.

The gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense the 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170. The touch input unit 213 may include a touch sensor for sensing a touch input of a user. In some implementations, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170. The mechanical input unit 214 may be located on a steering wheel, a center fascia, a center console, a cockpit module, a door, etc.

An occupant sensing unit 240 may detect an occupant in the vehicle 100. The occupant sensing unit 240 may include the internal camera 220 and the biometric sensing unit 230.

The internal camera 220 may acquire images of the inside of the vehicle 100. The processor 270 may sense a user's state on the basis of the images of the inside of the vehicle 100. For example, a user's detected condition may be about an eye gaze, a face, a behavior, a facial expression, and a location of the user.

The processor 270 may acquire information on the eye gaze, the face, the behavior, the facial expression, and the location of the user from an image of the inside of the vehicle 100. The processor 270 may sense a gesture of the user from the image of the inside of the vehicle 100. The processor 270 may provide the driver state information, which is acquired from the image of the inside of the vehicle 100, to the controller 170, The biometric sensing unit 230 may acquire biometric information of the user. The biometric sensing unit 230 may include a sensor for acquire biometric information of the user, and may utilize the sensor to acquire finger print information, heart rate information, brain wave information etc. Of the user. The biometric information may be used to authenticate a user or determine the user's condition.

The processor 270 may determine a driver's state on the basis of the driver's biometric information. Information acquired by the processor 270 through determining the driver's condition may be driver state information. In this case, the driver state information may indicate whether the driver is in faint, dozing off, excited, or in an emergency situation. The processor 270 may provide the driver state information, acquired on the basis of the driver's biometric information, to the controller 170.

The output unit 250 is configured to generate a visual, audio, or tactile output. The output unit 250 may include at least one selected from among a display unit 251, a sound output unit 252, and a haptic output unit 253.

The display unit 251 may display graphic objects corresponding to various types of information. The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen. The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window. The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

The display 251 may include a plurality of display units 251a to 251g as shown in FIGS. 56 and 57. The display 251 may be disposed in a region 251a of a steering wheel, a region 251b or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface device 200. In a case where the user interface device 200 does not include the processor 270, the user interface device 200 may operate under control of the controller 170 or a processor of a different device inside the vehicle 100.

The object detection device 300 is configured to detect an object outside the vehicle 100. The object may include various objects related to travelling of the vehicle 100. For example, as illustrated in FIGS. 58 and 59, an object may include a lane OB10, a nearby vehicle OB11, a pedestrian OB12, a two-wheeled vehicle OB13, a traffic sign OB14 and OB15, a light, a road, a structure, a bump, a geographical feature, an animal, etc.

The lane OB10 may be a lane in which the vehicle 100 is traveling, a lane next to the lane in which the vehicle 100 is traveling, or a lane in which a different vehicle is travelling from the opposite direction. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is travelling ahead or behind the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic sign may include a traffic light OB15, a traffic sign plate OB14, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a bridge, a traffic light, a curb, a guardrail, etc.

The geographical feature may include a mountain and a hill.

In some implementations, the object may be classified as a movable object or a stationary object. For example, the movable object may include a nearby vehicle and a pedestrian. For example, the stationary object may include a traffic sign, a road, a structure, and a traffic line.

The object detection device 300 may include a camera 310, a radar 320, a lidar 330, an ultrasonic sensor 340, an infrared sensor 350, and a processor 370.

The camera 310 may be located at an appropriate position outside the vehicle 100 in order to acquire images of the outside of the vehicle 100. The camera 310 may be a mono camera, a stereo camera 310a, an Around View Monitoring (AVM) camera 310b, or a 360-degree camera.

For example, the camera 310 may be disposed near a front windshield in the vehicle 100 in order to acquire images of the front of the vehicle 100. Alternatively, the camera 310 may be disposed around a front bumper or a radiator grill. In another example, the camera 310 may be disposed near a rear glass in the vehicle 100 in order to acquire images of the rear of the vehicle 100. Alternatively, the camera 310 may be disposed around a rear bumper, a trunk, or a tailgate. In yet another example, the camera 310 may be disposed near at least one of the side windows in the vehicle 100 in order to acquire images of the side of the vehicle 100. Alternatively, the camera 310 may be disposed around a side mirror, a fender, or a door. The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object. The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme. The lidar 330 may be implemented as a drive type lidar or a non-drive type lidar. When implemented as the drive type lidar, the lidar 300 may rotate by a motor and detect an object in the vicinity of the vehicle 100. When implemented as the non-drive type lidar, the lidar 300 may utilize a light steering technique to detect an object located within a predetermined distance from the vehicle 100.

The lidar 330 may detect an object through the medium of laser light by employing the TOF scheme or the phase-shift scheme, and may detect a location of the detected object, the distance to the detected object, and the speed relative to the detected object. The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object on the basis of an ultrasonic wave, and may detect a location of the detected object, the distance to the detected object, and the speed relative to the detected object. The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object on the basis of infrared light, and may detect a location of the detected object, the distance to the detected object, and the speed relative to the detected object. The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection device 300. The processor 370 may detect and track an object on the basis of acquired images. The processor 370 may, for example, calculate the distance to the object and the speed relative to the object, determine a type, location, size, shape, color, moving path of the object, and determine a sensed text.

The processor 370 may detect and track an object on the basis of a reflection electromagnetic wave which is formed as a result of reflection a transmission electromagnetic wave by the object. On the basis of the electromagnetic wave, the processor 370 may, for example, calculate the distance to the object and the speed relative to the object.

The processor 370 may detect and track an object on the basis of a reflection laser light which is formed as a result of reflection of transmission laser by the object. On the basis of the laser light, the processor 370 may, for example, calculate the distance to the object and the speed relative to the object.

The processor 370 may detect and track an object on the basis of a reflection ultrasonic wave which is formed as a result of reflection of a transmission ultrasonic wave by the object. On the basis of the ultrasonic wave, the processor 370 may, for example, calculate the distance to the object and the speed relative to the object.

The processor 370 may detect and track an object on the basis of reflection infrared light which is formed as a result of reflection of transmission infrared light by the object. On the basis of the infrared light, the processor 370 may, for example, calculate the distance to the object and the speed relative to the object.

The processor may generate object information on the basis of at least one of the following: an information acquired using the camera 310, a reflected electronic wave received using the radar 320, a reflected laser light received using the lidar 330, and a reflected ultrasonic wave received using the ultrasonic sensor 340, and a reflected infrared light received using the infrared sensor 350.

The object information may be information about a type, location, size, shape, color, a moving path, and speed of an object existing around the vehicle 100 and information about a sensed text. For example, the object information may indicate: whether a traffic line exists in the vicinity of the vehicle 100; whether any nearby vehicle is travelling while the vehicle 100 is stopped; whether there is a space in the vicinity of the vehicle 100 to stop; whether a vehicle and an object could collide; where a pedestrian or a bicycle is located with reference to the vehicle 100; a type of a roadway in which the vehicle 100 is travelling, a status of a traffic light in the vicinity of the vehicle 100, and movement of the vehicle 100.

In some implementations, the object detection device 300 may include a plurality of processors 370 or may not include the processor 370. For example, each of the camera 310, the radar 320, the lidar 330, the ultrasonic sensor 340, and the infrared sensor 350 may include its own processor.

The object detection device 300 may operate under control of the controller 170 or a processor inside the vehicle 100.

The communication device 400 is configured to perform communication with an external device. Here, the external device may be a nearby vehicle, a mobile terminal, or a server.

To perform communication, the communication device 400 may include at least one selected from among a transmission antenna, a reception antenna, a Radio Frequency (RF) circuit capable of implementing various communication protocols, and an RF device.

The communication device 400 may include a short-range communication unit 410, a location information unit 420, a V2X communication unit 430, an optical communication unit 440, a broadcast transmission and reception unit 450, and a processor 470.

The short-range communication unit 410 is configured to perform short-range communication. The short-range communication unit 410 may support short-range communication using at least one selected from among Bluetooth剂, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include at least one of a Global Positioning System (GPS) module, a Differential Global Positioning System (DGPS) module, and a Carrier phase Differential GPS (CDGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal. In some implementations, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The processor 470 may control the overall operation of each unit of the communication device 400. Vehicle driving information may include information that is received using at least one of the short-range communication unit 410, the location information unit 420, the V2X communication unit 430, the optical communication unit 440, and the broadcast transmission and reception unit 450.

In a case where the communication device 400 does not include the processor 470, the communication device 400 may operate under control of the controller 170 or a processor of a device inside of the vehicle 100.

In some implementations, the communication device 400 may implement a vehicle display device, together with the user interface device 200. In this case, the vehicle display device may be referred to as a telematics device or an Audio Video Navigation (AVN) device.

The controller 170 may transmit at least one of driver state information, vehicle state information, vehicle traveling information, error information indicating an error of the vehicle 100, object information, a user input received through the user interface device 200, and a remote control request signal to an external device on the basis of a signal received from the communication device 400. A remote controlling server may determine whether remote controlling is required for the vehicle 100 on the basis of information transmitted from the vehicle 100.

The controller 170 may control the vehicle 100 according to a control signal received from the remote controlling server.

The maneuvering device 500 is configured to receive a user command for driving the vehicle 100. In the manual driving mode, the vehicle 100 may operate on the basis of a signal provided by the maneuvering device 500.

The maneuvering device 500 may include a steering input device 510, an acceleration input device 530, and a brake input device 570.

The steering input device 510 may receive a user command for steering of the vehicle 100. The steering input device 510 may take the form of a wheel to enable a steering input through the rotation thereof. In some implementations, the steering input device may be provided as a touchscreen, a touch pad, or a button.

The acceleration input device 530 may receive a user command for acceleration of the vehicle 100. The brake input device 570 may receive a user command for deceleration of the vehicle 100. Each of the acceleration input device 530 and the brake input device 570 may take the form of a pedal. In some implementations, the acceleration input device or the break input device may be configured as a touch screen, a touch pad, or a button.

The maneuvering device 500 may operate under control of the controller 170.

The vehicle drive device 600 is configured to electrically control the operation of various devices of the vehicle 100. The vehicle drive device 600 may include a power train drive unit 610, a chassis drive unit 620, a door/window drive unit 630, a safety apparatus drive unit 640, a lamp drive unit 650, and an air conditioner drive unit 660.

The power train drive unit 610 may control the operation of a power train. The power train drive unit 610 may include a power source drive unit 611 and a transmission drive unit 612.

The power source drive unit 611 may control a power source of the vehicle 100. In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

The transmission drive unit 612 may control a transmission. The transmission drive unit 612 may adjust the state of the transmission. The transmission drive unit 612 may adjust a state of the transmission to a drive (D), reverse (R), neutral (N), or park (P) state. In some implementations, in a case where an engine is the power source, the transmission drive unit 612 may adjust a gear-engaged state to the drive location D.

The chassis drive unit 620 may control the operation of a chassis. The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel. In some implementations, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100. In some implementations, the suspension drive unit 623 may control a plurality of suspensions individually.

The door/window drive unit 630 may perform electronic control of a door device or a window device inside the vehicle 100. The door/window drive unit 630 may include a door drive unit 631 and a window drive unit 632. The door drive unit 631 may control the door device. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window device. The window drive unit 632 may control opening or closing of a plurality of windows included in the vehicle 100.

The safety apparatus drive unit 640 may perform electronic control of various safety apparatuses provided inside the vehicle 100. The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100.

The operation system 700 is a system for controlling the overall operation of the vehicle 100. The operation system 700 may operate in an autonomous driving mode. The operation system 700 may include the driving system 710, the parking-out system 740, and the vehicle parking system 750. In some implementations, in a case where the operation system 700 is implemented as software, the operation system 700 may be a subordinate concept of the controller 170.

The operation system 700 may be a concept including at least one selected from among the user interface device 200, the object detection device 300, the communication device 400, the vehicle drive device 600, and the controller 170.

The driving system 710 may perform driving of the vehicle 100. The driving system 710 may perform driving of the vehicle 100 by providing a control signal to the vehicle drive device 600 in response to reception of navigation information from the navigation system 770. The driving system 710 may perform driving of the vehicle 100 by providing a control signal to the vehicle drive device 600 in response to reception of object information from the object detection device 300. The driving system 710 may perform driving of the vehicle 100 by providing a control signal to the vehicle drive device 600 in response to reception of a signal from an external device through the communication device 400.

The parking-out system 740 may park the vehicle 100 out of a parking space. The parking-out system 740 may park the vehicle 100 out of a parking space, by providing a control signal to the vehicle drive device 600 on the basis of location information of the vehicle 100 and navigation information provided by the navigation system 770. The parking-out system 740 may park the vehicle 100 out of a parking space, by providing a control signal to the vehicle drive device 600 on the basis of object information provided by the object detection device 300. The parking-out system 740 may park the vehicle 100 out of a parking space, by providing a control signal to the vehicle drive device 600 on the basis of a signal provided by an external device.

The parking system 750 may park the vehicle 100 in a parking space. The vehicle parking system 750 may perform an operation of parking the vehicle 100 in a parking space, by providing a control signal to the vehicle drive device 600 on the basis of location information of the vehicle 100 and navigation information provided by the navigation system 770. The parking system 750 may park the vehicle 100 in a parking space, by providing a control signal to the vehicle drive device 600 on the basis of object information provided by the object detection device 300. The parking system 750 may park the vehicle 100 in a parking space, by providing a control signal to the vehicle drive device 600 on the basis of a signal provided by an external device.

The navigation system 770 may provide navigation information. The navigation information may include at least one of the following: map information, information on a set destination, information on a route to the set destination, information on various objects along the route, lane information, and information on the current location of a vehicle.

The navigation system 770 may include a memory and a processor. The memory may store navigation information. The processor may control the operation of the navigation system 770. In some implementations, the navigation system 770 may update pre-stored information by receiving information from an external device through the communication device 400. In some implementations, the navigation system 770 may be classified as an element of the user interface device 200.

The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a yaw sensor, a gyro sensor, a location module, a vehicle forward/reverse movement sensor, a battery sensor, a fuel sensor, a tire sensor, a steering sensor on the basis of the rotation of the steering wheel, an in-vehicle temperature sensor, an in-vehicle humidity sensor, an ultrasonic sensor, an illumination sensor, an accelerator pedal location sensor, and a brake pedal location sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the pressure applied to an accelerator pedal, and information about the pressure applied to a brake pedal. The information acquired by the sensing unit 120 may be included in vehicle traveling information.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Location Sensor (TPS), a Top Dead Center (TDC) sensor, and a Crank Angle Sensor (CAS).

The interface unit 130 may serve as a passage for various kinds of external devices that are connected to the vehicle 100. For example, the interface unit 130 may have a port that is connectable to a mobile terminal and may be connected to the mobile terminal via the port. In this case, the interface unit 130 may exchange data with the mobile terminal.

The interface unit 130 may serve as a passage for the supply of electrical energy to a mobile terminal connected thereto. When the mobile terminal is electrically connected to the interface unit 130, the interface unit 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some implementations, the memory 140 may be integrally formed with the controller 170, or may be provided as an element of the controller 170.

The controller 170 may control overall operation of each unit in the vehicle 100. The controller 170 may be referred to as an Electronic Controller (ECU). The controller may control the vehicle 100 on the basis of navigation information provided by the navigation system 770 and information provided by the object detection device 300 or the communication device 400. Accordingly, the vehicle 100 may autonomously drive under the control of the controller 170.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The power supply unit 190 may receive power from a battery inside the vehicle.

The power supply unit 190 may supply the components with power necessary for operations of the respective components under the control of the controller 170.

The vehicle 100 includes an in-vehicle infotainment (IVI) system. The IVI system executes a user interface (UI) or user experience (UX) program for reproducing multimedia content in response to user input using the user interface device 200, the communication device 400, the controller 170, the navigation system 770, and the operation system 700, and providing a service for providing user convenience.

The IVI system may display registration, change and cancellation of various vehicle services that may be provided in the service zone 20, a real-time status of the vehicle service, an estimated required time, and an estimated end time, and the like, to the user, and transfer a user response to the management server 40.

FIG. 61 is a diagram illustrating a service providing system using an autonomous vehicle according to an embodiment of the present invention. FIG. 62 is a block diagram showing a server configuration shown in FIG. 51. FIG. 63 is a state transition diagram showing a control method of a system shown in FIG. 61.

Referring to FIGS. 61 to 63, the service providing system of the present invention includes a parking lot 10, a pick-up zone 30, and a service zone 20.

In the present invention, a vehicle service zone for providing a vehicle service is arranged near the parking lot 10 to link parking and the vehicle service.

Using the autonomous driving technology, the present invention allows the user to be provided with vehicle services in order selected by the user, while the user is taking care of personal business. For example, while the user is doing shopping, the vehicle 100 may be provided with a vehicle service previously registered by the user, while autonomously traveling along a predetermined path between the parking lot 10 and the pick-up zone 30.

When there is a previously registered vehicle service input through the user terminal 50, the navigation system 770 of the vehicle 100 may set the service zone adjacent to the parking lot as a destination in response to a service start signal from the server 70 and may set the parking lot adjacent to the service zone as a destination in response to a service completion signal received from the server 40.

The user terminal 50 may be an IVI system of the user's mobile terminal or the vehicle 100. The operation system 700 may move the vehicle by autonomous driving to the destination in the normal driving mode, the autonomous parking mode, the vehicle service mode, and the parking mode shown in FIG. 63.

The controller 170 of the vehicle 100 is connected to the management server 40 through the communication device 400 to transmit the user data from the user terminal 50 to the server 400, and transfers the service completion signal from the management server 40 to the navigation system 770. The navigation system 770 may set an autonomous traveling path of the vehicle 100 on the basis of a moving path from the server 400.

A service system is implemented in the vehicle service zone 20. The service system provides one or more vehicle services including a surveillance camera system, a service provider server, and a management server connected to the communication device.

The surveillance camera system transmits a vehicle number, a current position, a vehicle image, and the like to the management server 40 for each vehicle within the vehicle service zone 20. The service provider server transmits a vehicle service status to the management server 40 and receives registration, cancellation, and change of the vehicle service from the management server 40 in real time.

The management server 40 manages vehicle service registration, change, and cancellation of the service zone 20. The management server 40 is connected to the surveillance camera system and the communication device of the service zone 20 to identify each vehicle in the service zone 20 and to monitor a service status of each of the vehicles in real time. The management server 40 may be associated with service providers located in the service zone 20. The management server 40 may transmit a service completion signal to the vehicle 100 when the vehicle 100 receives all the pre-registered vehicle services or the pre-registered vehicle service is canceled by the user. When there is a registered vehicle service before the vehicle 100 arrives at the pick-up zone 30 or when the user adds a registration service while the vehicle 100 is being parked at the parking lot 10, the management server 40 may transmit a service initiation signal to the vehicle 100.

The management server 40 is connected to terminals of service providers and a user terminal through a network. The management server 40 provides information necessary for a UX screen displayed on the display of the terminal of the service provider and the user terminal. The management server 40 receives the user input data in response to the UX screen, and provides data requested by the service provider and the user to the terminal of the service provider and the user terminal.

The management server 40 transmits to the user terminal 50 a vehicle service item that may be registered, estimated time information, and the like, on the basis of the status data received from the service zone 20, receives user data from the user terminal 50, and transfers the received user data to the service provider to register (reserve) the vehicle service.

The management server 40 may provide a UX (user experience) platform to the personal terminal 50 and the vehicle 100 so that various vehicle services may be readily provided while the user is taking care of personal business. This UX platform may facilitate registration (reservation), change, real-time management, and the like for various services related to the vehicle 100 between the parking lot 10 and the pick-up zone 30, and detects a smooth vehicle service in real time to recommend an optimal service for each customer individually.

The management server 40 may analyze the number of waiting vehicles, a waiting time, estimated time, and the like for each service provider, selects a smooth vehicle service, and recommend the selected vehicle service to the user through the UX platform executed in the user terminal 50 and the IVI system of the vehicle 100.

The UX platform may be implemented as an application of the user terminal 50 and the IVI system. The UX platform may allow a user to easily register, change, and cancel the vehicle service anywhere, anytime via the terminal 50 of the user or the IVI system of the vehicle. The user may register, change and cancel the vehicle service through the UX executed in the IVI system of the vehicle 100 in the normal driving mode aboard the vehicle 100. The UX platform may be implemented in the user terminal 50 and the IVI system of the vehicle 100. In addition, the UX platform may be implemented in an application for synchronizing the IVI system of the vehicle 100 and the user's mobile terminal, for example, Android Auto, iPhone Car Play, and the like. The vehicle service request selected by the user in the UX platform may be transmitted to the management server 40 via V2X communication.

The pick-up zone 30 is a valet parking waiting space where the vehicle 100 waits before autonomously driving to the service zone or where the vehicle 100 moved by autonomous driving from the service zone 20 or the parking lot 10 waits for the user. The pick-up zone 30 may be interpreted as an auto valet parking zone in that the vehicle 100 may be moved to the parking lot 10 by autonomous driving without driver interference.

When the user parks the vehicle in the pick-up zone 30, the vehicle 100 may start autonomous driving, under the control of the management server 40, along a preset path on the basis of the path data received from the management server 40, to move to the service zone 20, receive the vehicle service, and then move to the parking lot 10, find an empty space, and be parked therein. The vehicle 100 may autonomously drive under the control of the management server 40 or the user terminal 50 to move from the parking lot 10 to the pick-up zone 30 or the service zone 20. After receiving the vehicle service, the user may get in the vehicle 100 waiting in the pick-up zone 30 and drive the vehicle 100 to another destination.

The vehicle 100 may autonomously drive to move from the parking lot 10 to the service zone 20 under the control of the management server 40 to receive the registered vehicle service and then move from the service zone 20 to the pick-up zone 30 by autonomous driving. The user may get in the vehicle 100 waiting in the pick-up zone 30 and drive the vehicle 100 to another destination.

As illustrated in FIG. 62, the management server 40 includes a context manager 41, a database 41, a monitoring module 43, an engine 44, a payment module 45, and an authentication and user profile module 46.

The surveillance camera system of the service zone 20 recognizes a vehicle number of each vehicle, generates specific situation data of each vehicle, and transmits the data to the management server 40 in real time. The surveillance camera system measures a position of the vehicle moved in the service zone 20 and a service start time and an end time of each vehicle in stores of the service providers of the service zone 20, and generates time information including a vehicle number, a start time, and an end time for each service item. The surveillance camera system may be located at the entrance/exit of the service zone 20, and at multiple preset points, as well as the service providers, to provide a real-time image of the vehicle always in the service zone 20. The situation data may include at least time information, camera image data, and the like. The communication device of the service zone 20 transmits the situation data to the management server 40 through a communication link such as Internet of Things (IoT), Wi-Fi, Bluetooth, or the like.

The context manager 42 receives the situation data from the surveillance camera system of the service zone 20. The context manager 42 may be connected to the surveillance camera system through the IoT and receive situation data from the surveillance camera system in real time. Because the types of the situation data are diverse, the context manager 42 aggregates various situation data, checks data validity, and parses the situation data. The context manager 42 then delivers the situation data to the database 41, the monitoring module 43, and the engine 44.

The database 41 stores a user profile, the situation data, and vehicle service-related user data. The user profile includes user information which has subscribed to the vehicle service. The vehicle service related user data includes data such as registered vehicle service item, estimated time for each vehicle service item, and the like. The vehicle service registration data indicates the vehicle service items registered by the user via UX.

The engine 44 plans a path connecting service providers providing the vehicle service registered by the user, calculates an estimated time of the vehicle service registered by the user of each of the vehicle services and schedules the estimated time, and sets a movement path of the vehicle within the service zone 20. The engine 44 is implemented as a processor that processes data calculation.

When the user registers the vehicle service on the UX screen of the IVI system and the user terminal 50, the registration information is transmitted to the engine 44 via the service handler 47. Each of the service providers reads the vehicle number, measures the start time and the end time for each vehicle, and transmits time information including the start time and the end time for each vehicle to the management server 40.

The engine 44 analyzes time information from each service provider received through the context manager 42, generates service-related information, and transmits the service-related information to the user terminal through the service handler 47. Service-related information includes estimated time for each service item.

The estimated time may be calculated by a statistical calculation method for the latest service time history of other vehicles which have received the service prior to the user's vehicle 100. For example, the estimated time may be calculated as an average time of service time of the vehicles that have recently received service by service item. In addition, the estimated time may be calculated as variance and standard deviation. The engine 44 may update the service-related information in real time by reflecting the recent service time and transmit the same to the user terminal 50 and the vehicle 100.

The estimated time may include an estimated time required for each registered vehicle service item, a total estimated time, an estimated end time, and the like. The estimated required time may include a waiting time and an estimated service time. The engine 44 may transmit a service state for each vehicle service item, together with the estimated time, to the user terminal 50 or the vehicle 100. The service state may be divided into a smooth state, a normal state, a complex state, and the like as in the example of FIG. 66.

The engine 44 may select a movement path in which a total estimated time of all the registered vehicle services selected by the user is a minimum from among several movement path candidate groups. In addition, the engine 44 may monitor a service waiting vehicle and a waiting time in real time to change the movement path. The vehicle 100 may autonomously drive along the path set by the management server 40 in the service zone 20 and receive the vehicle service in order determined by the management server 40.

The estimated time information of the registered vehicle service and the movement path data generated from the engine 44 may be transmitted to the user terminal 50 and the vehicle 100 through the service handler 47.

The payment module 45 processes payment of cost for the use of the vehicle service. The payment module 45 may pay the service cost by the credit card pre-registered by the user after the user picks up the vehicle 100 from the pick-up zone 30.

The authentication and user profile module 46 processes user authentication for vehicle service registration and manages user profiles.

In response to a request for a real-time image of the vehicle service received through the user terminal 50, the monitoring module 43 transmits the vehicle image in the service zone 20 to the user terminal 50 via the service handler 47. Here, the user terminal 50 may be the user's mobile terminal or the IVI system of the vehicle 100.

The service handler 47 is connected to the user terminal 50 and the vehicle 100 via the network and transmits data from the user terminal 50 or the vehicle 100 to the engine 44, the payment module 45, and the authentication and user profile module 46 and sends data from the engine 44, the payment module 45 and the authentication and user profile module 46 to the user terminal 50 and the vehicle 100.

The service handler 47 processes an event request generated in the UX of the vehicle 100 or the user terminal 50, data, and the like, and transmits the same to the engine 44, the payment module 45, and the authentication and user profile module 46. The service handler 47 also connects the monitoring module 43, the engine 44, the payment module 45, and the authentication and user profile module 46 to the network.

Referring to FIG. 63, the normal driving mode is a state in which the vehicle 100 travels at a position other than the parking lot 10, the service zone 20, and the pick-up zone 30.

The autonomous parking mode is a state in which the vehicle 100 is waiting in the pick-up zone 30. The autonomous parking mode may be switched to the normal driving mode, the parking mode, and the vehicle service mode when a predetermined condition is met.

The vehicle service mode is a state in which the vehicle 100 is located in the service zone 20 in order to receive the vehicle service previously registered by the user. In the vehicle service mode, the vehicle 100 may autonomously drive along the movement path set by the management server 40 and receive the vehicle services previously registered by the user. The vehicle service mode may be switched to the autonomous parking mode or the parking mode when the predetermined condition is met.

The parking mode is a state in which the vehicle 100 is located in the parking lot 10. The vehicle 100 searches for an empty space in the parking lot 10 in the parking mode and is parked therein. The management server 40 may receive an image of the position where the vehicle 100 is parked or parking position information from the parking lot 10 and transmit the same to the user terminal 50. The parking mode may be switched to the autonomous parking mode or the vehicle service mode when the predetermined condition is met.

When the vehicle 100 receives a parking request in the normal driving mode, the vehicle 100 is switched to the autonomous driving mode. In an embodiment, the vehicle 100 travels to the pick-up zone 30, which is the destination, in the normal driving mode. The parking request is generated by the user or management server 40 to switch the vehicle 100 to the autonomous parking mode.

When the user receives the vehicle from the pick-up zone 30, the vehicle 100 is switched to the normal driving mode and travels from the pick-up zone 30 to another destination.

The vehicle 100 autonomously drives from the pick-up zone 30 to enter the service zone 20 under the control of the management server 40 in order to receive the vehicle service previously registered by the user. Here, the vehicle 100 is switched from the autonomous parking mode to the vehicle service mode. The vehicle 100 autonomously drives along the movement path received from the management server 40 in the vehicle service mode, receives the service from the service provider performing the previously registered vehicle service in the service zone 20, and then move to another service provider.

After receiving all the vehicle services registered by the user, the vehicle 100 is switched to the autonomous parking mode and autonomously drives to the pick-up zone 30. Here, the vehicle 100 is switched from the vehicle service mode to the autonomous parking mode.

In the parking mode, when the user additionally registers the vehicle service, the vehicle 10 may be switched to the vehicle service mode and move from the parking lot 10 to a service provider performing the added vehicle service.

In a parking state in which the vehicle 100 is parked in the parking lot 10 and all the registered vehicle services are received, the user may call the vehicle 100 or a movement command from the management server 40 may be received by the vehicle 100. Here, the vehicle 100 is switched from the parking mode to the autonomous parking mode and moves to the pick-up zone 30 by autonomous driving. The user may take over the vehicle 100 which has received all the vehicle services in the pick-up zone 300.

The vehicle 100 may be operated in the normal driving mode to the destination by autonomous driving without the driver or driver interference. The normal driving mode is divided into a manual mode, an autonomous driving mode, and a remote control mode depending on a subject who controls the vehicle 100. In the manual mode, the vehicle is operated by the driver. In the autonomous driving mode, the controller 170 or the operation system 700 directly controls the vehicle 100 without driver interference and operates the vehicle 100 to a destination set by the driver. The autonomous driving mode may include an autonomous parking mode in which an empty space in a parking lot is searched and the vehicle is parked therein.

FIG. 64 is a flowchart illustrating an example of a service registration, change, and cancellation method using an autonomous vehicle according to an embodiment of the present invention.

Referring to FIG. 64, the user may request a vehicle service registration or change through a UX platform executed in the user terminal 50 or the IVI system (S641).

The management server 40 inquires a service status of the service providers in the service zone 20 near the parking lot 10 designated by the user to search for a service that may be registered (S642). When the user selects registerable service items displayed on the display of the UX platform, the management server 40 calculates a service estimated time (S643, S644). The service estimated time may be estimated as an average time of a time for which one vehicle service is processed in each of the service providers. For example, when an average time required for washing a car in service provider 1 providing a car wash service is 30 minutes, 30 minutes may be added to the estimated time if the user selects the car wash service. When the user selects an additional vehicle inspection service, if an average time required for inspecting the vehicle for a car in service provider 2 is 40 minutes, 40 minutes may be added and thus a total time required for car wash and vehicle inspection may be calculated as 1 hour 10 minutes.

The management server 40 calculates an optimal movement path linking service providers that perform the vehicle services selected by the user. The management server 40 sets a movement path in which a total estimated time is minimum and transmits the same to the user terminal 50 or the vehicle 100 (S644 and S645).

If the user wants to additionally register a vehicle service, steps S643 to S645 are performed again (S646). When the user selects all desired vehicle services, the management server 40 transmits the estimated time and the movement path to the user terminal 50 or the vehicle 100 to provide the user with the estimated time and the movement path (S647). The estimated time may include an estimated service time and an estimated end time for each vehicle service, a total estimated service time for all vehicle services selected by the user, a final estimated end time, and the like.

The user may cancel a registered vehicle service by his/her selection (S648 to S650). When the user selects cancelation of a previously registered vehicle service on the UX platform executed in the user terminal 50 or the vehicle 100, the management server 40 cancels the previously registered vehicle service selected by the user and adjusts the movement path and the estimated time accordingly (S649 and S650).

FIGS. 65A to 65C are views showing an example of UX screens in the normal driving mode, the autonomous driving parking mode, the vehicle service mode, and the parking mode. UX screen is the screen of the user terminal. The user terminal may include at least one of the user terminal 50, the IVI system of the vehicle 100, a PC, and a notebook computer, as described above.

The UX screen displayed on the user terminal may include a vehicle service registration/change, a real time status of the vehicle service, the CCTV image viewing, parking information, and the like.

The user may register or change a vehicle service provided in the service zone 20 on the UX screen before arriving at the pick-up zone 30. The UX screen activates an icon requesting the vehicle service registration/change as shown in FIG. 65A in the normal driving mode.

In the autonomous parking mode or the vehicle service mode, the user may request vehicle service registration/change, a vehicle service real time status, and CCTV viewing on the UX screen as shown in FIG. 65B. The vehicle service real-time status may inform about a vehicle service progress status in the service zone 20 in real time. For example, when the user clicks an icon indicating the vehicle service real-time status on the UX screen, completion of a service, a service progress ratio, and the like, of each of the previously registered vehicle service items may be displayed on the UX screen. Upon receiving the vehicle service real-time status request, the management server 40 may calculate whether a service of the corresponding vehicle is completed from status data received from the service providers and a service progress ratio, and transmit the same to the personal terminal 50 of the user. When the user requests CCTV viewing, the management server 40 may display a vehicle image acquired by a camera in the service zone 20 to the user as a real-time image.

In the parking mode, the user may request vehicle service registration/change, a vehicle service real time status, and CCTV viewing on the UX screen as shown in FIG. 65C. The vehicle service real-time status may inform about a vehicle service progress status in the service zone 20 in real time. For example, when the user clicks an icon indicating the vehicle service real-time status on the UX screen, completion of a service, a service progress ratio, and the like, of each of the previously registered vehicle service items may be displayed on the UX screen. Upon receiving the vehicle service real-time status request, the management server 40 may calculate whether a service of the corresponding vehicle is completed from status data received from the service providers and a service progress ratio, and transmit the same to the personal terminal 50 of the user.

FIG. 66 is a view showing an example of an UX screen for guiding vehicle service registration/change.

Referring to FIG. 66, when the user selects vehicle service registration/change on the UX screen, the UX may show the service items that may be registered, a waiting time for each service item, a service time, a total required time, a service state, and the like, to the user.

The UX may display an already completed service and an unavailable service together with a registerable service. In the example of FIG. 66, registerable service items are refueling, external car wash, vehicle inspection, etc., and an unavailable service item is internal car wash. An already completed service may be dimmed in a certain first color (e.g., gray) and may be deactivated so that the user may not select it. The unavailable service may be displayed in a second color (red) so that it can be distinguished from the already completed service by color. The unavailable service may be deactivated so that the user cannot select it.

The UX may display a total required time for the total registered vehicle services selected by the user and an estimated end time on the vehicle service registration/change screen, and display a message asking user confirmation on the registered service item.

FIG. 67 is a flowchart illustrating a service real-time situation providing method in a service providing method using an autonomous vehicle according to an embodiment of the present invention.

Referring to FIG. 67, in the service providing method of the present invention, when the user selects a real-time situation guidance on the UX screen, an estimated time, an estimated end time, and the like of the pre-registered vehicle service (S671 and S672).

When the user wants to view real-time video (CCTV) on the UX screen shown in FIGS. 65B and 65C, the management server 40 transmits a vehicle image in the service zone 20 to the user terminal 50 (S673 and S674).

When all of the pre-registered vehicle services are completed or canceled by the user, the vehicle 20 autonomously drives to the parking lot 10, searches for an empty space, and is parked therein (S675 and S676). The management server 40 transmits a parking position of the vehicle 100 to the user terminal 50 (S677).

If an uncompleted vehicle service remains, the vehicle 100 receives the vehicle service under the control of the management server 40 (S675 and S678). The management server 40 may transmit estimated time information of the vehicle which is receiving the vehicle service to the user terminal 50 to inform the user of a total estimated time, an estimated end time, and the like of the vehicle service (S679). When the user wants to view a real-time image (CCTV), the management server 40 transmits a vehicle image in the service zone 20 to the user terminal 50 (S680 and S681).

FIG. 68 is a flowchart illustrating an example of a service recommendation method in a service providing method using an autonomous vehicle according to an embodiment of the present invention.

Referring to FIG. 68, the management server 40 may recommend a vehicle service when the vehicle is parked in the parking lot 10 (S691 and S692).

The management server 40 may monitor a situation in the service zone 20, selects an available vehicle service, an estimated required time for the vehicle service, and an estimated end time, and transmits the same to the user terminal 50 of the vehicle being parked, thereby recommending the vehicle service to the user (S692 to S694).

When the user registers a recommended vehicle service on the UX screen, the vehicle 100 autonomously drives to the service zone 20 under the control of the management server 40 and moves to the service provider who performs the vehicle service registered by the user, and receives the vehicle service (S695 and S696). When the user wants to view a real-time image (CCTV), the management server 40 transmits a vehicle image in the service zone 20 to the user terminal 50 (S697 and S698).

When the registered vehicle service is completed or canceled by the user, the vehicle 20 autonomously drives to the parking lot 10 to search for an empty space and be parked again therein (S699 and S700). The management server 40 transmits a parking position of the vehicle 100 to the user terminal 50 (S701).

FIG. 69 shows an example of an UX screen showing a real-time service situation of a vehicle in a service zone.

Referring to FIG. 69, the vehicle 100 may autonomous drive under the control of the management server 40 within the service zone 20 to receive a vehicle service previously registered by the user. The user may check a real-time service status of the vehicle 100 on the UX screen displayed on the user terminal 50.

The management server 40 may transmit information such as a movement path linking service providers performing the vehicle services previously registered by the user, a current position of the vehicle, a current service progress ratio of the vehicle (e.g., 80%), a service result of each item (e.g., an air pressure check, a tire check, etc.) to the user terminal 50. Accordingly, the user may check the service status of the vehicle 100 at a remote location in real time.

After receiving all the previously registered vehicle services, the vehicle 100 autonomously travels to the parking lot 10, searches for an empty space, and is parked therein under the control of the management server 40. In the case of the vehicle 100 parked in the parking lot 10, when the user requests a real-time situation on the UX screen, the management server 40 may transmit parking position information of the vehicle 100 to the user terminal 50 in order to inform the user about the current parking location of the vehicle.

FIGS. 70 and 71 are views showing recommendation of available vehicle services.

Referring to FIG. 70, in the parking mode, the user may receive a recommendation of a vehicle service through the UX screen of the user terminal 50 or the IVI system of the vehicle. If the vehicle 100 is parked in the parking lot 10 and the user does not pick up the vehicle 100 (S711 and S712), the management server 40 updates data required for a currently available vehicle service item on the UX screen and transmit the updated data to the user terminal 50 (S716).

The UX screen may display a service name, a congestion status, a required time, and the like, in each available vehicle service item.

When the user selects an additional service on the service recommendation UX screen, the vehicle 100 enters the vehicle service mode, autonomously drives to the service zone 20, and moves to a service provider providing the additional service along the movement path received from the server 20 (S717 and S718)

When the vehicle 100 is in the parking mode and the user 100 calls the vehicle 100 to pick up the vehicle 100, the vehicle 100 enters the autonomous parking mode and autonomously drives to the pick-up zone 30 (S713, S714, and S715).

FIG. 72 is a flowchart illustrating an example of a service registration/changing method in a normal driving mode of a vehicle. FIG. 73A is a view showing an example of a UX screen provided when there is a pre-registered vehicle service in the service registration/change shown in FIG. 72. FIG. 73B is a view showing an example of an UX screen provided when there is no registered vehicle service in the service registration/change shown in FIG. 72.

Referring to FIGS. 72 to 73B, the user may select a vehicle which may be provided in the service zone 20 associated with the parking lot through the UX executed in the user terminal 50 or the IVI system of the vehicle 100 in the normal driving mode.

The user may select registration/change of a vehicle service through the UX screen (S721).

When the user selects registration/change of a vehicle service on the UX screen, the management server 40 calculates a time Te to a destination, that is, the service zone 20, and transmits the time Te to the user terminal 50 or the IVI system of the vehicle 100 to display the time Te to the destination that is updated in real time on the UX screen as shown in FIG. 73A (S722).

When there is a pre-registered vehicle service, the UX may display a UX screen providing additional registration services on the display of the user terminal 50 or the IVI system of the vehicle 100 as shown in FIG. 73A (S723 and S724). The registerable services may be displayed with a waiting time, a service time, total required time, a congestion status, a selection check box, and the like on the UX screen. The time Te may be displayed on the UX screen to a destination, that is, a location of a provider of the pre-registered vehicle service.

When there is no pre-registered vehicle service, the UX may display a UX screen providing new registration services on the display of the user terminal 50 or the IVI system of the vehicle 100 as shown in FIG. 73B (S723 and S725). The registerable services may be displayed with a waiting time, a service time, total required time, a congestion status, a selection check box, and the like on the UX screen. The UX may display unavailable vehicle service item in a deactivated window. The deactivated window may be dimmed.

FIG. 74 is a flowchart illustrating an UX method provided in an autonomous parking mode or a vehicle service mode. FIG. 75 is a view showing an example of a real-time status UX screen in the UX method shown in FIG. 74.

Referring to FIGS. 74 and 75, the UX may provide a service registration/change UX screen when the vehicle is in the parking mode, thereby providing service recommendation, parking information, and the like (S741 and S742).

The UX may inform the user of a real time status of the vehicle in the service zone 20 when the vehicle is in the vehicle service mode (S742 and S744). The real-time status may be the screen shown in FIG. 69 or a current image of the vehicle, and an available service items, a total required time, and the like may also be further displayed as shown in FIG. 75.

The UX may provide a registration/change UX screen as shown in FIG. 66 or 73B when the vehicle is in the autonomous parking mode (S743).

FIG. 76 is a flowchart illustrating an example of a UX method for selecting registration/change, a current status, a real time image and parking information of the vehicle service.

Referring to FIG. 76, a user may select registration/change of a vehicle service (S761), a real-time status of the vehicle (S762), a real-time image (S763), and parking information (S764) on a UX screen executed in the user terminal 50 or the IVI system of the vehicle 100.

If the user selects registration/change of vehicle service on the UX screen, the UX may display the UX screen for registration/change as shown in FIG. 66 or 73B (S765). When the user selects the registration of the vehicle service (S766), the vehicle 100 enters the vehicle service mode and autonomously drives to the service zone 20 along the movement path received from the management server 40 (S767).

If the user selects the real-time status of the vehicle service on the UX screen, the UX may display the real-time status UX screen as shown in FIG. 69 or 75 on the display (S768).

If the user selects a real-time image (CCTV) of the vehicle service on the UX screen, the UX may play a real-time image captured by the surveillance camera system of the service zone 20 on the display (S769).

When the vehicle 100 is in the parking mode and the user requests parking information on the UX screen (S764), the UX may display parking information regarding a parking position of the vehicle 100 received from the management server 40 (S770).

FIG. 77 is a view showing an example of an autonomous driving movement path of a vehicle according to a registered vehicle service.

Referring to FIG. 77, first to third service providers 21, 22, and 23 may be disposed in the service zone 20. The first service provider 21 may provide a first vehicle service, for example, a refueling service (or gas service). The second service provider 22 may provide a second vehicle service, for example, a vehicle inspection service. The third service provider 23 may provide a third vehicle service, for example, a car wash service.

If there is no registered vehicle service, the vehicle 100 autonomously drives along a first path P1 toward the entrance of a parking lot from the pick-up zone 30 without passing through the service zone 20, to directly move to the parking lot and be parked therein.

If there is a registered vehicle service, the vehicle 100 autonomously drives along a second path P2 toward the service zone 20 from the pick-up zone 10.

If there is a registered vehicle service, the vehicle 100 autonomously drives along a second path P2 toward the service zone 20 from the pick-up zone 10.

The vehicle 100, which has entered the service zone 20, may move along third or fourth path P3 or P4. If the first vehicle service is registered, then the vehicle 100 autonomously drives along the fourth path P4 bypassing the first service provider 21 and then receives the first vehicle service from the first service provider 21. If the first vehicle service is not registered, the vehicle 100 may move along the third path P3 and quickly move to the next service provider 22.

The vehicle 100 moving along the third path P3 may move along the fifth or sixth path P5 or P6. If the second vehicle service is registered, the vehicle 100 autonomously drives along the sixth path P4 bypassing the second service provider 22 and receives the second vehicle service from the second service provider 22. If there is no registered vehicle service, the vehicle 100 autonomously drives along the sixth path P6 to the parking lot 10 after receiving the second vehicle service, and is parked in an empty space.

If the vehicle 100 receives the third vehicle service after receiving the second vehicle service, the vehicle 100 autonomously drives along the fifth path P5 bypassing the third service provider 23, to receive the third vehicle service. If there is no registered vehicle service any more, the vehicle 100 autonomously drives to the parking lot 10 along the seventh path P7 after receiving the third vehicle service and be parked in the empty space.

An autonomous vehicle and a service providing system and method using the same according to an embodiment of the present invention may be described as follows.

An autonomous vehicle according to the present invention includes a navigation system setting, as a destination, a service zone adjacent to a parking lot when there is a previously registered vehicle service input through a user terminal, and setting, as a destination, the parking lot adjacent to the service zone after completion of the previously registered vehicle service; and an operation system moving the vehicle to the destination through autonomous driving.

The autonomous vehicle further includes a communication device, by a communication link, connected to a server which manages registration, change, and cancellation of a vehicle service in the service zone.

The autonomous vehicle further includes a controller transferring data from the user terminal to the server through the communication link and transferring data received from the server to the navigation system through the communication link.

A path and a destination of the navigation system is controlled by the server.

The user terminal includes at least one of a mobile terminal that can be carried by a user, a personal computer, a notebook computer, and a user interface device of the vehicle.

The navigation system applies a movement path received from the server as an autonomous driving path of the vehicle.

When a vehicle service is added through the user terminal while the vehicle is being parked in the parking lot, the navigation system sets the destination as the service zone.

A service providing system of the present invention includes a service system including a surveillance camera system, a service provider server, and a management server connected to a communication device and providing at least one vehicle service and a user terminal displaying a user interface screen guiding registration, change, and cancellation of the vehicle service on a display, connected to the management server through a communication link to display data received from the management server on the display, and transmitting the user data to the management server. The service zone is disposed to be adjacent to the parking lot, and the management server receives registration, change, and cancellation of the vehicle service of the service zone from the user terminal.

In a pick-up zone connected to an access road of the service zone and the parking lot, the vehicle starts to autonomously drive to the service zone managed by the service zone system or the parking lot and the vehicle arrives at the service zone or the parking lot through autonomous driving.

The service provider server transmits a vehicle service status to the management server, and receives registration, cancellation, and change of the vehicle service from the management server.

The user terminal includes at least one of a mobile terminal that can be carried by a user, a personal computer, a notebook computer, and a user interface device of the vehicle.

When a vehicle service is additionally registered through the user terminal while the vehicle is being parked in the parking lot, the vehicle autonomously drives to the service zone to receive an additional registration service.

When there is a previously registered vehicle service input through the user terminal, the vehicle starts to autonomously drive from the pick-up zone to the service zone along a movement path from the management server. When the previously registered service is completed, the vehicle autonomously drives to the parking lot from the service zone.

The server transmits a real-time image of the vehicle to the user terminal in the service zone in response to a corresponding request from the user terminal, and the user terminal displays the real-time image of the vehicle on the display.

The user terminal displays, on the display, service-related information including a waiting time, a service time, and a total required time for each service item of the registered vehicle service. The service-related information is updated in real time according to data received from the management server.

The user terminal displays, on the display, a degree of congestion of each service item of the previously registered vehicle service. The degree of congestion is updated in real time according to data received from the management server.

The user terminal displays a completed vehicle service item and an unavailable service item on the display.

The user terminal displays, on the display, a service progress situation and a service progress rate in the service zone along a movement path set by the server. The service progress situation and the service progress rate are updated in real time according to data received from the management server.

The server includes a context manager receiving situation data of each vehicle received from a surveillance camera system of the service zone, a database storing the user data and the situation data, an engine setting a movement path connecting stores of service providers providing the registered vehicle service received from the user terminal, and calculating an estimated time for each of the registered vehicle service items on the basis of the situation data, a payment module processing payment for the use of a vehicle service, an authentication and user profile module processing user authentication for vehicle service registration on the basis of a user profile, a monitoring module providing an image of the vehicle to the user terminal in response to a request for a real-time image of the vehicle service received through the user terminal, and a service handler connected to the user terminal through a network, transmitting data from the user terminal to the engine, the payment module, and the authentication and user profile module, and transmitting data from the engine, the payment module, and the authentication and user profile module to the user terminal.

The situation data of each vehicle includes a vehicle number and a service start time and an end time of each vehicle in a store of each of the service providers in the service zone, and the user data includes user information, vehicle service registration data, and an estimated time of each vehicle service item. The estimated time of each vehicle item includes an estimated required time of each registered vehicle service item, a total estimated time, and an estimated end time.

A service providing method of the present invention includes disposing a service zone providing at least one vehicle service, to be adjacent to a parking lot, autonomously driving a vehicle to the service zone from a pick-up zone and allowing the vehicle to receive a registered vehicle service requested through a user terminal in the service zone, and after the registered vehicle service is completed, autonomously driving the vehicle to the pick-up zone from the parking lot to wait in the pick-up zone.

The service providing method further includes: when registration of a vehicle service is added through the user terminal while the vehicle is being parked in the parking lot, autonomously driving the vehicle to the service zone to receive the additionally registered service.

The service providing method further includes: displaying a user interface screen guiding registration, change, and cancellation of the vehicle service on a display of the user terminal; transmitting user data input through the user terminal to a server that manages registration, change, and cancellation of the vehicle service in the service zone; and transmitting data generated from the server to the user terminal and updating service-related information displayed on the display of the user terminal in real time. The service-related information includes a waiting time, a service time, and a total required time of each service item.

The service providing method further includes: transmitting, by the server, a real-time image of the vehicle to the user terminal in the service zone in response to a corresponding request from the user terminal; and displaying, by the user terminal, the real-time image of the vehicle on the display.

The service providing method further includes: transmitting, by the server, a degree of congestion of each service item in the service zone; and displaying, by the user terminal, the degree of congestion of each service item on the display.

The service providing method further includes: transmitting, by the server, a completed vehicle service item and an unavailable service item to the user terminal; and displaying, by the user terminal, the completed vehicle service item and the unavailable service item on the display.

The service providing method further includes: displaying, by the user terminal, a service progress situation and a service progress rate received from the server on the display.

The service providing method further includes: setting, by the server, a movement path of the vehicle in the service zone and transmitting the set movement path to the vehicle; and autonomously driving the vehicle in the service zone along the movement path from the server.

The present invention provides a vehicle service to a vehicle before the vehicle enters a parking lot or to a vehicle which leaves from the parking lot, thereby providing a previously registered vehicle service to the user while the user is taking care of personal business.

The present invention provides a vehicle service associated parking to the vicinity of a parking lot, thereby improving user convenience, as well as providing an estimated time, an end time, and a real-time status of the vehicle service on a UX screen.

The present invention provides an effect of increasing user convenience and sales of service providers in a smart building, a shopping mall, and the like.

Advantages and effects of the present disclosure are not limited to the foregoing effects and any other technical effects not mentioned herein may be easily understood by a person skilled in the art from the descriptions of claims.

The present disclosure described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The invention claimed is:

1. A service providing system comprising:
   a service system including a surveillance camera system, a service provider server, and a management server connected to a communication device and providing at least one vehicle service; and
   a user terminal displaying a user interface screen guiding registration, change, and cancellation of the vehicle service on a display, connected to the management server through a communication link to display data received from the management server on the display, and transmitting user data to the management server,
   wherein a service zone is disposed to be adjacent to a parking lot, and the management server receives registration, change, and cancellation of the vehicle service of the service zone from the user terminal, and
   wherein the management server transmits a real-time image of the vehicle to the user terminal in the service zone in response to a corresponding request from the user terminal, and the user terminal displays the real-time image of the vehicle on the display.

2. The service providing system of claim 1, wherein, in a pick-up zone connected to an access road of the service zone and the parking lot, the vehicle starts to autonomously drive to the service zone managed by a service zone system or the parking lot and the vehicle arrives at the service zone or the parking lot through autonomous driving.

3. The service providing system of claim 2, wherein when there is a previously registered vehicle service input through the user terminal, the vehicle starts to autonomously drive from the pick-up zone to the service zone along a movement path from the management server, and when the previously registered vehicle service is completed, the vehicle autonomously drives to the parking lot from the service zone.

4. The service providing system of claim 1, wherein the service provider server transmits a vehicle service status to the management server, and receives registration, cancellation, and change of the vehicle service from the management server.

5. The service providing system of claim 1, wherein the user terminal includes at least one of a mobile terminal that can be carried by a user, a personal computer, a notebook computer, and a user interface device of the vehicle.

6. The service providing system of claim 1, wherein, when a vehicle service is additionally registered through the user terminal while the vehicle is being parked in the parking lot, the vehicle autonomously drives to the service zone to receive an additional registration service.

7. The service providing system of claim 1, wherein the user terminal displays, on the display, service-related information including a waiting time, a service time, and a total required time for each service item of a registered vehicle service, and the service-related information is updated in real time according to data received from the management server.

8. The service providing system of claim 7, wherein the user terminal displays, on the display, a degree of congestion of each service item of the registered vehicle service, and the degree of congestion is updated in real time according to data received from the management server.

9. The service providing system of claim 8, wherein the user terminal displays a completed vehicle service item and an unavailable service item on the display.

10. The service providing system of claim 9, wherein the user terminal displays, on the display, a service progress situation and a service progress rate in the service zone along a movement path set by the management server, and the service progress situation and the service progress rate are updated in real time according to data received from the management server.

11. The service providing system of claim 1, wherein the management server comprises:
a context manager receiving situation data of each vehicle received from a surveillance camera system of the service zone;
a database storing the user data and the situation data;
an engine setting a movement path connecting stores of service providers providing the registered vehicle service received from the user terminal, and calculating an estimated time for each of the registered vehicle service items on the basis of the situation data;
a payment module processing payment for the use of a vehicle service;
an authentication and user profile module processing user authentication for vehicle service registration on the basis of a user profile;
a monitoring module providing an image of the vehicle to the user terminal in response to a request for a real-time image of the vehicle service received through the user terminal; and
a service handler connected to the user terminal through a network, transmitting data from the user terminal to the engine, the payment module, and the authentication and user profile module, and transmitting data from the engine, the payment module, and the authentication and user profile module to the user terminal.

12. The service providing system of claim 11, wherein the situation data of each vehicle includes a vehicle number and a service start time and an end time of each vehicle in a store of each of the service providers in the service zone, and
the user data includes user information, vehicle service registration data, and an estimated time of each vehicle service item, and
the estimated time of each vehicle item includes an estimated required time of each registered vehicle service item, a total estimated time, and an estimated end time.

* * * * *